US012273256B2

(12) United States Patent
Knode

(10) Patent No.: US 12,273,256 B2
(45) Date of Patent: Apr. 8, 2025

(54) ASSIGNING ROUTER DEVICES IN A MESH NETWORK

(71) Applicant: Lutron Technology Company LLC, Coopersburg, PA (US)

(72) Inventor: Galen Edgar Knode, Macungie, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/315,040

(22) Filed: May 7, 2021

(65) Prior Publication Data

US 2021/0352002 A1 Nov. 11, 2021

Related U.S. Application Data

(60) Provisional application No. 63/117,759, filed on Nov. 24, 2020, provisional application No. 63/022,169, filed on May 8, 2020.

(51) Int. Cl.
*H04L 45/02* (2022.01)
*H04L 12/46* (2006.01)
(Continued)

(52) U.S. Cl.
CPC .......... *H04L 45/02* (2013.01); *H04L 12/4641* (2013.01); *H04L 41/0813* (2013.01);
(Continued)

(58) Field of Classification Search
CPC . H04L 45/02; H04L 41/0823; H04L 12/4641; H04L 41/0813; H04L 43/08; H04L 67/12
See application file for complete search history.

(56) References Cited

U.S. PATENT DOCUMENTS 948,000 A 2/1910 Talbot
5,086,228 A 2/1992 Kojima
(Continued)

FOREIGN PATENT DOCUMENTS

CN 107926103 A 4/2018
CN 109417508 A 3/2019
(Continued)

OTHER PUBLICATIONS

KR 20120060576 A, related PCT Application No. PCT/US20/62959 in Search Report dated Mar. 9, 2021. * Machine Translation for Espacenet provided of Description and Claims.
(Continued)

*Primary Examiner* — Siming Liu
(74) *Attorney, Agent, or Firm* — Flaster Greenberg P.C.

(57) ABSTRACT

A load control system may include control devices configured to communicate via a network. The network may include router devices for enabling communication of messages throughout the network. Networks may enter a router optimization mode to optimize the locations of the router devices in the network. During a router optimization mode, the control devices that are communicating over the network may transmit optimization messages. In order to generate optimized network data for optimizing the network and the roles of devices on the network, potential connections may be analyzed between devices and roles of the router devices in the network may be established based on the potential connections between devices.

35 Claims, 14 Drawing Sheets

(51) Int. Cl.
*H04L 41/0813* (2022.01)
*H04L 41/0823* (2022.01)
*H04L 43/08* (2022.01)
*H04L 67/12* (2022.01)

(52) U.S. Cl.
CPC .......... *H04L 41/0823* (2013.01); *H04L 43/08* (2013.01); *H04L 67/12* (2013.01)

(56) References Cited

U.S. PATENT DOCUMENTS

| | | |
|---|---|---|
| 5,086,428 A | 2/1992 | Perlman et al. |
| 5,564,090 A | 10/1996 | Beauchamp et al. |
| 5,634,010 A | 5/1997 | Ciscon et al. |
| 5,838,226 A | 11/1998 | Houggy et al. |
| 5,848,054 A | 12/1998 | Mosebrook et al. |
| 5,905,442 A | 5/1999 | Mosebrook et al. |
| 6,209,039 B1 | 3/2001 | Albright et al. |
| 6,262,976 B1* | 7/2001 | McNamara ............. H04L 45/02 370/254 |
| 6,879,806 B2 | 4/2005 | Shorty |
| 7,184,421 B1 | 2/2007 | Liu et al. |
| 7,277,931 B1* | 10/2007 | Booth ..................... H04L 41/12 709/219 |
| 7,391,297 B2 | 6/2008 | Cash et al. |
| 7,447,800 B2 | 11/2008 | Kobayashi et al. |
| 7,606,187 B2 | 10/2009 | Zeng et al. |
| 7,787,424 B2 | 8/2010 | Kang et al. |
| 7,839,791 B2 | 11/2010 | Holmer et al. |
| 8,009,042 B2 | 8/2011 | Steiner et al. |
| 8,149,690 B1 | 4/2012 | Kakkar |
| 8,170,033 B1 | 5/2012 | Kothari et al. |
| 8,199,010 B2 | 6/2012 | Sloan et al. |
| 8,228,184 B2 | 7/2012 | Blakeley et al. |
| 8,306,062 B1 | 11/2012 | Cohen |
| 8,330,638 B2 | 12/2012 | Altonen et al. |
| 8,386,613 B2 | 2/2013 | Hopkins |
| 8,410,706 B2 | 4/2013 | Steiner et al. |
| 8,451,116 B2 | 5/2013 | Steiner et al. |
| 8,950,461 B2 | 2/2015 | Adams et al. |
| 9,125,215 B2 | 9/2015 | Bahr |
| 9,178,798 B2 | 11/2015 | Esale et al. |
| 9,488,000 B2 | 11/2016 | Kirby et al. |
| 9,655,214 B1 | 5/2017 | Sooch et al. |
| 9,655,215 B1 | 5/2017 | Frank et al. |
| 10,027,127 B2 | 7/2018 | Crafts et al. |
| 10,264,651 B2 | 4/2019 | Steiner |
| 10,285,112 B2 | 5/2019 | Zhang et al. |
| 10,299,356 B1 | 5/2019 | Quilling et al. |
| 10,379,505 B2* | 8/2019 | Barco ............... H05B 47/1965 |
| 10,382,323 B1 | 8/2019 | Dave et al. |
| 10,680,899 B1* | 6/2020 | Ibarra ................. H04W 88/16 |
| 10,715,599 B2 | 7/2020 | Hao et al. |
| 10,813,058 B2 | 10/2020 | Qiu |
| 10,939,353 B2 | 3/2021 | Kamp et al. |
| 11,405,283 B2 | 8/2022 | Chen |
| 11,722,377 B2 | 8/2023 | Hayes |
| 2003/0031155 A1* | 2/2003 | Idehara ................. H04W 88/06 370/349 |
| 2004/0196858 A1 | 10/2004 | Tsai et al. |
| 2004/0202158 A1 | 10/2004 | Takeno et al. |
| 2006/0067282 A1 | 3/2006 | Sherman et al. |
| 2006/0149851 A1 | 7/2006 | Matsumoto et al. |
| 2006/0291485 A1* | 12/2006 | Thubert ................. H04L 45/02 370/254 |
| 2006/0291659 A1 | 12/2006 | Watanabe |
| 2007/0025274 A1* | 2/2007 | Rahman ................. H04W 40/26 370/254 |
| 2007/0265790 A1 | 11/2007 | Sealing et al. |
| 2008/0031129 A1 | 2/2008 | Arseneault et al. |
| 2008/0036589 A1 | 2/2008 | Werb et al. |
| 2008/0092075 A1 | 4/2008 | Jacob et al. |
| 2008/0117907 A1 | 5/2008 | Hein |
| 2008/0170518 A1 | 7/2008 | Duggi et al. |
| 2008/0205385 A1 | 8/2008 | Zeng et al. |
| 2008/0240078 A1 | 10/2008 | Thubert et al. |
| 2009/0135824 A1* | 5/2009 | Liu ......................... H04L 45/32 370/432 |
| 2009/0185617 A1 | 7/2009 | Houghton et al. |
| 2009/0206983 A1 | 8/2009 | Knode et al. |
| 2009/0245252 A1 | 10/2009 | Konishi et al. |
| 2010/0046430 A1 | 2/2010 | Naito et al. |
| 2010/0165885 A1 | 7/2010 | Chang et al. |
| 2010/0177660 A1 | 7/2010 | Essinger et al. |
| 2010/0265836 A1 | 10/2010 | Lau et al. |
| 2010/0278187 A1* | 11/2010 | Hart ....................... H04L 69/18 370/469 |
| 2011/0242968 A1 | 10/2011 | Cirkovic et al. |
| 2012/0182865 A1* | 7/2012 | Andersen ................. H04L 1/22 370/228 |
| 2012/0286940 A1 | 11/2012 | Carmen, Jr. et al. |
| 2013/0030589 A1 | 1/2013 | Pessina et al. |
| 2013/0107909 A1 | 5/2013 | Jones et al. |
| 2013/0197955 A1* | 8/2013 | Dillon ............ G06Q 10/063114 705/7.13 |
| 2013/0258872 A1* | 10/2013 | Drake ................. H04L 41/0833 370/252 |
| 2013/0336170 A1* | 12/2013 | Broadworth .......... H04L 65/403 370/260 |
| 2014/0012961 A1 | 1/2014 | Pope |
| 2014/0173056 A1 | 6/2014 | Lear et al. |
| 2014/0175875 A1 | 6/2014 | Newman et al. |
| 2014/0177469 A1 | 6/2014 | Neyhart et al. |
| 2014/0180487 A1 | 6/2014 | Bull et al. |
| 2014/0210616 A1 | 7/2014 | Ramachandran |
| 2014/0244834 A1 | 8/2014 | Guedalia et al. |
| 2014/0265568 A1 | 9/2014 | Crafts et al. |
| 2014/0281670 A1 | 9/2014 | Vasseur et al. |
| 2014/0347981 A1 | 11/2014 | Rangne et al. |
| 2015/0043562 A1 | 2/2015 | Shu |
| 2015/0085830 A1* | 3/2015 | Nozaki ................. H04W 40/00 370/332 |
| 2015/0131435 A1 | 5/2015 | Kasslin et al. |
| 2015/0179058 A1 | 6/2015 | Crafts et al. |
| 2016/0021525 A1 | 1/2016 | Mani et al. |
| 2016/0073342 A1 | 3/2016 | Szewczyk et al. |
| 2016/0119415 A1 | 4/2016 | Han et al. |
| 2016/0219358 A1 | 7/2016 | Shaffer et al. |
| 2016/0227481 A1 | 8/2016 | Au et al. |
| 2016/0330107 A1 | 11/2016 | Thubert et al. |
| 2017/0013614 A1 | 1/2017 | Chandrashekar et al. |
| 2017/0041954 A1 | 2/2017 | Tsai et al. |
| 2017/0068720 A1* | 3/2017 | Ko ..................... G06F 16/24575 |
| 2017/0123390 A1* | 5/2017 | Barco ..................... H05B 47/19 |
| 2017/0127468 A1 | 5/2017 | Saikusa |
| 2017/0155703 A1 | 6/2017 | Hao et al. |
| 2017/0223809 A1* | 8/2017 | Oliver ................. H05B 47/199 |
| 2017/0230231 A1 | 8/2017 | Hsu et al. |
| 2017/0245132 A1 | 8/2017 | Tsuchie |
| 2018/0014387 A1 | 1/2018 | Bard et al. |
| 2018/0035374 A1 | 2/2018 | Borden et al. |
| 2018/0167547 A1 | 6/2018 | Casey et al. |
| 2018/0220476 A1* | 8/2018 | Jung ..................... H04L 12/2869 |
| 2018/0227145 A1 | 8/2018 | Brochi et al. |
| 2018/0331940 A1 | 11/2018 | Jadhav et al. |
| 2018/0347271 A1 | 12/2018 | Cooney et al. |
| 2018/0368048 A1 | 12/2018 | Tsuchie |
| 2019/0104463 A1 | 4/2019 | Khoury |
| 2019/0268797 A1 | 8/2019 | Pang et al. |
| 2019/0312770 A1 | 10/2019 | Bidgoli et al. |
| 2019/0394667 A1* | 12/2019 | Shariati ............ H04W 28/0205 |
| 2020/0044707 A1* | 2/2020 | Sakoda ................. H04B 7/0695 |
| 2020/0052997 A1* | 2/2020 | Ramanathan ......... H04L 47/286 |
| 2020/0100138 A1 | 3/2020 | Wu et al. |
| 2020/0169355 A1 | 5/2020 | McIlroy |
| 2020/0403866 A1 | 12/2020 | Hayes et al. |
| 2020/0403877 A1 | 12/2020 | Hayes et al. |
| 2020/0404513 A1 | 12/2020 | Hayes et al. |
| 2021/0014148 A1 | 1/2021 | Heitz et al. |
| 2021/0014770 A1* | 1/2021 | Qi ....................... H04B 17/318 |
| 2021/0194766 A1 | 6/2021 | Crafts et al. |
| 2021/0243173 A1 | 8/2021 | D'Alessandro et al. |
| 2021/0352002 A1 | 11/2021 | Knode |
| 2022/0015172 A1 | 1/2022 | Xu et al. |

(56) References Cited

U.S. PATENT DOCUMENTS

| | | | |
|---|---|---|---|
| 2022/0053407 A1* | 2/2022 | Zhou | .................. H04L 45/54 |
| 2022/0191309 A1 | 6/2022 | Zhi et al. | |
| 2022/0210715 A1 | 6/2022 | Deixler et al. | |
| 2022/0351628 A1 | 11/2022 | Ali et al. | |
| 2023/0284363 A1* | 9/2023 | Baker | .................. H04W 4/33 |
| | | | 370/329 |

FOREIGN PATENT DOCUMENTS

| | | | | |
|---|---|---|---|---|
| CN | 109691183 A | | 4/2019 | |
| CN | 109788500 A | | 5/2019 | |
| EP | 1443722 A2 | | 8/2004 | |
| EP | 1594266 A1 | | 11/2005 | |
| EP | 3048762 A1 | | 7/2016 | |
| KR | 20120060576 A | | 6/2012 | |
| KR | 29120060576 | * | 6/2012 | ............ H04L 45/22 |
| KR | 20190058352 A | | 5/2019 | |
| WO | 2012048585 A1 | | 4/2012 | |

OTHER PUBLICATIONS

Cn 109788500 A, related PCT Application No. PCT/US20/66043 in Invitation to Pay Additional Fees dated Mar. 25, 2021 * Machine Translation for Espacenet provided of Description and Claims.

Kim, Hyung-Sin, et al., "Scalable Network Joining Mechanism in Wireless Sensor Networks", IEEE, Research Gate, Jan. 2012, 5 Pages.

Lee, Huang-Chen, et al., "Monitoring of Large-area IoT Sensors Using a LoRa Wireless Mesh Network System: Design and Evaluation", IEEE, ResearchGate, Mar. 2018, 12 Pages.

Yoo, Seong-Eun, et al., "A2S: Automated Agriculture System Based on WSN", IEEE, Research Gate, Jul. 2007, 6 Pages.

Parsa, et al., "SIDLE: Semantically Intelligent Distributed Leader Election Algorithm for Wireless Sensor Networks", Aug. 23, 2019, 8 pages.

Saedi, et al., "Generation of realistic signal strength measurements for a 5G Rogue Base Station attack scenario", Jul. 2020, 8 pages.

Lin, Deyu, et al., "An Energy-Efficient Clustering Algorithm Combined Game Theory and Dual-Custer-Head Mechanism for WSNs", IEE Access, vol. 7 DOI: 10.1109/ACCESS.2019.2911190 [retrieved on Apr. 22, 2019), 4/15/20019, pp. 49894-49905.

Thread Group, Inc., "Thread Specification", Revision 1.1.1, Feb. 13, 2017, 348 pages.

Moon, et al., "Energy Efficient Data Collection in Sink-Centric Wireless Sensor Networks: A Cluster-Ring Approach", Computer Communications, Elsevier Science Publishers BV, Amsterdam, NL, vol. 101, Jul. 4, 2016, pp. 12-25.

WO 2012/0485885 A1, Cited in Office Action dated Jan. 2, 2024, in related Chinese Application No. 202080095240.8.

KR 20190058352 A, Cited in Examination Report dated Jan. 15, 2024, in related Indian Application No. 202117061236.

CN 107926103 A, U.S. Pat. No. 10,098,074 B2.

* cited by examiner

LINK QUALITY AND LINK COST

| Link Quality | Link Cost |
|---|---|
| 0 | Unknown/Indefinite |
| 1 | 4 |
| 2 | 2 |
| 3 | 1 |

ASSIGNING ROUTER DEVICES IN A MESH NETWORK

CROSS-REFERENCE TO RELATED APPLICATIONS

This application claims priority from U.S. Provisional Patent Application No. 63/022,169, filed May 8, 2020, and U.S. Provisional Patent Application No. 63/117,759, filed Nov. 24, 2020.

BACKGROUND

A user environment, such as a residence or an office building, for example, may be configured using various types of load control systems. A lighting control system may be used to control the lighting loads providing artificial light in the user environment. A motorized window treatment control system may be used to control the natural light provided to the user environment. A heating, ventilation, and air conditioning (HVAC) system may be used to control the temperature in the user environment.

Each load control system may include various control devices, including input devices and load control devices. The control devices may receive messages, which may include load control instructions, for controlling an electrical load from one or more of the input devices. The control devices may be capable of directly controlling an electrical load. The input devices may be capable of indirectly controlling the electrical load via the load control device. Examples of load control devices may include lighting control devices (e.g., a dimmer switch, an electronic switch, a ballast, or a light-emitting diode (LED) driver), a motorized window treatment, a temperature control device (e.g., a thermostat), a plug-in load control device, and/or the like. Examples of input devices may include remote control devices, occupancy sensors, daylight sensors, glare sensors, color temperature sensors, temperature sensors, and/or the like. Remote control devices may receive user input for performing load control.

SUMMARY

A load control system may include control devices configured to communicate via a network. The network may include router devices (e.g., a leader device and other router devices) for enabling communication of messages throughout the network. A control device may operate as a router device in the network. The control device may receive advertisement messages from the leader device. Based on the receipt of the advertisement messages from the leader device, the control device may determine the health of the network.

While the network is forming, the network may comprise one or more network partitions. Each network partition in the load control system may include a single leader device capable of coordinating certain network functionality. A single control device may take the role of the leader device in a network partition. When the leader device fails to communicate advertisement messages to other control devices that are operating as router devices in the network within a predefined period of time, the router devices may detach from the network partition and begin network reformation.

To prevent the delay that may be associated with network reformation, one or more router devices may be identified as backup-leader devices to take over operation as the leader device on a network partition in the event the present leader device is lost. The one or more router devices may be identified as backup-leader devices based on backup-leader criteria. For example, a router device may identify itself as a backup-leader device based on the link quality of a network communication link between the router device and the present leader device and/or its router identifier or other unique identifier.

A router device that is identified as being a backup-leader device on the network may determine to begin operating as the leader device on the network when the router device fails to receive an advertisement message from the leader device after a first threshold period of time. The first threshold period of time may be a time period within which the router device is supposed to receive one or more advertisement messages. The first threshold period of time may be less than a second threshold period of time after which other control devices in the network may begin to detach from the network. The ability of the backup-leader device to detect that the leader device fails to transmit advertisement messages and begin operating as the leader device on the network prior to the other devices detaching from the network may preserve the network.

The quality of a control device's network communication links with other devices may be considered when assigning the control device a role. For example, networks may enter a router optimization mode to optimize the locations of the router devices in the network (e.g., to adjust the control devices that are assigned the role of a router device). A router optimization mode may be initiated by a user via an application running on a network device. Also, or alternatively, the router optimization mode may be triggered periodically or by one of the control devices in the network detecting a change in the quality of network communications.

During a router optimization mode, the control devices that are communicating over the network may transmit (e.g. via unicast, multicast, and/or broadcast) one or more optimization messages. The control devices that receive these optimization messages may measure and store a communication quality metric of the optimization message along with an indication of the device that transmitted the optimization message (e.g., optimization data). This optimization data may identify the number and quality of network communication links that a control device has established on the network. Each of the control devices may then transmit their respective optimization data to another device (e.g., a system controller) that processes the optimization data.

The system controller, or another control device on the network, may process and analyze the optimization data to generate optimized network data. The optimized network data may include a router list, which may, for example, indicate one or more control devices to be assigned to the role of router device in the network. For example, the optimized network data may be used to determine the optimal role of a control device (e.g., to determine optimal locations for the router devices of the network). For example, the system controller may process and analyze the optimization data to determine the number of connections each control device has above a defined quality threshold (e.g., connections having a communication quality metric above a defined threshold). The control devices having a greater number of connections above the defined quality threshold may be assigned as router devices in the network.

In order to generate the optimized network data, the system controller may generate a preferred connections list for each of the control devices communicating over the network. The preferred connections list may, for example, include a list of connections for each of the control devices communicating over the network that have a communication quality metric above a preferred target quality threshold. For example, the connections may represent potential attachment links between a respective control device and other control devices communicating over the network. The system controller may select the one or more control devices to be included in the router list based on the preferred connections list for each of the control devices communicating over the network.

The system controller may identify that the preferred connection list for a first control device has a greatest number of devices of each of the preferred connections lists for the plurality of control devices. The system controller may select the first control device as one of the control devices to be included in the router list for being assigned the role of router device, for example, based on the preferred connection list for the first control device having the greatest number of devices. The system controller may select a leader device the from the control devices to be included in the router list. For example, the control device may be selected as the leader device based on having the greatest number of devices in the preferred connection list.

The system controller may initialize each of the control devices communicating over the network as being an unconnected device in a virtual network. After a given control device is selected as being included in the router list, the system controller may add that control device and each control device in the preferred connection list for that first control device to a connected list. For example, the connected list may indicate connected devices in the virtual network. The system controller may continue to add control devices to the connected list (e.g., the virtual network) until no more control devices remain.

The system controller may generate a secondary connections list for one or more of the control devices communicating over the network. For example, the secondary connections list for a given control device may comprises a list of connections that control device that have a communication quality metric above a secondary target quality threshold. The secondary target quality threshold may be a lower threshold than the preferred target quality threshold. The system controller may further select control devices to be included in the router list based on a number of unconnected devices in the secondary connections list for the control devices.

The system controller may generate a tertiary connections list for one or more of the control devices communicating over the network. The tertiary connections list may comprise a list of connections for each of the one or more control devices that have a communication quality metric above a tertiary target quality threshold. For example, the tertiary target quality threshold may be a lower threshold than the secondary target quality threshold. The system controller may select control devices to be included in the router list based on a number of unconnected devices in the tertiary connections list for the control devices.

BRIEF DESCRIPTION OF THE DRAWINGS

FIG. 2F is a table that illustrates example link costs that may correspond to different link qualities.

DETAILED DESCRIPTION

Figure 1A:
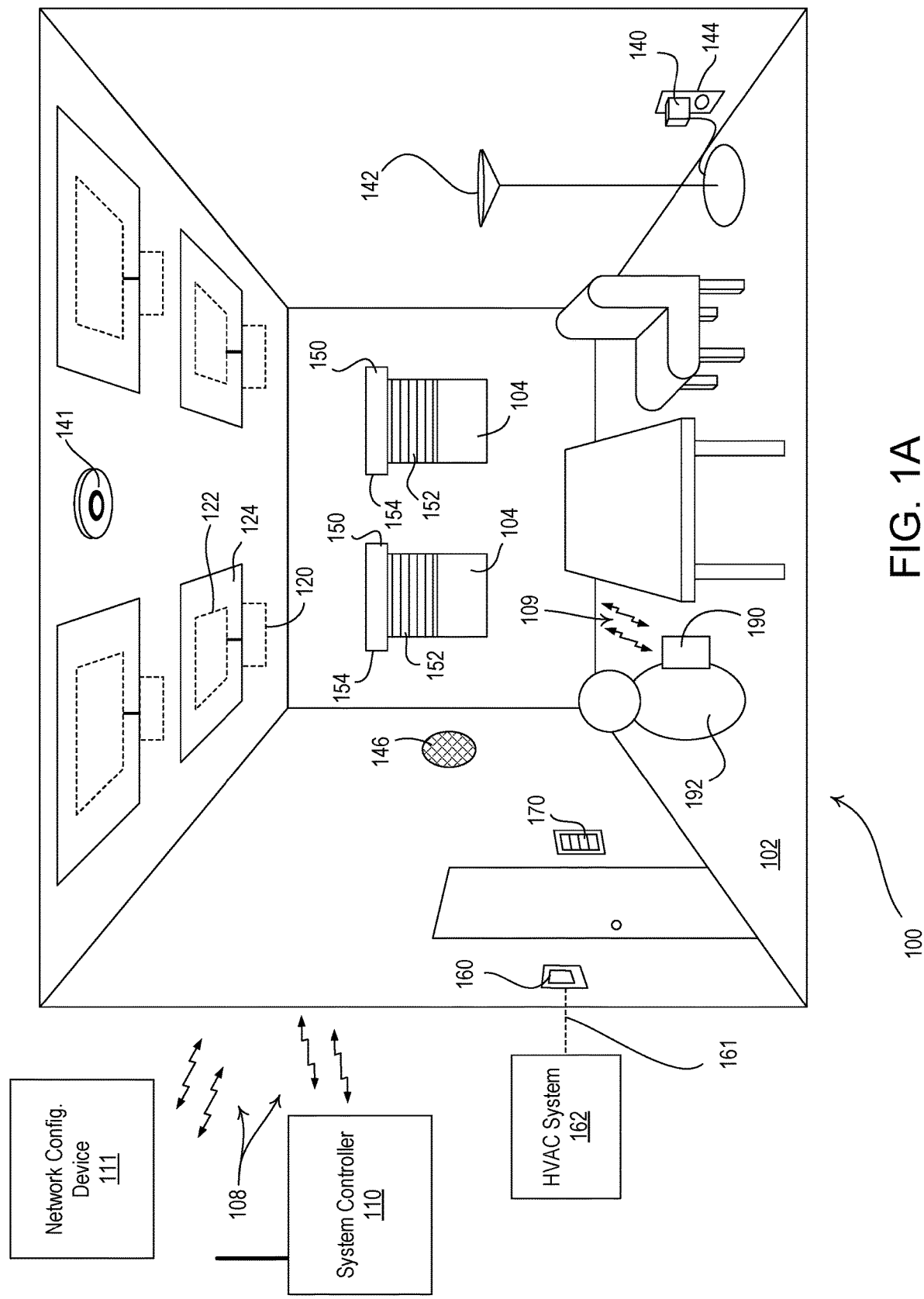
FIG. 1A is a diagram of an example load control system.

FIG. 1A is a diagram of an example load control system 100 for controlling the amount of power delivered from an alternating-current (AC) power source (not shown) to one or more electrical loads. The load control system 100 may be installed in a load control environment 102. The load control environment 102 may include a space in a residential or commercial building. For example, the load control system 100 may be installed in one or more rooms on one or more floors in the building.

The load control system 100 may comprise a plurality of control devices. The control devices may include load control devices that are configured to control one or more electrical loads in the load control environment 102 (also referred to as a user environment). For example, the load control devices may control the one or more electrical loads in response to input from one or more input devices or other devices in the load control system 100.

The load control devices in the load control system 100 may include lighting control devices. For example, the load control system 100 may include lighting control devices 120 for controlling lighting loads 122 in a corresponding lighting fixture 124. The lighting control devices 120 may comprise light-emitting diode (LED) drivers and the lighting loads 122 may comprise LED light sources. While each lighting fixture 124 is shown having a single lighting load 122, each lighting fixture may comprise one or more individual light sources (e.g., lamps and/or LED emitters) that may be controlled individually and/or in unison by the respective lighting control device. Though an LED driver is provided as an example lighting control device, other types of lighting control devices may be implemented as load control devices in the load control system 100. For example, the load control system 100 may comprise dimmer switches, electronic dimming ballasts for controlling fluorescent lamps, or other lighting control devices for controlling corresponding lighting loads. The lighting control device 120 may be configured to directly control an amount of power provided to the lighting load 122. The lighting control device 120 may be configured to receive (e.g., via wired or wireless communications) messages via radio-frequency (RF) signals 108, 109 and to control the lighting load 122 in response to the received messages. One will recognize that lighting control device 120 and lighting load 122 may be integral and thus part of the same fixture or bulb, for example, or may be separate.

The load control devices in the load control system 100 may comprise one or more appliances that are able to receive the RF signals 108 (e.g., wireless signals) for performing load control. In an example, the load control system may include a speaker 146 (e.g., part of an audio/visual or intercom system), which is able to generate audible sounds, such as alarms, music, intercom functionality, etc. in response to RF signals 108.

The load control devices in the load control system 100 may comprise one or more daylight control devices, e.g., motorized window treatments 150, such as motorized cellular shades, for controlling the amount of daylight entering the load control environment 102. Each motorized window treatment 150 may comprise a window treatment fabric 152 hanging from a headrail 154 in front of a respective window 104. Each motorized window treatment 150 may further comprise a motor drive unit (not shown) located inside of the headrail 154 for raising and lowering the window treatment fabric 152 for controlling the amount of daylight entering the load control environment 102. The motor drive units of the motorized window treatments 150 may be configured to receive messages via the RF signals 108 and adjust the position of the respective window treatment fabric 152 in response to the received messages. For example, the motorized window treatments may be battery-powered. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Pat. No. 9,488,000, issued Nov. 8, 2016, entitled INTEGRATED ACCESSIBLE BATTERY COMPARTMENT FOR MOTORIZED WINDOW TREATMENT, the entire disclosures of which are hereby incorporated by reference.

The load control devices in the load control system 100 may comprise a plug-in load control device 140 for controlling a plug-in electrical load, e.g., a plug-in lighting load (such as a floor lamp 142 or a table lamp) and/or an appliance (such as a television or a computer monitor). For example, the floor lamp 142 may be plugged into the plug-in load control device 140. The plug-in load control device 140 may be plugged into a standard electrical outlet 144 and thus may be coupled in series between the AC power source and the plug-in lighting load. The plug-in load control device 140 may be configured to receive messages via the RF signals 108 and to turn on and off or adjust the intensity of the floor lamp 142 in response to the received messages.

The load control devices in the load control system 100 may comprise one or more temperature control devices, e.g., a thermostat 160 for controlling a room temperature in the load control environment 102. The thermostat 160 may be coupled to a heating, ventilation, and air conditioning (HVAC) system 162 via a control link 161 (e.g., an analog control link or a wired digital communication link). The thermostat 160 may be configured to wirelessly communicate messages with a controller of the HVAC system 162. The thermostat 160 may comprise a temperature sensor for measuring the room temperature of the load control environment 102 and may control the HVAC system 162 to adjust the temperature in the room to a setpoint temperature. The load control system 100 may comprise one or more wireless temperature sensors (not shown) located in the load control environment 102 for measuring the room temperatures. The HVAC system 162 may be configured to turn a compressor on and off for cooling the load control environment 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the load control environment 102. The thermostat 160 may be configured to receive messages via the RF signals 108 and adjust heating, ventilation, and cooling in response to the received messages.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a controllable electrical receptacle, or controllable power strip for controlling one or more plug-in loads; a motor control unit for controlling a motor load, such as a ceiling fan or an exhaust fan; a drive unit for controlling a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and/or an alternative energy controller.

The load control system 100 may comprise one or more input devices capable of receiving an input event for controlling one or more load control devices in the load control system 100. The input devices and the load control devices may be collectively referred to as control devices in the load control system 100. The input devices in the load control system 100 may comprise one or more remote control devices, such as a remote control device 170. The remote control device may be battery-powered. The remote control device 170 may be configured to transmit messages via RF signals 108 to one or more other devices in the load control system 100 in response to an input event, such as an actuation of one or more buttons or a rotation of a rotary knob of the remote control device 170. For example, the remote control device 170 may transmit messages to the lighting control device 120, the plug-in load control device 140, the motorized window treatments 150, and/or the temperature control device 160 via the RF signals 108 in response to actuation of one or more buttons located thereon. The remote control device 170 may also communicate with other devices in the load control system 100 via a wired communication link. In response to an input event at the remote control device 170, a devices to which the remote control device 170 is wired may be triggered to transmit messages to one or more other devices in the load control system 100. The remote control device 170 may comprise a keypad. In another example, the remote control device 170 may comprise a rotary knob configured to transmit messages to one or more other devices in response to a rotation on the rotary knob (e.g., rotation of a predefined distance or for a predefined period of time). The remote control device 170 may be mounted to a structure, such as a wall, a toggle actuator of a mechanical switch, or a pedestal to be located on a horizontal surface. In another example, the remote control device 170 may be handheld. The remote control device 170 may provide feedback (e.g., visual feedback) to a user of the remote control device 170 on a visual indicator, such as a status indicator. The status indicator may be illuminated by one or more light emitting diodes (LEDs) for providing feedback. The status indicator may provide different types of feedback. The feedback may include feedback indicating actuations by a user or other user interface event, a status of electrical loads being controlled by the remote control device 170, and/or a status of the load control devices being controlled by the remote control device 170. The feedback may be displayed in response to user interface event and/or in response to messages received that indicate the status of load control devices and/or electrical loads. Examples of battery-powered remote control devices are described in greater detail in commonly-assigned U.S. Pat. No. 8,330,638, issued. Dec. 11, 2012, entitled WIRELESS BATTERY-POWERED REMOTE CONTROL HAVING MULTIPLE MOUNTING MEANS, and U.S. Patent Application Publication No. 2012/0286940, published Nov. 15, 2012, entitled CONTROL DEVICE HAVING A NIGHT-LIGHT, the entire disclosures of which are hereby incorporated by reference.

The input devices of the load control system 100 may comprise one or more sensor devices, such as a sensor device 141. The sensor device 141 may be configured to transmit messages via the RF signals 108 to one or more other devices in the load control system 100 in response to an input event, such as a sensor measurement event. The sensor device 141 may also or alternatively be configured to transmit messages via a wired communication link to one or more other devices in the load control system 100 in response to an input event, such as a sensor measurement event. The sensor device 141 may operate as an ambient light sensor or a daylight sensor and may be capable of performing a sensor measurement event by measuring a total light intensity in the space around the sensor device 141. The sensor device 141 may transmit messages including the measured light level or control instructions in response to the measured light level via the RF signals 108. Examples of RF load control systems having daylight sensors are described in greater detail in commonly assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY POWERED DAYLIGHT SENSOR, the entire disclosures of which are hereby incorporated by reference.

The sensor device 141 may operate as an occupancy sensor configured to detect occupancy and vacancy conditions in the load control environment 102. The sensor device 141 may be capable of performing the sensor measurement event by measuring an occupancy condition or a vacancy condition in response to occupancy or vacancy, respectively, of the load control environment 102 by the user 192. For example, the sensor device 141 may comprise an infrared (IR) sensor capable of detecting the occupancy condition or the vacancy condition in response to the presence or absence, respectively, of the user 192. The sensor device 141 may transmit messages including the occupancy conditions or vacancy conditions, or control instructions generated in response to the occupancy/vacancy conditions, via the RF signals 108. Again, the sensor device 141 may also or alternatively transmit messages including the occupancy conditions or vacancy conditions, or control instructions generated in response to the occupancy/vacancy conditions via a wired communication link. Examples of load control systems having occupancy and vacancy sensors are described in greater detail in commonly-assigned U.S. Pat. No. 8,228,184, issued Jul. 24, 2012, entitled BATTERY-POWERED OCCUPANCY SENSOR, U.S. Pat. No. 8,009, 042, issued Aug. 30, 2011 Sep. 3, 2008, entitled RADIO-FREQUENCY LIGHTING CONTROL SYSTEM WITH OCCUPANCY SENSING, and U.S. Pat. No. 8,199,010, issued Jun. 12, 2012, entitled METHOD AND APPARATUS FOR CONFIGURING A WIRELESS SENSOR, the entire disclosures of which are hereby incorporated by reference.

The sensor device 141 may operate as a visible light sensor (e.g., including a camera or other device capable of sensing visible light). The sensor device 141 may be capable of performing the sensor measurement event by measuring an amount of visible light within the load control environment 102. For example, the sensor device 141 may comprise a visible light sensing circuit having an image recording circuit, such as a camera, and an image processing circuit. The image processing circuit may comprise a digital signal processor (DSP), a microprocessor, a programmable logic device (PLD), a microcontroller, an application specific integrated circuit (ASIC), a field-programmable gate array (FPGA), or any suitable processing device capable of processing images or levels of visible light. The sensor device 141 may be positioned towards the load control environment 102 to sense one or more environmental characteristics in the load control environment 102. The image recording circuit of the sensor device 141 may be configured to capture or record an image. The image recording circuit of the sensor device 141 may provide the captured image to the image processor. The image processor may be configured to process the image into one or more sensed signals that are representative of the sensed environmental characteristics. The sensed environmental characteristics may be interpreted from the sensed signals by the control circuit of the sensor device 141 or the sensed signals may be transmitted to one or more other devices via the RF signals 108, 109 (e.g., a computing device in the load control environment) for interpreting the sensed environmental characteristics. For example, the sensed environmental characteristics interpreted from the sensed signals may comprise an occurrence of movement, an amount of movement, a direction of movement, a velocity of movement, a counted number of occupants, an occupancy condition, a vacancy condition, a light intensity, a color of visible light, a color temperature of visible light, an amount of direct sunlight penetration, or another environmental characteristic in the load control environment 102. In another example, the sensor device 141 may provide a raw image or a processed (e.g., preprocessed) image to one or more other devices (e.g., computing devices) in the load control system 100 for further processing. The sensor device 141 may operate as a color temperature sensor when sensing the color temperature of the visible light. Examples of load control systems having visible light sensors are described in greater detail in commonly-assigned. U.S. Pat. No. 10,264,651, issued Apr. 16, 2019, entitled. LOAD CONTROL SYSTEM HAVING A VISIBLE LIGHT SENSOR, and U.S. Patent App. Pub. No. 2018/0167547, published Jun. 14, 2018, entitled CONFIGURATION OF A VISIBLE LIGHT SENSOR, the entire disclosures of which are hereby incorporated by reference.

The sensor device 141 may be external to the lighting fixtures 124 (e.g., affixed or attached to a ceiling or a wall of the load control environment 102). The sensor device 141 may be positioned towards the load control environment 102 and may be capable of performing sensor measurement events in the load control environment 102. In one example, the sensor device 141 may be affixed or attached to a window 104 of the load control environment 102 and operate as a window sensor that is capable performing sensor measurement events on light that is entering the load control environment 102 through the window 104. For example, the sensor device 141 may comprise an ambient light sensor capable of detecting when sunlight is directly shining into the sensor device 141, is reflected onto the sensor device 141, and/or is blocked by external means, such as clouds or a building based on the measured light levels being received by the sensor device 141 from outside the window. The sensor device 141 may send messages indicating the measured light level. Though illustrated as being external to the lighting fixtures 124, one or more sensor devices 141 may be mounted to one or more of the lighting fixtures 124 (e.g., on a lower or outward-facing surface of the lighting fixture 124). For example, one or more sensor devices 141 may be electrically coupled to a control circuit or a load control circuit of the load control devices 120 for performing control in response to the sensor measurement events of the sensor devices 141.

The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The input devices and the load control devices may be configured to communicate messages between one another on a communication link within the load control system 100. For example, the input devices and the load control devices may be capable of communicating messages directly to one another via the RF signals 108. The RF signals 108 may be transmitted using a proprietary RF protocol, such as the CLEAR CONNECT protocol (e.g., CLEAR CONNECT TYPE A and/or CLEAR CONNECT TYPE X protocols). Alternatively, the RF signals 108 may be transmitted using a different RF protocol, such as, a standard protocol, for example, one of WIFI, cellular (e.g., 3G, 4G LTE, 5G NR, or other cellular protocol), BLUETOOTH, BLUETOOTH LOW ENERGY (BLE), ZIGBEE, Z-WAVE, THREAD, KNX-RF, ENOCEAN RADIO protocols, or a different protocol. In an example, the input devices may transmit messages to the load control devices via the RF signals 108 that comprise input events (e.g., button presses, sensor measurement events, or other input event) or control instructions generated in response to the input events for performing control of the electrical loads controlled by the load control devices. Though communication links may be described as a wireless communication links, wired communication links may similarly be implemented for enabling communications herein.

For devices in the load control system 100 to recognize messages directed to the device and/or to which to be responsive, the devices may be associated with one another by performing an association procedure. For example, for a load control device to be responsive to messages from an input device, the input device may first be associated with the load control device. As one example of an association procedure, devices may be put in an association mode for sharing a unique identifier for being associated with and/or stored at other devices in the load control system 100. For example, an input device and a load control device may be put in an association mode by the user 192 actuating a button on the input device and/or the load control device. The actuation of the button on the input device and/or the load control device may place the input device and/or the load control device in the association mode for being associated with one another. In the association mode, the input device may transmit an association message(s) to the load control device (directly or through one or more other devices as described herein). The association message from the input device may include a unique identifier of the input device. The load control device may locally store the unique identifier of the input device in association information, such that the load control device may be capable of recognizing messages (e.g., subsequent messages) from the input device that may include load control instructions or commands. The association information stored at the load control device may include the unique identifiers of the devices with which the load control device is associated. The load control device may be configured to respond to the messages from the associated input device by controlling a corresponding electrical load according to the load control instructions received in the messages. The input device may also store the unique identifier of the load control device with which it is being associated in association information stored locally thereon. A similar association procedure may be performed between other devices in the load control system 100 to enable each device to perform communication of messages with associated devices. This is merely one example of how devices may communicate and be associated with one another and other examples are possible.

According to another example, one or more devices may receive system configuration data (e.g., or subsequent updates to the system configuration data) that is uploaded to the devices and that specifies the association information comprising the unique identifiers of the devices for being associated. The system configuration data may comprise a load control dataset that defines the devices and operational settings of the load control system 100. The system configuration data may include information about the devices in the user environment 102 and/or the load control system 100. The system configuration data may include association information that indicates defined associations between devices in the load control system 100. The association information may be updated using any of the association procedures described herein.

One or more intermediary devices may also maintain association information that includes the unique identifiers that make up the associations of other devices in the load control system 100. For example, the input devices and the load control devices may communicate on a communication link in the load control system 100 through one or more other intermediary devices, such as router devices or other devices in a network. The intermediary devices may comprise input devices, load control devices, a central processing device, or another intermediary device capable of enabling communication between devices in the load control system. The association information that is maintained on the intermediary devices may comprise the unique identifiers of the devices that are associated with one another for identifying and/or enabling communication of messages between devices in the load control system 100. For example, an intermediary device may identify the unique identifiers being transmitted in association messages between devices during the association procedure and store the unique identifiers of the devices as an association in the association information. The intermediary devices may use the association information for monitoring and/or routing communications on a communication link between devices in the load control system 100. In another example, the association information of other devices may be uploaded to the intermediary device and/or communicated from the intermediary device to the other devices for being locally stored thereon (e.g., at the input devices and/or load control devices).

The load control system 100 may comprise a system controller 110. The system controller 100 may operate as an intermediary device, as described herein. For example, the system controller 110 may operate as a central processing device for one or more other devices in the load control system 100. The system controller 110 may operable to communicate messages to and from the control devices (e.g., the input devices and the load control devices). For example, the system controller 110 may be configured to receive messages from the input devices and transmit messages to the load control devices in response to the messages received from the input devices. The system controller 110 may route the messages based on the association information stored thereon. The input devices, the load control devices, and the system controller 110 may be configured to transmit and receive the RF signals 108 and/or over a wired communication link. The system controller 110 may be coupled to one or more networks, such as a wireless or wired local area network (LAN), e.g., for access to the Internet. The system controller 110 may be wirelessly connected to the networks using one or more wireless protocols. The system controller 110 may be coupled to the networks via a wired communication link, such as a network communication bus (e.g., an Ethernet communication link).

The system controller 110 may be configured to communicate via the network with one or more computing devices, e.g., a mobile device 190, such as, a personal computing device and/or a wearable wireless device. The mobile device 190 may be located on an occupant 192, for example, may be attached to the occupant's body or clothing or may be held by the occupant. The mobile device 190 may be characterized by a unique identifier (e.g., a serial number or address stored in memory) that uniquely identifies the mobile device 190 and thus the occupant 192. Examples of personal computing devices may include a smart phone, a laptop, and/or a tablet device. Examples of wearable wireless devices may include an activity tracking device, a smart watch, smart clothing, and/or smart glasses. In addition, the system controller 110 may be configured to communicate via the network with one or more other control systems (e.g., a building management system, a security system, etc.).

The mobile device 190 may be configured to transmit messages to the system controller 110, for example, in one or more Internet Protocol packets. For example, the mobile device 190 may be configured to transmit messages to the system controller 110 over the LAN and/or via the Internet. The mobile device 190 may be configured to transmit messages over the Internet to an external service, and then the messages may be received by the system controller 110. The mobile device 190 may transmit and receive RF signals 109. The RF signals 109 may be the same signal type and/or transmitted using the same protocol as the RF signals 108. Alternatively, or additionally, the mobile device 190 may be configured to transmit RF signals according to another signal type and/or protocol. The load control system 100 may comprise other types of computing devices coupled to the network, such as a desktop personal computer (PC), a wireless-communication-capable television, or any other suitable Internet-Protocol-enabled device. Examples of load control systems operable to communicate with mobile and/or computing devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the load control system 100 may be programmed and configured using, for example, the mobile device 190 or other computing device (e.g., when the mobile device is a personal computing device). The mobile device 190 may execute a graphical user interface (GUI) configuration software for allowing a user 192 to program how the load control system 100 will operate. For example, the configuration software may run as a PC application or a web interface. The configuration software and/or the system controller 110 (e.g., via instructions from the configuration software) may generate the system configuration data that may include the load control dataset that defines the operation of the load control system 100. For example, the load control dataset may include information regarding the operational settings of different load control devices of the load control system (e.g., the lighting control device 120, the plug-in load control device 140, the motorized window treatments 150, and/or the thermostat 160). The load control dataset may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS.

The load control system 100 may also include a network configuration device 111. The network configuration device 111 may be configured to communicate over the network through which the control devices of the load control system 100 communicate with each other. The network configuration device 111 may be configured to administer or oversee the network on which control devices are communicating. For example, the network configuration device 111 may be configured to assign roles to the control devices on the network during initial setup and commissioning or during an optimization procedure for optimizing network communications, as further described herein. The network configuration device 111 may be a temporary devices of the load control system 100. For example, the network configuration device 111 may temporarily join the network of the load control system 100 and later be removed from the network of the load control system 100 (e.g., after performing one or more of the procedures described herein). Further, the network configuration device 111 may be a physically installed at the load control system 100, or an external device that accesses the load control system 100 via the internet and/or an external network or cloud. As described herein, the network configuration device 111 may be a distinct device added to the network or a role that is assigned to a given device in the load control system 100.

The network configuration device 111 may be configured to perform one or more of the network optimization procedures further described herein. For example, the network configuration device 111 may be added to and/or installed at the load control system 100 to perform one or more of the network optimization procedures described herein, which may include joining and/or communicating over the network. The network configuration device 111 may then be removed and/or uninstalled from the load control system, for example, after completion of the network optimization procedure. In a scenario in which the network configuration device may access the load control system 100 via the internet or an external or cloud, the network configuration device 111 may receive information remotely that may be used to perform the network optimization procedures described herein.

Figure 1B:
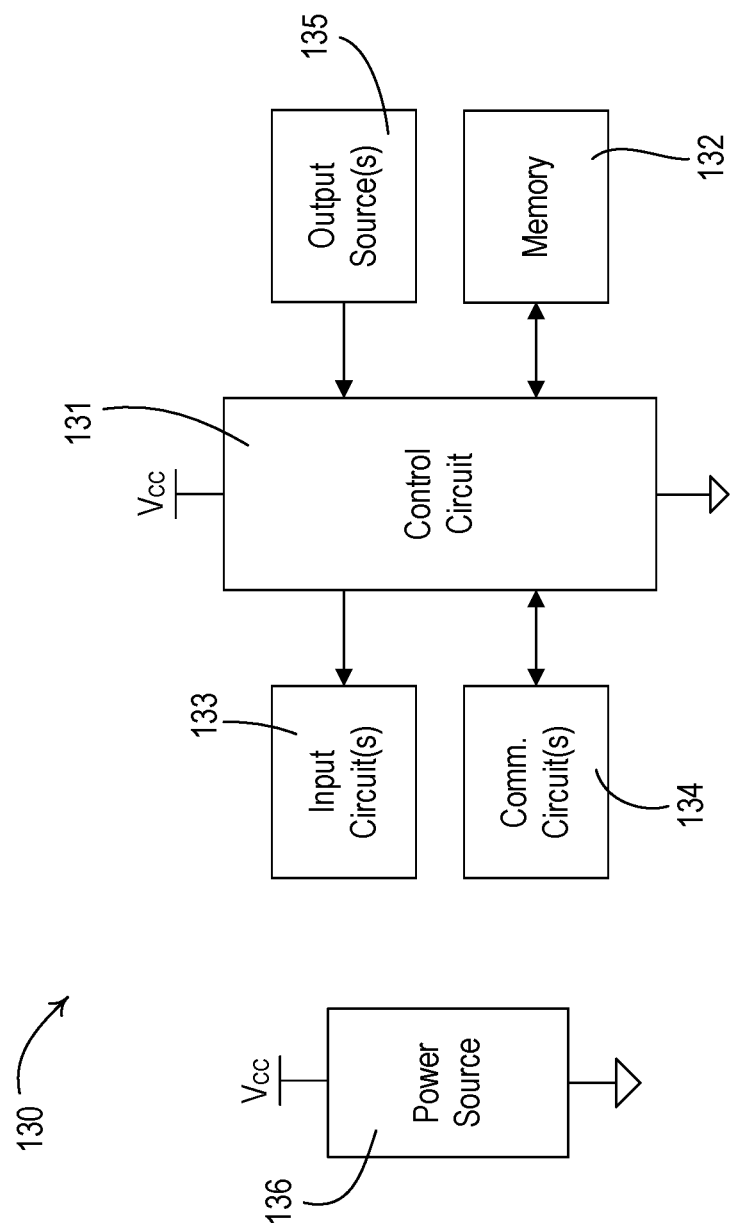
FIG. 1B is a block diagram illustrating an example of a device capable of processing and/or communication in a load control system, such as the load control system of FIG. 1A.

FIG. 1B is a block diagram illustrating an example of a device 130 capable of processing and/or communication in a load control system, such as the load control system 100 of FIG. 1A. In an example, the device 130 may be a control device capable of transmitting or receiving messages. The control device may be in an input device, such as a sensor device 141 (e.g., an occupancy sensor or another sensor device), the remote control device 170, or another input device capable of transmitting messages to load control devices or other devices in the load control system 100. The device 130 may be a computing device, such as the mobile device 190, the system controller 110, the network configuration device 111, or another computing device in the load control system 100.

The device 130 may include a control circuit 131 for controlling the functionality of the device 130. The control circuit 131 may include one or more general purpose processors, special purpose processors, conventional processors, digital signal processors (DSPs), microprocessors, integrated circuits, a programmable logic device (PLD), application specific integrated circuits (ASICs), or the like. The control circuit 131 may perform signal coding, data processing, image processing, power control, input/output processing, or any other functionality that enables the device 131 to perform as one of the devices of the load control system (e.g., load control system 100) described herein.

The control circuit 131 may be communicatively coupled to a memory 132 to store information in and/or retrieve information from the memory 132. The memory 132 may comprise a computer-readable storage media or machine-readable storage media that maintains a device dataset of associated device identifiers, network information, and/or computer-executable instructions for performing as described herein. For example, the memory 132 may comprise computer-executable instructions or machine-readable instructions that include one or more portions of an optimization procedure as described herein for optimizing communications on a network. The control circuit 131 may access the instructions from memory 132 for being executed to cause the control circuit 131 to operate as described herein, or to operate one or more devices as described herein. The memory 132 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 132 may be implemented as an external integrated circuit (IC) or as an internal circuit of the control circuit 131.

The device 130 may include one or more communication circuits 134 that are in communication with the control circuit 131 for sending and/or receiving information as described herein. The communication circuit 134 may perform wireless and/or wired communications. The communication circuit 134 may be a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 134 may be configured to communicate via power lines (e.g., the power lines from which the device 130 receives power) using a power line carrier (PLC) communication technique. The communication circuit 134 may be a wireless communication circuit including one or more RF or infrared (IR) transmitters, receivers, transceivers, or other communication circuits capable of performing wireless communications.

Though a single communication circuit 134 may be illustrated, multiple communication circuits may be implemented in the device 130. The device 130 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol, such as the CLEAR CONNECT (e.g., CLEAR CONNECT A and/or CLEAR CONNECT X) and/or THREAD protocols), and the second communication circuit may be configured to communicate via a second wireless communication link (e.g., a short-range or direct wireless communication link) using a second wireless protocol (e.g., a short-range wireless communication protocol, such as the BLUETOOTH and/or BLUETOOTH LOW ENERGY (BLE) protocols).

One of the communication circuits 134 may comprise a beacon transmitting and/or receiving circuit capable of transmitting and/or receiving beacon messages via a short-range RF signal. The control circuit 131 may communicate with beacon transmitting circuit (e.g., a short-range communication circuit) to transmit beacon messages. The beacon transmitting circuit may communicate beacon messages via RF communication signals, for example. The beacon transmitting circuit may be a one-way communication circuit (e.g., the beacon transmitting circuit is configured to transmit beacon messages) or a two-way communication circuit capable of receiving information on the same network and/or protocol on which the beacon messages are transmitted (e.g., the beacon transmitting circuit is configured to transmit and receive beacon messages). The information received at the beacon transmitting circuit may be provided to the control circuit 131.

The control circuit 131 may be in communication with one or more input circuits 133 from which inputs may be received. The input circuits 133 may be included in a user interface for receiving inputs from the user. For example, the input circuits 133 may include an actuator (e.g., a momentary switch that may be actuated by one or more physical buttons) that may be actuated by a user to communicate user input or selections to the control circuit 131. In response to an actuation of the actuator, the control circuit 131 may enter an association mode, transmit association messages from the control device 130 via the communication circuits 134, and/or receive other information (e.g., control instructions for performing control of an electrical load). In response to an actuation of the actuator may perform control by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 131 of the device 130 may enter the association mode, transmit an association message, transmit control instructions, or perform other functionality in response to an actuation or input from the user on the touch sensitive surface.

The input circuits 133 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the device 130). The control circuit 131 may receive information from the one or more input circuits 133 and process the information for performing functions as described herein.

The control circuit 131 may be in communication with one or more output sources 135. The output sources 135 may include one or more light sources (e.g., LEDs) for providing indications (e.g., feedback) to a user. The output sources 135 may include a display (e.g., a visible display) for providing information (e.g., feedback) to a user. The control circuit 131 and/or the display may generate a graphical user interface (GUI) generated via software for being displayed on the device 130 (e.g., on the display of the device 130).

The user interface of the device 130 may combine features of the input circuits 133 and the output sources 135. For example, the user interface may have buttons that actuate the actuators of the input circuits 133 and may have indicators (e.g., visible indicators) that may be illuminated by the light sources of the output sources 135. In another example, the display and the control circuit 131 may be in two-way communication, as the display may display information to the user and include a touch screen capable of receiving information from a user. The information received via the touch screen may be capable of providing the indicated information received from the touch screen as information to the control circuit 131 for performing functions or control.

Each of the hardware circuits within the device 130 may be powered by a power source 136. The power source 136 may include a power supply configured to receive power from an alternating-current (AC) power supply or a direct-current (DC) power supply, for example. In addition, the power source 136 may comprise one or more batteries. The power source 136 may produce a supply voltage $V_{CC}$ for powering the hardware within the device 130.

Figure 1C:
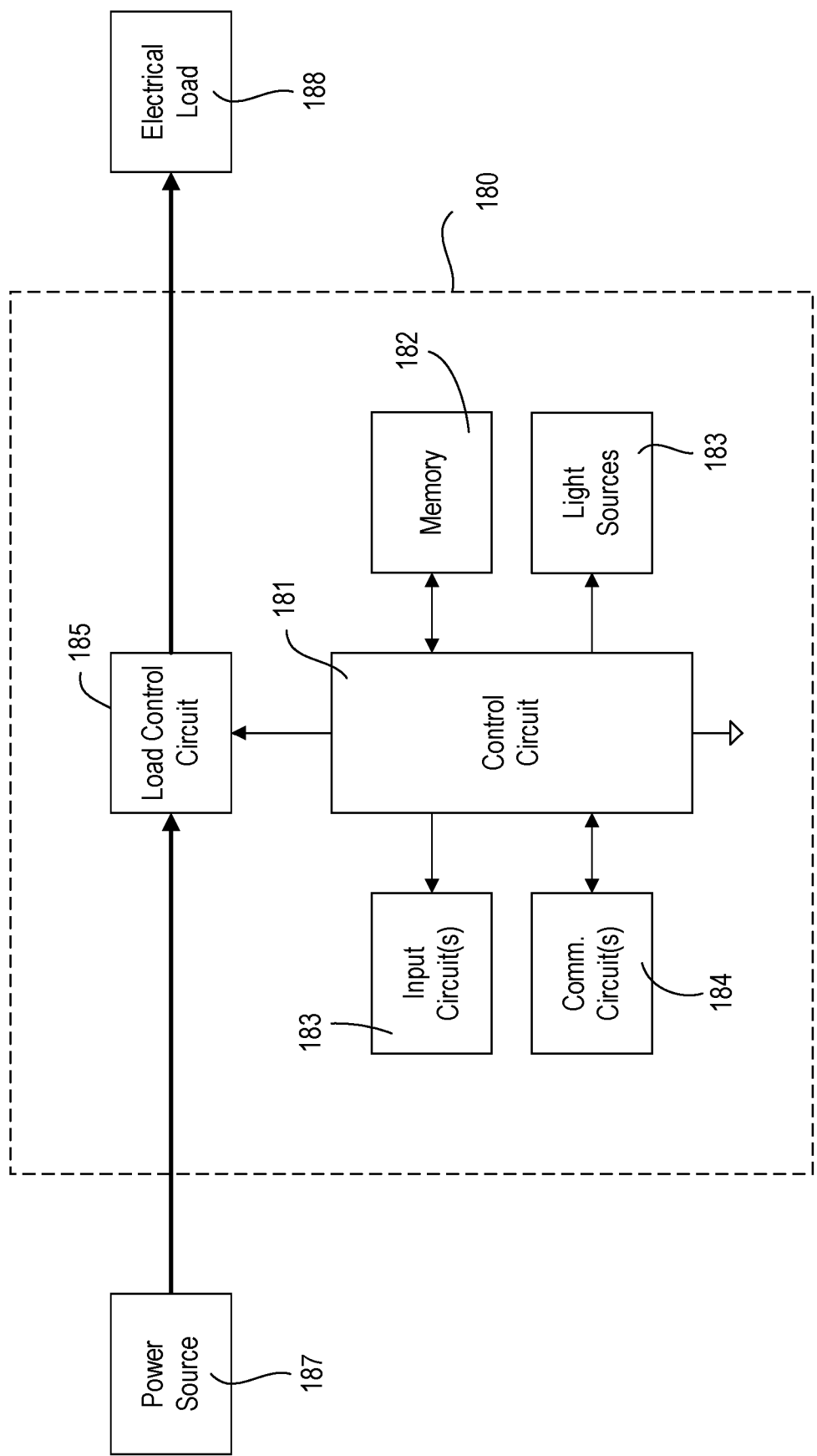
FIG. 1C is a block diagram illustrating an example of a load control device capable of operating in a load control system, such as the load control system of FIG. 1A.

FIG. 1C is a block diagram illustrating an example load control device 180. The load control device 180 may be a lighting control device (e.g., the lighting control device 120), a motorized window treatment (e.g., the motorized window treatments 150), a plug-in load control device (e.g., the plug-in load control device 140), a temperature control device (e.g., the temperature control device 160), a dimmer switch, an electronic switch, an electronic ballast for lamps, and/or another load control device.

The load control device 180 may include a control circuit 181 for controlling the functionality of the load control device 180. The control circuit 181 may include one or more general purpose processors, special purpose processors, conventional processors, digital signal processors (DSPs), microprocessors, integrated circuits, a programmable logic device (PLD), application specific integrated circuits (ASICs), or the like. The control circuit 181 may perform signal coding, data processing, image processing, power control, input/output processing, or any other functionality that enables the load control device 180 to perform as one of the devices of the load control system (e.g., load control system 100) described herein.

The load control device 180 may include a load control circuit 185 that may be electrically coupled in series between a power source 187 (e.g., an AC power source and/or a DC power source) and an electrical load 188. The control circuit 181 may be configured to control the load control circuit 185 for controlling the electrical load 188, for example, in response to received instructions. The electrical load 188 may include a lighting load, a motor load (e.g., for a ceiling fan and/or exhaust fan), an electric motor for controlling a motorized window treatment, a component of a heating, ventilation, and cooling (HVAC) system, a speaker, or any other type of electrical load.

The control circuit 181 may be communicatively coupled to a memory 182 to store information in and/or retrieve information from the memory 182. The memory 182 may comprise a computer-readable storage media or machine-readable storage media that maintains a device dataset of associated device identifiers, network information, and/or computer-executable instructions for performing as described herein. For example, the memory 182 may comprise computer-executable instructions or machine-readable instructions that include one or more portions of an optimization procedure as described herein for optimizing communications on a network. The control circuit 181 may access the instructions from memory 182 for being executed to cause the control circuit 181 to operate as described herein, or to operate one or more devices as described herein. The memory 182 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 182 may be implemented as an external integrated circuit (IC) or as an internal circuit of the control circuit 181.

The load control device 180 may include one or more communication circuits 184 that are in communication with the control circuit 181 for sending and/or receiving information as described herein. The communication circuit 184 may perform wireless and/or wired communications. The communication circuit 184 may be a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 184 may be configured to communicate via power lines (e.g., the power lines from which the load control device 180 receives power) using a power line carrier (PLC) communication technique. The communication circuit 184 may be a wireless communication circuit including one or more RF or IR transmitters, receivers, transceivers, or other communication circuits capable of performing wireless communications.

Though a single communication circuit 184 may be illustrated, multiple communication circuits may be implemented in the load control device 180. The load control device 180 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol, such as the CLEAR CONNECT (e.g., CLEAR CONNECT A and/or CLEAR CONNECT X) and/or THREAD protocols), and the second communication circuit may be configured to communicate via a second wireless communication link (e.g., a short-range or direct wireless communication link) using a second wireless protocol (e.g., a short-range wireless communication protocol, such as the BLUETOOTH and/or BLUETOOTH LOW ENERGY (BLE) protocols).

One of the communication circuits 184 may comprise a beacon transmitting and/or receiving circuit capable of transmitting and/or receiving beacon messages via a short-range RF signal. A control circuit 181 may communicate with beacon transmitting circuit (e.g., a short-range communication circuit) to transmit beacon messages. The beacon transmitting circuit may communicate beacon messages via RF communication signals, for example. The beacon transmitting circuit may be a one-way communication circuit (e.g., the beacon transmitting circuit is configured to transmit beacon messages) or a two-way communication circuit capable of receiving information on the same network and/or protocol on which the beacon messages are transmitted (e.g., the beacon transmitting circuit is configured to transmit and receive beacon messages). The information received at the beacon transmitting circuit may be provided to the control circuit 181.

The control circuit 181 may be in communication with one or more input circuits 183 from which inputs may be received. The input circuits 183 may be included in a user interface for receiving inputs from the user. For example, the input circuits 183 may include an actuator (e.g., a momentary switch that may be actuated by one or more physical buttons) that may be actuated by a user to communicate user input or selections to the control circuit 181. In response to an actuation of the actuator, the control circuit 181 may enter an association mode, transmit association messages from the load control device 180 via the communication circuits 184, and/or receive other information. In response to an actuation of the actuator may perform control by controlling the load control circuit 185 to control the electrical load 180, and/or by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 181 of the load control device 180 may enter the association mode, transmit an association message, control the load control circuit 185, transmit control instructions, or perform other functionality in response to an actuation or input from the user on the touch sensitive surface.

The input circuits 183 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the load control device 180). The control circuit 181 may receive information from the one or more input circuits 183 and process the information for performing functions as described herein.

The control circuit 181 may illuminate a light sources 183 (e.g., LEDs) to provide feedback to a user. The control circuit 181 may be operable to illuminate the light sources 183 different colors. The light sources 183 may be illuminate, for example, one or more indicators (e.g., visible indicators) of the load control device 180.

As described herein, a network may be used to facilitate communication between the respective devices (e.g., control devices and/or a system controller) of the load control system 100. For a respective control device to communicate via the network, the control device may join the network, for example, by initiating a commissioning procedure. The commission procedure may include a claiming procedure, a joining procedure, and/or an attachment procedure. The claiming procedure may be used to discover and claim control devices for being added to the network. For example, control devices in the load control system (e.g., the load control system 100 shown in FIG. 1A) may be claimed using a user's mobile device (e.g., the mobile device 190). Each control device may be claimed by a user's mobile device 190 for joining the network (e.g., via a joining procedure, as described herein), and/or attaching to other devices on the network (e.g., via an attachment procedure, as described herein). Each control device may transmit a beacon (e.g., a control device beacon) via a short-range wireless communication link. The mobile device 190 may discover (e.g., receive) beacons transmitted by the control devices in the load control system. Each beacon may include a unique beacon identifier of the control device that transmitted the respective beacon. The unique beacon identifier may include a unique device identifier (e.g., serial number) of the control device itself.

The mobile device 190 may identify one or more control device beacons from which a respective beacon was received at a communication quality metric (e.g., received signal strength indicator (RSSI) or other communication quality metric) above a predefined value. For example, the mobile device 190 may identify one or more of the beacons transmitting the beacons that are received having the strongest receives signal strength indicators, and the mobile device 190 may transmit a connection message to the control device(s). The control device may receive the connection message from the mobile device 190 may be configured to establish a connection (e.g., a two-way communication connection) with the mobile device 190.

The connection message may indicate to the control device that the control device has been selected for claiming. The connection message may operate as a claiming message, or a separate claiming message may be sent after the connection is established between the mobile device 190 and the control device. The claiming message may indicate that the control device has been claimed for being added to the network. In response to receiving the claiming message, the control device may transmit a claim confirmation message to the mobile device 190. The claim confirmation message may include a configuration information that may be used to join the control device to the network. For example, the configuration information may include a unique device identifier (e.g., serial number) of the control device and/or network credentials for joining a network. The network credentials may include a network key for the network, a network address for the control device (e.g., a network address) and/or a joiner identifier for the control device. The network address and/or the joining identifier may be used during the joining procedure to allow the control device to join the network.

The user 192 may continue to move the mobile device 190 around the load control environment 102 in which the load control system is installed to perform the claiming procedure with additional control devices. When the user 192 is done claiming control devices (e.g., the mobile device 190 has claimed each of the control devices or a portion of the control devices of the load control system), the mobile device 190 may upload the configuration information from the claimed devices to a central processing device, such as a system controller (e.g., the system controller 110). The uploaded configuration information may be used to identify the devices for being joined to the network. As described herein, the system controller 110 may be installed at the space being commissioned, or may be a remote computing device. Though the mobile device 190 is described as the device performing communications with the control device(s), other devices in the load control system 100 may perform similar communications with the control device(s) during the claiming procedure. For example, the system controller 110, the network configuration device 111, or another computing device in the load control system 100 may be implemented as described herein.

During the joining procedure, the control device may look for a network to join. For example, the control device may begin the joining procedure after being claimed using the claiming procedure. As described herein, during the joining procedure, the control device may transmit and/or receive joining messages (e.g., message to join a wireless network, such as joining request messages and/or joining response messages). As a result of the joining procedure, and as further described herein, the control device may be configured with a network key that may allow the device to send and/or receive messages over the network.

After the control device joins the network, the control device may, for example, attempt to attach to another device (e.g., a leader device or a router device) on the network to form the mesh network (e.g., formation of the network). In order to attach to another device on the network, the control device may send and receive a number of attachment messages via the network.

During formation of the network, a plurality of control devices may attempt to attach to another device on the network at the same or substantially the same time. As a result, multiple control devices may send messages to attach to another device on the network at the same or substantially the same time. When multiple devices send messages at the same or substantially the same time, messages may collide with each other, which may result in the messages failing to be received. In addition, the collision of messages during network formation may delay the completion of network formation, which may also delay the installation and/or operation of a load control system.

As the scale of a network installation increases (e.g., the number of devices attached to the network), the number of collisions that occur during network formation may increase. In addition, after a device continually fails to attach to the network (e.g., as a result of message collisions and/or lack of connectivity with an already formed network), the device may attempt to form another network (e.g., a network partition). The network partitions may communicate in parallel with one another, but may fail to communicate with each other (e.g., at least for a period of time and/or until the network partitions combine into a single network partition). For example, the devices attached to a first network partition may be unable to communicate with the devices attached to a second network partition. As communication links are established between devices in a location, each network may grow and one or more control devices in one network may join the other network. The devices that leave a network may cause undue processing delay for the devices that remain on the network, as the devices reconfigure and/or discover their roles in the network.

Figure 2A:
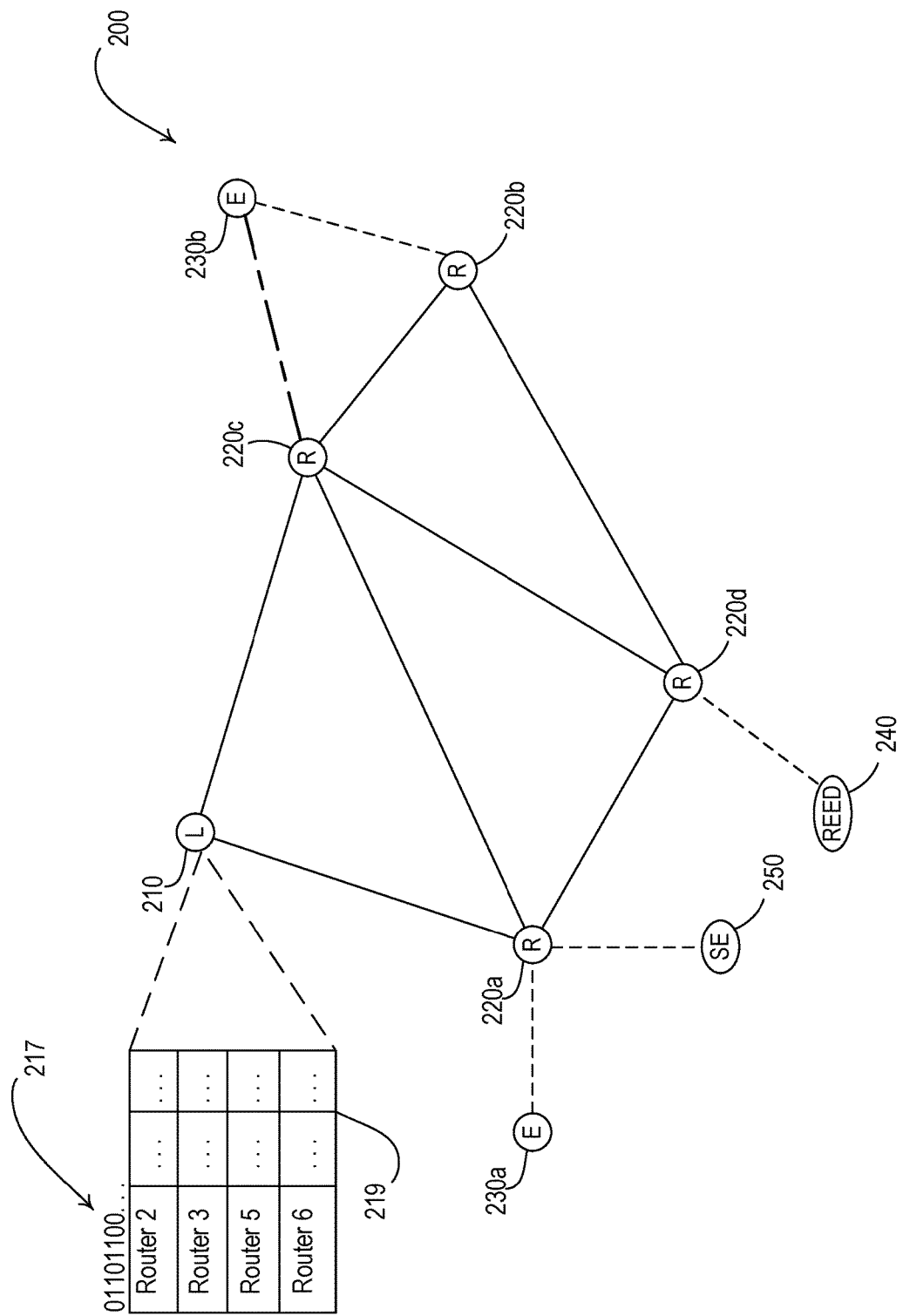
FIG. 2A is a diagram of an example network that may allow for communication between devices in the load control system of FIG. 1A.

FIG. 2A is an illustration of an example network 200 that may allow for communication between control devices in a load control system (e.g., the load control system 100). The network 200 may include any suitable network to facilitate communications in a load control system. For example, the network 200 may be a mesh network on which control devices communicate using a mesh network wireless communication protocol (e.g., the THREAD protocol or other suitable protocol). The various control devices of the load control system 100 may communicate with each other via the network 200. As shown in FIG. 2A, the network 200 may comprise a single network partition. In addition, the network 200 may be an example of a network partition (e.g., a subnetwork or subnet) within a larger network. For example, the network 200 may be an example of a network partition within a larger network composed of a plurality of network partitions. The network 200 is an example network and the techniques described herein may be applied to other networks, for example, that include more control devices or fewer control devices than the network 200.

The circled nodes of FIG. 2A may represent devices that are attached to other devices on the network 200 (e.g. the various control devices of the load control system 100). A control device that is attached to at least one other control device on the network 200 may communicate with the other control devices (e.g., that are attached to another control device on the network 200). Communication within the network 200 may be facilitated by the network communication links (e.g., attachments) established within the network 200. Referring to FIG. 2A, the network communication links between the devices may be indicated by lines (e.g., solid and dashed lines) that connect the respective control devices.

The control devices that are attached to at least one other device on the network 200 may take on and/or be assigned a respective role in the network. For example, the roles may include: a leader device (e.g., leader device 210), a router device (e.g., router devices 220a-220d), an end device (e.g., end devices 230a and 230b), a router eligible end device (REED) (e.g., router eligible end device 240), a parent device, a child device and/or a sleepy end device (e.g., sleepy end device 250). The role of a control device may indicate the functions and/or capabilities of the control device with respect to the network 200. As described herein, end devices may include end devices (e.g., end devices 230a and 230b), router eligible end devices (e.g., router eligible end device 240), and/or a sleepy end devices (e.g., sleepy end device 250).

As illustrated in FIG. 2A, the network 200 may include a leader device 210 and one or more router devices 220a-220d. The leader device 210 may manage other control devices on the network 200. For example, the leader device 210 may assign and maintain router identifiers (e.g., router IDs) for each of the router devices 220. For example, each of the router devices 220a-220d may be assigned a unique router identifier. The leader device 210 may assign and maintain the roles of other devices. The leader device 210 may be configured as the gateway for the network 200. For example, the leader device may be a control device that facilitates communication (e.g., routes and receives messages to and from) between the network 200 and other networks or network partitions. Referring to FIG. 1A, a system controller (e.g., the system controller 110 shown in FIG. 1A) may be an example of a leader device 210. In addition, a control device within a load control system that is capable of being assigned to the role of a router device may be assigned to the role of the leader device.

The leader device 210 may support and be attached to multiple router devices (e.g., 64 router devices, 32 router devices, or another number of router devices may be defined for the network 200). The leader device 210 may operate as a router device. The router devices 220a-220d on the network 200 (e.g., attached to the leader device 210 on the network 200) may be in communication with each other, for example, to form a mesh network. The router devices 220a-220d may be in communication with one another via network communication links (e.g., as indicated by the solid lines connecting the router devices 220a-220d). The router devices 220a-220d may be in communication with the leader device 210, either directly or through one or more other router devices (e.g., as indicated by the solid lines connecting the leader device 210 to the router devices 220a and 220c). The router devices 220a-220d may receive and route messages to other devices on the network 200 (e.g., the end devices 230a, 230b, the router eligible end device 240, and/or the sleepy end device 250). For example, the router devices 220a-220d may receive and/or transmit messages between devices, or between each other for communicating messages received from an attached device to another device attached to another router device. Referring now to the load control system 100, a device that is, for example, externally powered (e.g., a device that is not battery powered) may be assigned to the role of a router device, such as, the system controller 110, the dimmer switch 120, the LED driver 130, the plug-in load control device 140, the motorized window treatments 150, and/or the thermostat 160.

The network 200 may include one or more end devices 230a, 230b (e.g., full or minimal end devices). The end devices 230a, 230b may be attached to another device (e.g., a parent device, such as the leader device 210 and/or the router devices 220a, 220b, 220c, 220d) on the network 200 and may transmit and/or receive messages via its attached parent device (e.g., leader device and/or router device). Though two end devices 230a, 210b are shown in FIG. 2A, and each is attached to different router devices, each router device 220a-220d may support multiple end devices (e.g., more than 500 end devices). The system controller 110, input devices (e.g., the remote control device 170), and/or load control devices (e.g., the dimmer switch 120, the LED driver 130, the plug-in load control device 140, the motorized window treatments 150, and/or the thermostat 160) may be examples of the end devices 230a, 230b.

Referring again to FIG. 2A, the network 200 may include the router eligible end device 240. The router eligible end device 240 may be an end device that is capable (e.g., hardware capable and/or software capable) of becoming a leader device and/or a router device. In certain situations, the role of the router eligible end device 240 may be updated to a leader device and/or a router device. For example, when the router eligible end device 240 identifies itself as being within reach of an end device attempting to attach to the network 200, the router eligible end device 240 may upgrade itself to the role of a router device. The router eligible end device 240 may transmit and/or receive messages via the attached router device 220d. As shown in FIG. 2A, the router eligible end device 240 may be one of the end devices that is attached to the router device 220d. The system controller 110, the dimmer switch 120, the LED driver 130, the plug-in load control device 140, the motorized window treatments 150, and/or the thermostat 160 may be examples of the router eligible end device 240. Referring now to the load control system 100, a control device that is, for example, externally powered (e.g., a control device that is not battery powered) may be assigned to the role of a router eligible end device, such as, the system controller 110, the dimmer switch 120, the LED driver 130, the plug-in load control device 140, the motorized window treatments 150, and/or the thermostat 160.

The network 200 may include the sleepy end device 250. The sleepy end device 250 may include, or may be similar to, an end device. For example, the sleepy end device 250 may be an end device that is powered by a finite power source (e.g., a battery). The sleepy end device 250 may be aware of its role as a sleepy end device based on, for example, an indication that is stored at the sleepy end device 250. Communication with the sleepy end device 250 may be performed such that the finite power source is preserved and/or is efficiently consumed. For example, the sleepy end device 250 may periodically disable its communication circuit(s) in between message transmissions. The sleepy end device 250 may transmit and/or receive messages via an attached router device 220a. As shown in FIG. 2A, the sleepy end device 250 may be one of the end devices that is attached to the router device 220a. Input devices (e.g., the remote control device 170) and/or load control devices (e.g., the motorized window treatments 150 when battery powered) may be examples of the sleepy end device 250. In addition, sensors and/or battery powered devices may be examples of the sleepy end device 250.

The leader device 210 may update the roles (e.g., or confirm role updates) of the devices communicating within the network 200, for example, based on changes to the network 200. In an example, a control device may be assigned to a certain role when the device attaches to the network 200, and the leader device 210 may update the role of the device based on changes in network conditions. Changes in network conditions may include: increased message traffic, attachment of other devices, changes in signal strength, etc. Updates to the assigned role of a control device may be based on the capabilities of the device. For example, the leader device 210 may update the role of a control device from a router eligible end device to a router device (e.g., as a router eligible end device is an end device that is eligible to perform the role of a router device). The leader device 210 may update the role of a control device to a router device by assigning a router identifier (ID) to the device.

As the leader device 210 updates the roles of the devices in the network 200, the leader device may maintain the number of router devices in the network 200 and/or the router identifiers in use in the network 200. For example, the leader device 210 may store and/or maintain a bitmap 217 that may be used to indicate the number of router devices and/or the router identifiers being used in the network 200. The bitmap 217 may include a number of bits that each correspond to a different router identifier being used in the network 200. In an example, the leader device 210 may support 64 router devices and the leader device 210 may store a 64-bit bitmap for tracking the router identifiers in use in the network 200. Each bit in the bitmap may indicate whether a router identifier is identified by the leader device 210 as being used (e.g., with a value of "1") or unused (e.g., with a value of "0"). The leader device 210 may determine that a device should be upgraded to a router device and, so long as a router identifier is available, assign a router identifier to the router device. The leader device 210 may downgrade router devices (e.g., to end devices) or remove router devices from the network 200. As router devices are added or removed, the bitmap 217 may be updated to indicate the number of router devices and/or router identifiers that are in use in the network 200.

The leader device 210 may send the bitmap 217 to the other router devices in the network 200. Each router device, including the leader device 210, may maintain network information about each of the router devices identified as being used in the network 200. For example, each router device may maintain network information about each of the router devices in a router table, such as the router table 219. For example, the network information in the router table 219 may identify the router devices in the network 200 and the quality of communications that a corresponding router device has with the other router devices being maintained in the router table stored locally thereon. Each router table, such as the router table 219, may include a row for each router identifier indicated in the bitmap 217. Each router device in the network, including the leader device 210, may perform communications on the network 200 based on the network information being stored and maintained in the locally stored router table. For example, a router device, such as the router devices 220a-220d and/or the leader device 210, may transmit messages differently within the network 200 based on the quality of the communications with corresponding router devices identified in the router table stored locally thereon.

The control devices attached to the network 200 may further operate as parent devices and/or child devices. Leader devices (e.g., the leader device 210) and router devices (e.g., the router devices 220a-220d) that are attached to one or more end devices (e.g., the end devices 230a, 230b, the router eligible end device 240, and/or the sleepy end device 250) may operate as parent devices. End devices (e.g., the end devices 230a, 230b, the router eligible end device 240, and/or the sleepy end device 250) that are attached to a leader device (e.g., the leader device 210) or a router device (e.g., one of the router devices 220a-220d) may operate as child devices. As a parent device, the leader device 210 and the router devices 220a-220d may each be attached to one or more child devices (e.g., one or more of the end devices 230a, 230b, the router eligible end device 240, and/or the sleepy end device 250, as described herein). In addition, the leader device 210 and the router devices 220a-220d may store and/or relay messages that are sent by their respective attached child devices. For example, the leader device 210 and the router devices 220 may receive messages from their respective child devices and route the received messages to the intended recipient device (e.g., either directly to the intended recipient device, via the respective parent device of the intended recipient device, and/or to a router device or leader device this is on the path to the intended recipient). Similarly, the leader device 210 and the router devices 220a-220d may receive messages intended for their respective child device and route the message to the appropriate child device. The parent of a respective sleepy end device may schedule communications with the sleepy end device when the communication circuit of the sleepy end device is enabled.

As indicated in FIG. 2A, the relationship (e.g., attachment) between a child device and a respective parent device may be indicated by dashed lines. For example, the router device 220a may be configured as the parent device of the end device 230a and the sleepy end device 250. Similarly, the router device 220b may be configured as the parent device of the end device 230b. The router device 220a may receive messages intended for the end device 230a and forward the message to the end device 230a. As the router device 220a is configured as the parent device of the end device 230a, the end device 230a may transmit messages to the router device 220a, and the router device 220a may route the message to the intended recipient. For example, when the end device 230a intends to transmit a message to the end device 230b, the end device 230a may initially transmit the message to the router device 220a. The router device 220a may route the message to the router device 220b (e.g., the parent device of the end device 230b). For example, the router device 220a may route the message to router device 220b via router device 220c or router device 220d, and the router device 220b may then forward to message to the end device 230b. In addition, as described herein and illustrated in FIG. 2A, the router device 220a may route the message to the end device 230b via the router device 220c (e.g., the auxiliary parent device of the router device 230b).

Child devices may be configured to transmit unicast messages to their respective parent device. A control device may transmit unicast messages to another control device in the network directly or via hops through other devices in the network. Each unicast message may be individually addressed to another control device by including a unique identifier of the control device to which the unicast message being transmitted. Control devices may generate separate unicast messages for each control device with which they are communicating and address the unicast messages to each control device independently. The unicast messages may also include the unique identifier of the control device that is transmitting the unicast message. A control device may determine that it is the intended recipient of a unicast message by identifying its own unique identifier in the unicast message.

Messages may be sent in the network using multicast messages and/or broadcast messages. Multicast messages may be sent to a group of control devices in the network. A multicast message may include a group identifier. The control devices that are members of the group may recognize the group identifier and process the message accordingly. Broadcast messages may be sent to each control device in the network capable of receiving the message. The broadcast messages may include an indication that the message is a broadcast message (e.g., a broadcast address). Each device that receives a broadcast message may process the message accordingly. A network may use either multicast messages or broadcast messages, and the two terms may be used unteachably herein.

The messages transmitted by a child device to its respective parent device may include an indication (e.g., a unique identifier) of the intended recipient, and the parent device may route the message accordingly. Referring again to FIG. 2A, the end device 230a may transmit messages to the router device 220a (e.g., the parent device of the end device 230a), and the router device 220a may route the message based on the intended recipient. For example, if the end device 230a transmits a message intended for the end device 230b, the router device 220a may route the message to the router device 220b (e.g., the parent device of the router eligible end device 230b) via the router device 220c or the router device 220d. For example, if the router device 220a routes the message via the router device 220d, the router device 220d may forward the message to the router device 220b, which may forward the message to the end device 230b. The router device 220a may identify that the router device 220b is the parent device to which the end device 230b is attached via a lookup table. As illustrated in FIG. 2A, multiple paths may exist to route messages over the network 200, and router devices may identify the shortest path (e.g., lowest number of hops) to transmit messages to a respective device.

Child devices may be configured to communicate with an auxiliary parent device (e.g., configured to communicate with more than one parent device). Referring to FIG. 2A, for example, the end device 230b may be configured to communicate with (e.g., transmit message to and receive messages from) a parent device (e.g., a primary parent device), such as the router device 220b. The end device 230b may also be configured to communicate with (e.g., receive messages from) an auxiliary parent device, such as the router device 220c (e.g., as illustrated by the long and short dashed lines in FIG. 2A). A child device may receive unicast messages from its parent device (e.g., primary parent device). A child device may also receive multicast messages (e.g., and/or broadcast messages) from its parent device (e.g., primary parent device) and one or more auxiliary parent devices, which may increase the efficiency and reliability of child device receiving the messages. For example, the child device may receive network advertisement messages via an auxiliary parent device. The number of auxiliary parents that a child device is synchronized with may be limited to a threshold number of auxiliary parents (e.g., 3, 5, 10, etc.).

A child device may be attached to a single parent device and synchronized with one or more auxiliary parent devices. For example, the child device may send and/or receive unicast messages via the parent devices. Similarly, the child device may receive multicast messages via the one or more synchronized auxiliary parent devices. The number of auxiliary parent devices that a respective child device is synchronized with may be limited to a threshold number of synchronized auxiliary parents, which may be pre-defined and/or configured. A child device may attempt to synchronize with an auxiliary parent device by transmitting a message (referred to herein as a link request message) to the auxiliary parent device. For example, referring to FIG. 2A, the end device 230b may have transmitted a link request message to router 220c. The link request message may be used to request a network communication link between two devices. As descried herein, messages may be communicated between devices that share a network communication link. In response to receiving the link request message, the router device 220c may transmit a message (referred to herein as a link accept message) to the end device 230b. The link accept message may include information that allows the respective child device to decrypt messages from the auxiliary parent device (e.g., a frame counter). As described herein, when a child device is synchronized with an auxiliary parent device, the child device may receive multicast messages via the synchronized auxiliary parent device. For example, referring to FIG. 2A, the end device 230b may receive multicast messages via the parent device (e.g., router device 220b) and the auxiliary parent device (e.g., router device 220c), which may increase the efficiency and reliability of the child device 230b receiving multicast messages.

A child device may receive advertisement messages from a router device other than the parent device of the child device or a router device other than an auxiliary parent device of the child device. For example, the router device may transmit advertisement messages to enable other control devices to determine that a network has been formed and that the device hearing the advertisement message may attempt to attach to the router device (e.g., to communicate via the network). Devices may receive and track the advertisement messages transmitted by router devices to determine whether the device is able to communicate via the network. Also, or alternatively, the advertisement messages transmitted by a respective router device may provide other router devices with the ability to measure a communication quality metric of the communication signal (e.g., via the received signal strength indicator value) between the respective routers attached to the network (e.g., which the router devices may use to update their respective routing tables or routing information). As described herein, the child device may measure the received signal strength indicator (RSSI) or another communication quality metric of the received advertisement messages.

Certain messages may be propagated and broadcast by multiple devices in the network 200, which may increase the likelihood that a respective child device hears a message. For example, rather than sending multiple transmissions, multicast messages that are substantially similar (e.g., messages that include the same load control instructions that are sent to multiple load control devices) may be broadcasted. Referring again to the load control system 100, an actuation of a button of the remote control device 170 may adjust the intensity of multiple lighting loads (e.g., the lighting load 122 and the plug-in lighting load 142) and a message may be broadcasted to adjust the respective lighting loads. In addition, the devices that receive the broadcast transmission may be configured to process and repeat (e.g., forward the message over the network or otherwise acting as a repeater) the message in response to receiving the broadcast transmission.

Child devices may create and maintain an auxiliary parent table. The auxiliary parent table may include a list of auxiliary parents with which a respective child device is configured to communicate (e.g., synchronized with and/or able to receive multicast messages from). In addition, the auxiliary parent table may include an indication of the communication quality metric (received signal strength (e.g., an RSSI)) for each of the auxiliary parent devices of the child device. For example, the auxiliary parent table may include a rolling average of the received signal strength indicators for each of the auxiliary parent devices of the child device. Child devices may similarly create and/or maintain a router table. The router table may include the router devices that a respective child device has received messages from (e.g., advertisement messages). In addition, the router table may include an indication of the RSSI or other communication quality metric of messages received from each of the router devices in the router table. Also, or alternatively, child devices may maintain a generic router table. The router table may include each of the router devices that a respective child device has received messages from and a received signal strength indicator for each of the respective router devices. The router table may also include an indication of whether a respective router device is a parent of the child device or an auxiliary parent of the child device. As used herein, the term auxiliary parent table may refer to a separate table from the router table or a subset of the router table that includes the router devices that are synchronized auxiliary parents of the child device.

As described herein, the network 200 may allow for communication between devices in a load control system (e.g., the load control system 100 shown in FIG. 1A). The end devices 230a, 230b may include load control devices and/or input devices (e.g., input devices) that communicate with other devices in the load control system. For example, the end device 230a may communicate with another end device and/or a router device in the load control system via RF communications.

Referring to FIG. 1A, the remote control device 170 may operate as an end device or a sleepy end device for communicating messages comprising indications of user input and/or control instructions for controlling another end device (e.g., the dimmer switch 120, the LED driver 130, the plug-in load control device 140, the motorized window treatment 150, and/or the thermostat 160). The remote control device 170 may communicate via one or more intermediary parent devices, such as a leader device and/or a router device, for example. The leader device and/or the router device may communicate with one or more other leader devices and/or router devices in the network to route the messages to the other end device (e.g., the dimmer switch 120, the LED driver 130, the plug-in load control device 140, the motorized window treatment 150, and/or the thermostat 160) for performing load control.

A control device may attach to another control device on a network or network partition (e.g., the network 200 shown in FIG. 2A) to enable the device to communicate (e.g., transmit and/or receive messages) via the network. A control device may initiate attachment to another control device on a network by transmitting a parent request message (e.g., a multicast parent request message) to discover potential parent devices. A parent request message may be transmitted by a control device to discover and/or attach to a parent device (e.g., router devices and/or leader devices). A control device may transmit the parent request message as a multicast message, for example, to identify devices that are attached to a network that can act as a parent device of the control device. Potential parent devices (e.g., the leader device 210 and/or the router devices 220 of the network 200) that receive a parent request message (e.g., a multicast parent request message) may respond by transmitting a parent response message. For example, potential parent devices that receive a multicast parent request message may each transmit a parent response message (e.g., as a unicast message) to the control device that transmitted the parent request message. A parent response message may indicate that the control device that transmits the parent response message is available to act as a parent device. Accordingly, a control device that transmits a parent request message may receive a plurality of responses to the parent request message and determine a parent to synchronize with based on the received parent response messages. The control device transmitting the parent request message may identify the received communication quality metric (e.g., RSSI) associated with the response messages and attempt attachment to the parent device having the largest received signal strength indicator for the response message.

Figure 2B:
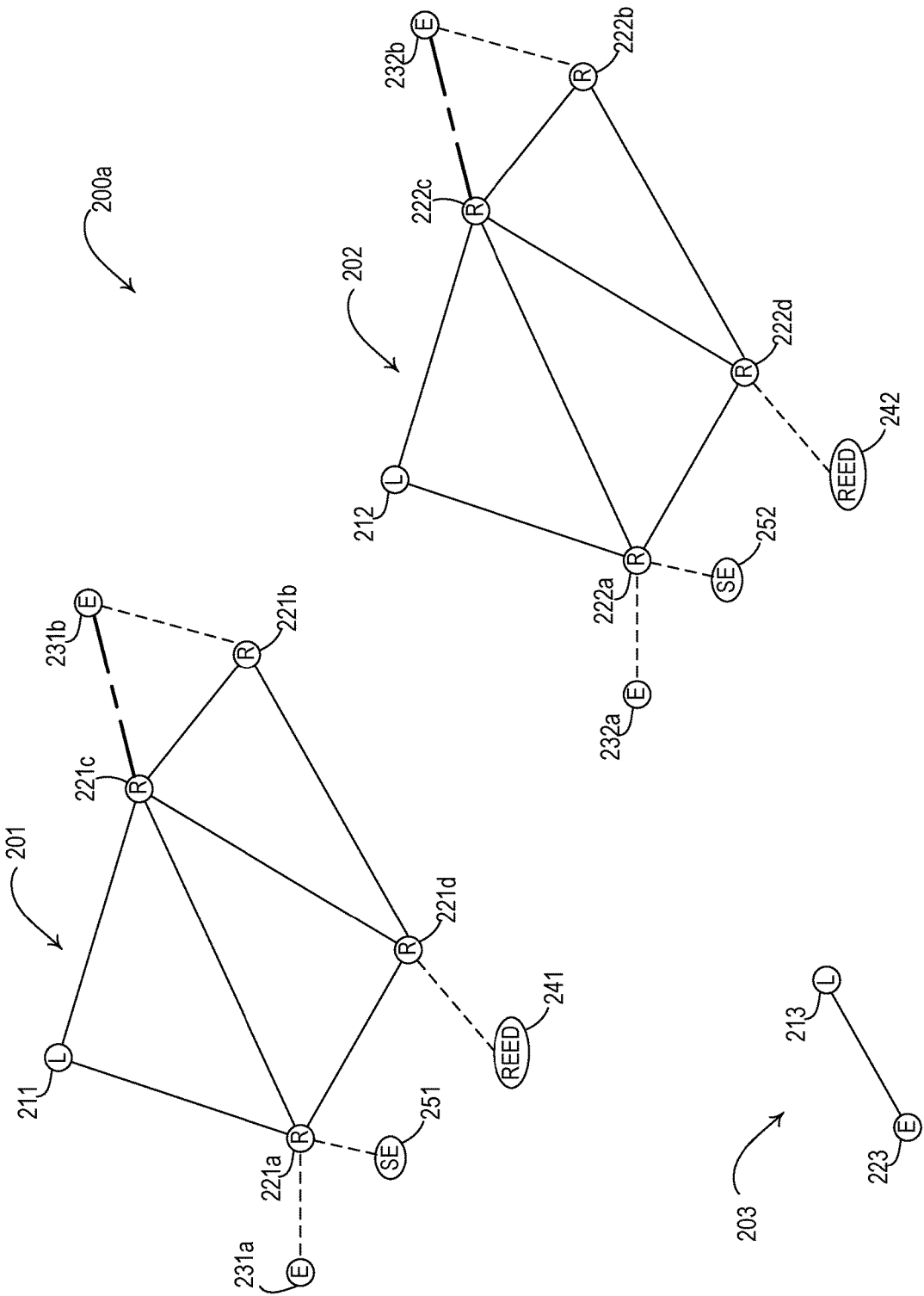
FIG. 2B is a diagram of example networks or network partitions (e.g., networks or subnetworks) that allow for communication between devices in the load control system of FIG. 1A.

FIG. 2B is an example illustration of a network 200a having a plurality of network partitions 201, 202, 203 (e.g., separate network partitions). As illustrated in FIG. 2B, the network partition 201 may include the following parent devices: a leader device 211 and router devices 221a, 221b, 221c, 221d. In addition, the network 201 may include child devices, such as: end devices 231a, 231b; router eligible end device 241; and sleepy end device 251. For example, each of the router devices 221a-221d in the network partition 201 may be assigned a unique router identifier. The network partition 202 may include the following parent devices: a leader device 212 and router devices 222a, 222b, 222c, 222d. In addition, the network 202 may include child devices, such as: end devices 232a, 232b; router eligible end device 242; and sleepy end device 252. For example, each of the router devices 222a-222d in the network partition 202 may be assigned a unique router identifier. The network partition 203 may include a single parent device, leader device 213, and a single end device, end device 223.

As illustrated in FIG. 2B, the network partition 203 may include a leader device 213 and an end device 223. The network partition 203, however, may fail to include a router device. Rather, the leader device 213 may function as the sole router device within the network partition 203. A leader device that is not connected or synchronized with a router device may be referred to as a singleton device. For example, the leader device 213 may be a singleton device. As illustrated in FIG. 2B, a singleton device may be connected to one or more child devices (e.g., the end device 223). The network partition 203 may be a singleton partition. As illustrated in FIG. 2B, a singleton partition may include a leader device (e.g., the leader device 213). In addition, a singleton partition may include one or more end devices (e.g., the end device 223). However, as illustrated in FIG. 2B, a singleton partition may not include a router device.

The network 200a may allow for communication between control devices in a load control system (e.g., the load control system 100). In addition, the network partitions 201, 202, 203 may be formed as a result of certain control devices being unable to attach to an already formed network partition. For example, as described herein, a control device may attempt to attach to another control device on a network partition by transmitting a parent request message (e.g., a multicast parent request message). If, however, the control device fails to receive a response to the parent request message (e.g., because the control device is outside of a communication range of the router devices of an already formed network partition), the control device may attempt to form its own network partition (e.g., become a leader device of a new network partition).

A control device that is unable to attach to a network partition may form another network partition. For example, referring to FIG. 2B, the leader device 213 may have been unable to attach to a router device on the network partitions 201, 202 (e.g., because the leader device 213 was outside of communication range of the router devices on the network partitions 201, 202). Accordingly, the leader device 213 may form the network partition 203 and the end device 223 may attach to the network partition 203. Similarly, the leader device 212 may have been unable to attach to the network partitions 201, 203 (e.g., because the leader device 212 is outside of communication range of the router devices of the network partitions 201, 203) and formed the network partition 202.

A network partition may be associated with a partition identifier (e.g., a partition ID). The partition identifier may be randomly or pseudo-randomly assigned (e.g., randomly assigned from a range or list of identifiers). For example, a priority of the respective network partition may be based on the partition identifier for the network partition. The partition identifier may be assigned by randomly selecting a number from a range of partition identifier values. The partition identifier may be selected at a leader device and transmitted in advertisement messages to other devices that may attach to the leader device. Referring now to FIG. 2B, the network partitions 201, 202, 203 may each be associated with a respective partition identifier. For example, the network partition 202 may be assigned a partition identifier of 1, the network partition 203 may be assigned a partition identifier of 2, and the network partition 201 may be assigned a partition identifier of 3. Although the partition identifiers of the network partitions 201, 202, 203 are sequential (e.g., in order to provide for a simplified explanation), the assignment of the partition identifiers to the network partition may be sequential, non-sequential, and/or randomized. As described herein, a partition identifier may also be an indication of a priority of the respective network partition 201, 202, 203. For example, the partition identifier may also be a priority value of the respective network partition 201, 202, 203 (e.g., respective priorities of the network partitions 201, 202, 203 may be 3, 1, and 2). A higher or lower partition identifier may indicate a higher priority value for the network partition priority (e.g. then network partition 201 may be a higher-priority network partition than the network partitions 202, 203 based on the partition identifier).

A priority may be assigned to a respective network partition based on the control devices (e.g., router devices and/or end devices) in the network partition. For example, a network partition having at least one router device in addition to the leader device may be given a higher priority than a network partition having only a leader device and no other router devices. Referring to FIG. 2B, the network partition 201 may be given a higher priority than the network partition 203 since the network partition 201 has router devices 221a-221d and the network partition 203 has no router devices in addition to the leader device. In addition, a priority may be assigned to a respective network partition based on a number of control devices (e.g., router devices and/or end devices) in the network partition. Referring to FIG. 2B, the network partition 201 may be given higher priority than the network partition 203 since the network partition 201 may have a greater number of control devices in the network partition. Each control device in a network partition may have stored locally thereon the number of control devices in the network partition. Network partitions that have the same number of control devices may be given different priorities using different partition identifiers, as described herein. For example, as shown in FIG. 2B, the network partition 201 and the network partition 202 may have the same number of control devices (e.g., router devices and/or end devices). The network partition 201 may have a higher priority based on network partition 201 having a higher or lower partition identifier.

As control devices attach to each of the network partitions 201, 202, 203, the effective communication range of each of the network partitions may increase. In addition, control devices that were initially unable to attach to one or more of the network partitions 201, 202, 203 (e.g., because the control device was previously outside of the communication ranges of all of the network partitions), may subsequently be able to attach to one of the network partitions 201, 202, 203. Moreover, communication within a load control system may be better facilitated when a single network partition is formed (e.g., the network 200 having a single network partition as illustrated in FIG. 2A) as compared to when multiple network partitions are formed (e.g., the network 200a having multiple network partitions 201, 202, 203 as illustrated in FIG. 2B). For example, communication within a load control system may be better facilitated when a single network partition is formed because a device in a network partition may be unable to transmit messages to control devices attached to another network partition (e.g., a device in a network partition may be unable to communicate with other devices outside the network partition). Accordingly, if a control device attached to a first network partition is also within the communication range of a second network partition, the device may attempt to detach from the first network partition and attach to the second network partition. For example, a control device may detach from the first network partition and attach to a second network partition when the priority of the second network partition is higher than the priority of the first network partition.

The router devices attached to each of the network partitions 201, 202 may each be associated with a communication range. The communication range of each of the respective router devices may be pre-defined and/or pre-configured. For example, the communication range of each of the respective router devices may be pre-defined and/or pre-configured based on the hardware components of each of the respective router devices. The effective communication range of a respective network or network partition may be based on the communication range of the router devices attached the respective network (e.g., a summation of the communication range of each of the router devices attached to the respective network). As a result, the communication range of a respective network or network partition may increase as the number of router devices attached to the respective network increases.

As described herein, the control devices attached to a lower-priority network partition may attempt to attach to a higher-priority network partition. For example, the control devices attached to the network partition 202 may attempt to attach to the network partition 201 (e.g., as the network partition 201 has a priority value of 3 and the network partition 202 has a priority value of 1). The router device 222a may receive an advertisement message from a device attached to the network partition 201 (e.g., from the router device 221d). The advertisement message may include an indication of the partition identifier of the network 201 (e.g., 3), which may be greater than the partition identifier of the network partition 202 and may indicate that the network partition 201 is a higher-priority network partition than the network 202. The router device 222a may determine to attach to the network partition 201 (e.g., as the network partition 201 has a higher priority).

The router device 222a may attempt to attach to the network partition 201 by transmitting a request to the leader device of the network partition 201 (e.g., the leader device 211). The request may include a request to attach to the network partition 201 as a router device, for example, by requesting to attach to the network partition 201 and be assigned a certain router identifier. For example, the router device 222a may request to attach to the network partition 201 and be assigned the router identifier that the router device 222a is assigned in the network partition 202. In response, the leader device 211 may reject the request if another router device 212a-212d attached to the network partition 201 is already assigned the requested router identifier. The leader device 211 may accept the request if none of the router devices 212a-212d attached to the network partition 201 are assigned the requested router identifier. If the router device 222a attaches to the network partition 201 and is assigned the requested router identifier, the child devices of the router device 222a (e.g., the end device 232a and the sleepy end device 252) may automatically attach to the network partition 201. For example, as the child devices communicate with the router device 222a using the router identifier. If the router device 222a is assigned the requested identifier by the leader device 211 of the network partition 201 (e.g., the router identifier as assigned in the network partition 202), the child devices may continue to communicate with router device 222a using the same router identifier.

Figure 2D:
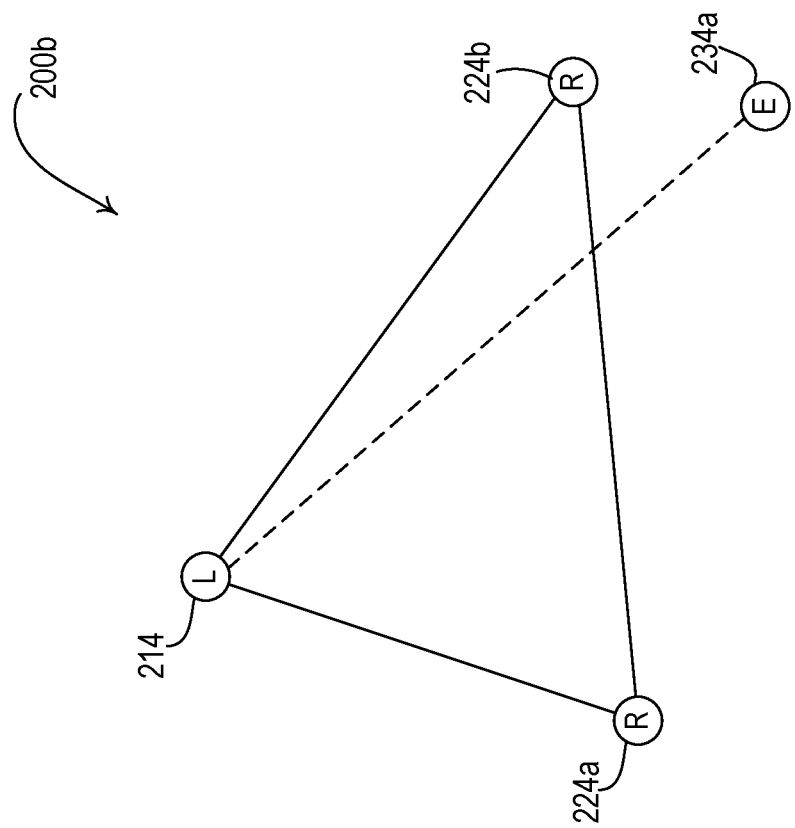
FIGS. 2C and 2D are diagrams of another example network that allows for communication between devices in the load control system of FIG. 1A.
Figure 2C:
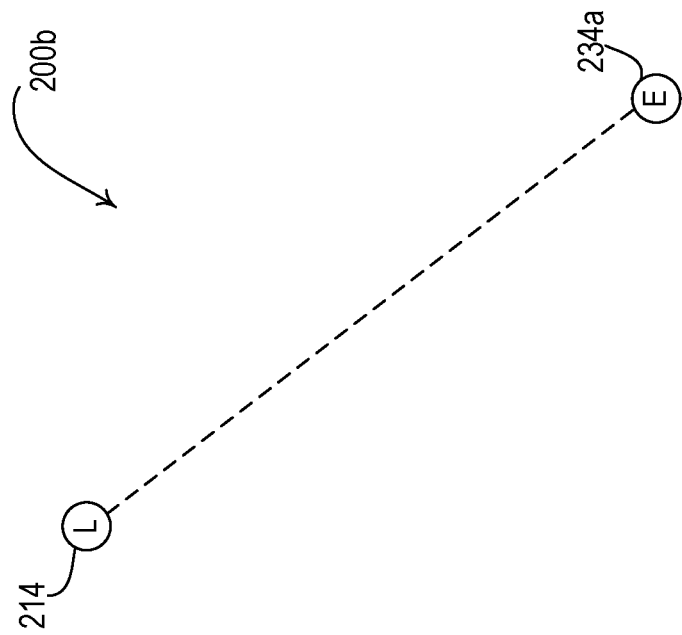

FIGS. 2C and 2D are illustrations of an example network 200b as the network 200b advances or progresses in network formation. As illustrated in FIG. 2C, the network 200b may include a leader device 214 and an end device 234a. As the network 200b is in the initial stages of network formation, the network 200b may not yet include a router device. The end device 234a may, as a result, attach to the leader device 214 (e.g., as other router devices not yet exist on the network 200b). However, the network communication link (e.g., the parent/child link) between the leader device 214 and the end device 234a may be weak (e.g., the received signal strength indicator of messages received by the end device 234a may be approximately −60 dB). For example, the network communication link between the leader device 214 and the end device 234a may be weak because the leader device 214 and the end device 234a are not proximately positioned to each other. If the network communication link between the leader device 214 and the end device 234a is weak, the likelihood of message transmission and/or reception failures between the leader device 214 and the end device 234a may increase.

FIG. 2D illustrates the network 200b during a later stage of network formation than the stage of network formation illustrated in FIG. 2C. As illustrated in FIG. 2D, the network 200b may grow to include additional control devices as network formation advances (e.g., as time progresses). For example, the network 200b may grow to include router devices 224a, 224b. In addition, the router devices 224a, 224b may be positioned proximate to the end device 234a (e.g., positioned closer to the end device 234a than the leader device 214). In addition, the received signal strength indicators of messages transmitted by the router devices 224a, 224b and received by the end device 234a may be strong (e.g., stronger than the received signal strength indicators transmitted by the leader device 214 and received by the end device 234a, such as −35 dB and −30 dB, respectively). Thus, potential network communication links (e.g., potential parent/child links) between the router devices 224a, 224b and the end device 234a may be stronger than the network communication link between the leader device 214 and the end device 234a. Moreover, as illustrated in FIG. 2D, a potential network communication link between the router device 224b and the end device 234a may be stronger than a potential network communication link between the router device 224a and the end device 234a (e.g., as the router device 224b is positioned closer to the end device 234a than the router device 224a).

As network formation progresses or advances additional devices may attach to the network. As a result, the end device 234a may experience better communication over the network 200b if the end device 234a determines to detach from an initial parent device (e.g., the leader device 214) and to attach to an updated parent device (e.g., the router device 224a or the router device 224b). For example, as described herein, the updated parent device may be positioned closer to the end device 234a than the initial parent device (e.g., such that the updated parent device and the end device 234a may have a stronger network communication link), which may increase the likelihood that message transmission and/or receptions are successful. As a result, as network formation advances, the end device may determine whether to attach to an updated parent device. Although FIGS. 2C and 2D are described using an example where the relative positioning of devices may increase or decrease the network communication link shared between two devices, other conditions may affect the network communication link shared between two devices (e.g., line of sight, interference, signal obstructions, etc.). To that extent, the scenarios of FIGS. 2C and 2D are merely examples to illustrate that a network may change over time and that changes to network may be considered in attempts to improve communications over the network.

Figure 2E:
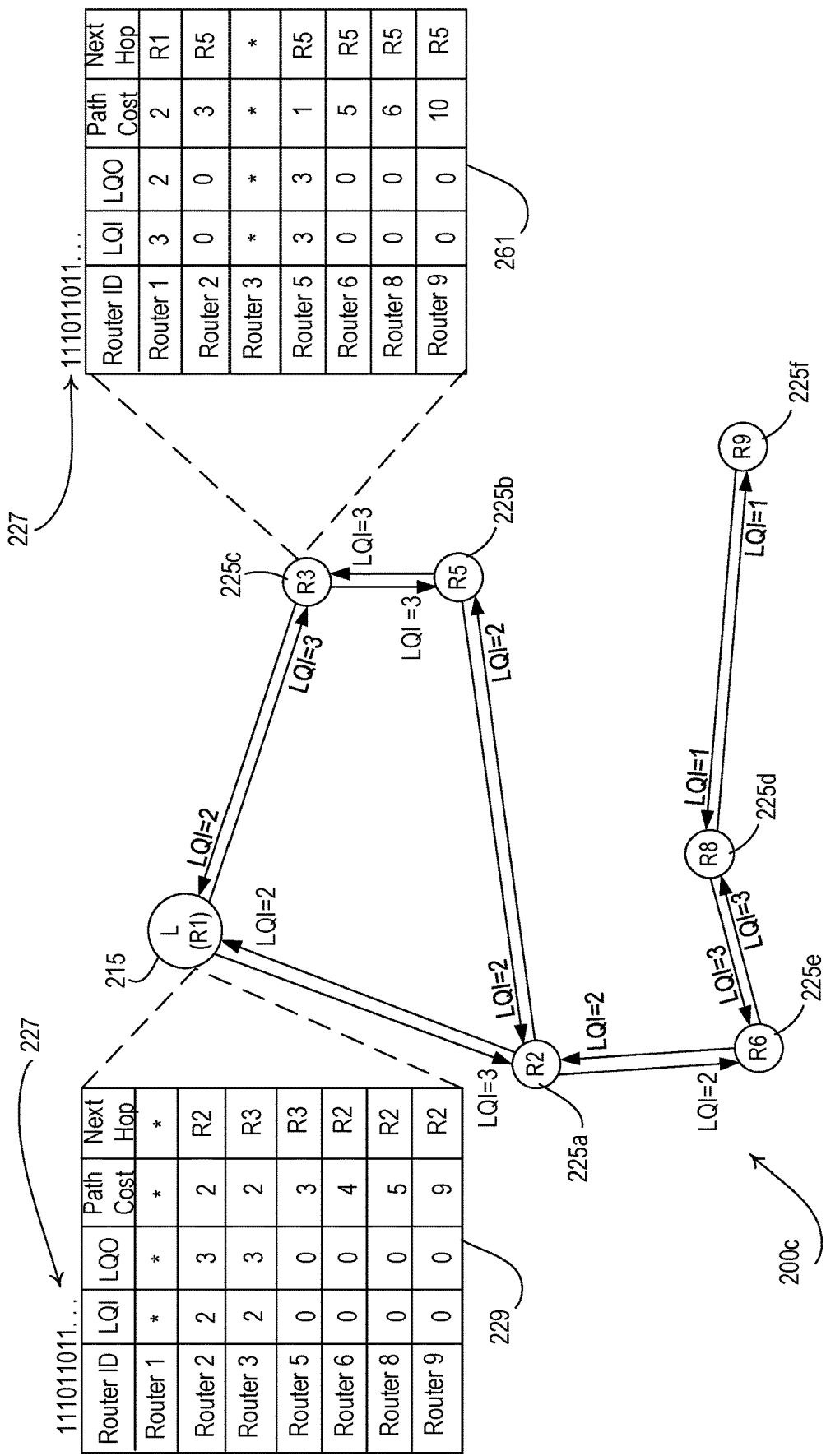
FIG. 2E is a diagram of another example network that illustrates the cost and network overhead associated with communication between the devices in the load control system of FIG. 1A.

FIG. 2E is an illustration of an example network 200c. As illustrated in FIG. 2E, the network 200c may include a leader device 215 and router devices 225a, 225b, 225c, 225d, 225e, 225f. In the network 200c, the router devices (e.g., the leader device 215 and router devices 225a, 225b, 225c, 225d, 225e, 225f) may periodically transmit advertisement messages that may be used for calculating cost and/or quality of communications in the network 200c. For example, router device 225c may send an advertisement message that is received by leader device 215 and leader device 215 may send an advertisement message that is received by router device 225c. Each router device may measure the received communication quality metric (e.g., RSSI) of the received advertisement message and calculate a link quality at which the advertisement message is received (e.g., link quality in (LQI)).

Each router device (e.g., leader device 215 and router devices 225a, 225b, 225c, 225d, 225e, 225f) may send an advertisement message as a multicast message. The advertisement messages transmitted by a router device may be received by neighboring router devices that share a single-hop network communication link with the router device transmitting the advertisement messages. A single-hop network communication link may be capable of communicating messages from a router device via a unicast and/or multicast communication directly to another router device. For example, the router devices 225a, 225c may be neighboring devices that share a single-hop communication link with the leader device 215, as the router devices 225a, 225c are capable of sending messages directly to and/or receiving messages directly from the leader device 215. The single-hop network communication link may be a network communication link on which router devices may be capable of directly receiving the advertisement messages above a given link quality (e.g., LQI greater than 0).

After a router device receives a periodic advertisement message from another router device, the router device may calculate the link quality (e.g., LQI) of the network communication link via which the advertisement message is received. The LQI may be calculated as a predefined number that is within a range indicating different link qualities for the network communication link between two devices. For example, the LQI may be indicated by values of 0, 1, 2, or 3. The different indicators of LQI may be assigned based on the RSSI of the received advertisement message and a link margin relative to a predefined receive level. The receive level may be a predefined minimum receive level. The receive level may be established as a predefined RSSI value for communications on the network. For example, the receive level may be defined by a noise floor that is set to an average RSSI value for noise generated on the network over a period of time. In an example using the receive level as a noise floor, a router device (e.g., leader device 215 or router device 225c) may calculate an LQI of 1 for communications received on a link from a neighboring router device when the RSSI value of one or more advertisement messages (e.g., average RSSI for advertisement messages over a period of time) is at least a link margin of 2 dB above the noise floor. The router device (e.g., leader device 215 or router device 225c) may calculate a link quality of 2 for communications received on a network communication link with a neighboring router device when the RSSI value of one or more advertisement messages (e.g., average RSSI for advertisement messages over a period of time) is at least a link margin of 10 dB above the noise floor. The router device (e.g., leader device 215 or router device 225c) may calculate a link quality of 3 for communications received on a network communication link with a neighboring router device when the RSSI value of one or more advertisement messages (e.g., average RSSI for advertisement messages over a period of time) is at least a link margin of 20 dB above the noise floor. A link quality value of zero may indicate that the link quality is unknown or infinite when the RSSI value of one or more advertisement messages (e.g., average RSSI value for advertisement messages over a period of time) is unable to be determined above the noise floor. Though examples are provided for predefined numbers indicating different levels of link quality, and/or different link margins that may be assigned to those levels, other indicators and/or values may be used to define link quality between two routing devices. Additionally, though individual routing devices may be provided as an example (e.g., leader device 215 or router device 225c), other routing devices may similarly calculate link quality for network communication links between neighboring routing devices.

The LQI of the network communication links measured locally at each control device (e.g., the leader device 215 and the router device 225c) may be exchanged with the other device on the network communication link. For example, the LQI may be measured locally at each control device and transmitted to the other device via an advertisement message. The LQI that is measured by another router device (e.g., on the other side of the network communication link) and received at a router device may be stored as the link quality out (LQO) for the network communication link. The LQI and/or the LQO may be stored in a local router table at each routing device. For example, the leader device 215 may store the LQI and/or the LQO for the network communication link with each router device in the network 200c in a router table 229. Similarly, the router device 225c may store the LQI and the LQO for communicating with each router device in the network 200c in a router table 261.

As described herein, the router tables 229, 261 may each identify network information for communicating with each router in the network 200c from the perspective of the devices at which the router tables 229, 261 are stored. The number of router devices in the network 200c and/or the router identifiers in use in the network 200c may be determined from a bitmap 227, as described herein. The bitmap 227 may be maintained by the leader device 215 and distributed to the other routing devices for locally maintaining their router tables. For example, the router devices 225a, 225c may receive the bitmap 227 and update their local router tables. The bitmap 227 may indicate the number of rows in the router tables (e.g., indicating the number of identified router devices in the network) and/or the router identifiers to include in the router tables. The router devices may maintain updated network information for the indicated router identifiers in the router tables. The updated network information in the router tables may include the LQI and/or LQO for the network communication link between the router devices identified in the bitmap 227. For example, the router 225c may receive the bitmap 227 from the leader device 215 and update the router table 261 to include router devices in the table 261 that are indicated in the bitmap 277, or remove router devices in the table 261 that are indicated in the bitmap 277 as failing to be used in the network.

The leader device 215 and router devices 225a, 225b, 225c, 225d, 225e, 225f may each use the LQI and LQO in their respective router tables to calculate a link cost for communicating on a network communication link with other router devices. The link quality for the network communication link between the two router devices may be the lesser of the value of the link quality for messages being transmitted out (e.g., LQO) and the value of the link quality for messages being received (e.g., LQI) on a single-hop network communication link between two devices. An LQO or an LQI of zero may indicate that the router device fails to have a direct network communication link with the router device listed in the router table.

A link cost for sending communications between devices on a network communication link may correspond directly to the link quality of communications on the network communication link. The link cost may indicate a relative cost or loss of communications on the network communication link. FIG. 2F is an example table 262 that illustrates example link costs that may correspond to different link qualities. As shown in FIG. 2F, a greater link quality may correspond to a lower link cost for communications on the network communication link between two neighboring devices.

The link cost for each network communication link may be used by a router device to calculate a path cost for communications between the router device and another router device in the network 200c. The path cost may indicate the relative cost or loss of communications on an entire communication path that may include one or more router devices. The path cost for one communication path may be compared to another to determine a higher quality communication path for sending digital communications that may have a lower relative cost associated with transmission of messages.

The path cost may indicate the overall cost for communicating a message from a starting router device to an ending router device. For example, the path cost may be calculated as the total of the link costs for each hop between the starting router device from which a message may originate and the ending router device at which the message may be received in the network 200c. Each router device may calculate the path cost to a neighboring device on a single-hop network communication link as being equal to the link cost and store the path cost in the locally-stored router table. For example, the router device 225c may set the path cost for communications with the leader device 215 equal to the link cost (e.g., lower of LQI and LQO) on the network communication link and store the path cost in the router table 261. Similarly, the router device 225c may set the path cost for communications with the router device 225b equal to the link cost (e.g., lower of LQI and LQO) on network communication link and store the path cost in the router table.

Each router device (e.g., leader device 215 and router devices 225a, 225b, 225c, 225d, 225e, 225f) may update the path cost for communicating messages to/from each router device in their respective router table based on the path cost information received from another router device. For example, as the router device 225b may be unable to directly communicate with the leader device 215, the router device 225b may receive path cost information for communicating messages through another router in the network 200c. The router 225c may transmit the path cost for communicating messages to/from the leader device 215 (e.g., path cost=2) in a multicast message that is received by other router devices. The multicast message may be an advertisement message, for example. The router device 225b may receive the path cost for communicating messages between the leader device 215 and the router device 225c (e.g., path cost=2). To calculate the total path cost for communicating messages between the router device 225b and the leader device 215 through the router device 225c, the router device 225b may add the link cost for communications between the router device 225b and the router device 225c (e.g., link cost=1) to the path cost received from the router device 225c (e.g., path cost=1) to get a total path cost (e.g., path cost=3). The link cost for communications between the router device 225b and the router device 225c may be determined from the link quality of the network communication link between the router device 225b and the router device 225c, which may be the smaller of the LQI and LQO of the network communication link (e.g., link quality=3).

Each router device may send/broadcast an advertisement message that includes the path cost to one or more other router devices in the network 200c. The router devices that receive the path cost information from the router device that sent the advertisement message may update their respective path cost information in their local router tables (e.g., by adding their link cost for communications with the router device that sent the advertisement message to the path cost in the received message). Each router device may use the locally-stored path cost information to identify the path through with messages may be communicated. For example, messages transmitted from the router device 225b to the leader device 215 may be communicated through the router device 225a or the router device 225c. The router device 225b may receive respective advertisement messages from the router device 225a and the router device 225c that indicate the path cost for communication of messages between the router device 225a and the leader device 215 is the same as the path cost for communication of messages between the router device 225c and the leader device 215 (e.g., path cost=2 on each network communication link). The router device 225b may add the link cost calculated for communicating messages between the router device 225b and the router device 225c (e.g., link cost=1) to the path cost information received in the advertisement message from the router 225c (e.g., path cost=2) to determine the total path cost for communicating with the leader device 215 through the router device 225c (e.g., total path cost=3). The router device 225b may similarly add the link cost calculated for communicating messages between the router 225b and the router 225a (e.g., link cost=2) to the path cost information received in the advertisement message from the router 225a (e.g., path cost=2) to determine the total path cost for communicating with the leader device 215 through the router device 225a (e.g., total path cost=4). The router device 225b may update a locally-stored router table with the lowest calculated path cost for communicating with the leader device 215 and/or the identifier of the router device through which messages are to be transmitted (e.g., router 225c). Each router device may similarly update their respective locally-stored router table with the lowest calculated path cost for communicating with the other router devices in the network 200c. For example, as shown in FIG. 2E, the leader device 215 and the router device 225c may each calculate the lowest path cost for communicating to other router devices in the network 200c and store the path cost in the respective router tables 229, 261. The router tables 229, 261 may also have stored therein the router identifier of the next hop from the respective devices 215, 225c through which messages are to be communicated to achieve the calculated path cost for communications to the destination router device.

Through periodically updating the link quality (e.g., LQI and/or LQO), link cost, and/or path cost, and communicating the path cost to other router devices in periodic advertisement messages, each router device may have up-to-date path cost information for communicating messages to other router devices in the network 200c. The router device may use the best communication path (e.g., lowest cost path) for communicating messages to another device. This routing mechanism may allow router devices to detect when other router devices have dropped off the network 200c, or a path cost between router devices has changed, and calculate the next lowest cost path to maintain connectivity to other router devices in the network 200c.

In an effort to distinguish relatively older data being transmitted in the periodic advertisement messages from relatively newer data transmitted in the periodic advertisement messages, the advertisement messages may be communicated with a sequence number. The leader device, such as leader device 215, may be responsible for updating the sequence number and distributing the updated sequence number to the other router devices in the network (e.g., router devices 225a, 225b, 225c, 225d, 225e, 225f in network 200c). For example, the leader device 215 may increment the sequence number periodically (e.g., after transmission of one or more advertisement messages) and/or after a router device is added to the network. The sequence number may be updated to allow router devices in the network (e.g., leader device 215 and/or router devices 225a, 225b, 225c, 225d, 225e, 225f in network 200c) to identify updated network information transmitted in advertisement messages. For example, as router devices (e.g., leader device 215 and/or router devices 225a, 225b, 225c, 225d, 225e, 225f in network 200c) may be periodically communicating advertisement messages that include path cost information that indicates the path cost for communicating with other router devices in the network, the sequence number may be updated to identify the updated path cost information.

After the leader device 215 updates the sequence number, the leader device 215 may distribute the sequence number to other router devices in the network. For example, the leader device 215 may use the sequence number in its own advertisement messages. After receiving the updated sequence number, each router device may use the updated sequence number for subsequent advertisement messages transmitted from the router device on the network. Each sequence number transmitted from the leader device 215 to the other router devices may be used in the advertisement messages for the router devices until a subsequent sequence number is distributed by the leader device 215. For example, the router device 225c may receive the sequence number directly from the leader device 215 and use the sequence number in subsequent advertisement messages. The router device 225b may receive the sequence number in the advertisement messages transmitted from the router device 225c and use the sequence number in subsequent advertisement messages transmitted from the router device 225b. The router devices may each use the current sequence number until an updated sequence number is received that is originated at and distributed from the leader device 215. Each router device may update the locally-stored network information in the router table when the router device receives an advertisement message from a non-leader router device (e.g., router devices 225a, 225b, 225c, 225d, 225e, 225f) that has an updated sequence number. If a router device receives an advertisement message that has the same sequence number as a previously received advertisement message, and/or previously received from the same non-leader router device, the router device may fail to process the advertisement message. If a router device fails to receive an updated sequence number within a predefined period of time (e.g., minutes, seconds, etc.), the router may assume the leader device 215 is unavailable for communications (e.g., offline, powered off, dropped from the network, changed roles, or is otherwise unable to communicate with the router device) and attempt to form another network or network partition having another leader device 215.

As described herein, the control devices that are attached to a network, such as the network 200, 200a, 200b, 200c, may each be assigned a respective role. Control devices that are assigned certain roles on the network, such as the role of leader device or router device, may be configured to facilitate communication with control devices that are assigned other roles on the network, such as end devices, (e.g., including end devices, sleepy end devices, and/or router eligible end devices, as described herein). The roles of control devices may be initially assigned on a first-come-first-serve basis. For example, the control devices that attempt to join a network first may be assigned roles that are configured to facilitate the communication of other control devices that subsequently join the network. This may result in degradation of the quality of network communication links as the network evolves and other devices are added to the network, or in the vicinity of the network. For example, control devices may establish network communication links with one another that provide the best quality network links at the time. But over time, the quality of these network communication links may be subject to change and, in certain scenarios (e.g., when noise sources are introduced to the network), the quality of these network communication links may degrade.

Noise sources (e.g., noise-generating devices) may be located in the space in which the network is deployed. For example, noise sources that may be located in the vicinity of the network may be wireless access points (WAPs), microwaves, video cameras, security badge readers, and other noise-generating devices. The existence of noise sources in a network may cause the quality of communication on a communication link or network to degrade. As noise sources are added to a space that may degrade the quality of communications on a network communication link, other control devices may be added to the network, and their addition may be able to improve the quality of communications on the network communication link or network. The roles of the control devices joined or connected to the network may be updated to improve the quality of communications. For example, the roles of control devices that are located near noise sources may be assigned in a manner to optimize or otherwise improve the quality of communications in the space in which the network is deployed. In addition, control devices may experience lower quality network communication links with other control devices, for example, if the control devices are installed in an isolated location (e.g., a location that is not proximate to other control devices on the network).

Control devices may be assigned to the role of leader device or router device according to a pre-defined procedure (e.g., pre-defined by the respective network or protocol). The role of leader device and router devices may initially be assigned to control devices on a first-come-first-serve basis at initial startup of the network (e.g., when the control devices in the network are powered on). For example, after joining or connecting to a network, a control device may attempt to initiate attachment to another device on the network (e.g., by transmitting a parent request message). If the control device fails to attach the other device on the network (e.g., fails to receive a response to the parent request message, for example, because a leader device or router device fails to be on the network), the control device may be assigned the role of leader device. Over time, other control devices may join or connect to the network and attempt to attach to the control device assigned to the role of leader device. For example, the other control devices may each initially be assigned the role of end device. Further, as described herein, the leader device may determine to adjust the roles of other control devices, for example, by upgrading one or more of the other control devices to the role of router device. In determining to adjust the roles of the other control devices, however, the leader device may fail to consider the quality of communications on network communication links experienced by a respective control device.

When roles are assigned in such a manner, control devices that experience lower quality of communications on network communication links may be assigned the role of a leader device or a router device, which are the control devices configured to facilitate communications between other control devices in the network (e.g., control devices that are assigned the roles of end devices, including end devices, sleepy end devices, router eligible end devices, etc. as described herein). Similarly, when roles are assigned in such a manner, there may fail to be control devices that are assigned to the role of leader device or router device near noise sources, and control devices that are assigned the roles of end devices may be unable to attach to a nearby leader or router device. Assigning the role of leader device or router device to control devices that experience lower quality communications may decrease the overall quality of communications on the network communication links and/or the network as a whole. Over time, networks that assign control devices that experience lower-quality network communication links with other control devices to the role of leader device or router device may experience an increased likelihood of communication failures, particularly in locations in which a noise source is located on the network. Accordingly, certain network optimization procedures may be performed such that the roles assigned to control devices may be based on the quality of a respective control device's network communication links with other devices on the network.

After the network is formed the quality of the network communication links between a control device and other respective control devices may be considered when assigning roles to respective control devices. For example, networks may enter a router optimization mode to assess and/or determine the quality of the network communication links between the control device and the other respective control devices, and optimize the roles assigned to the control devices on the network, for example, based on the quality of the network communication links between the control device and the other respective control devices on the network. The roles assigned to control devices may be updated as a result of the router optimization mode. For example, while the role of leader device may be initially assigned to a first control device, the role of leader device may later be assigned to another control device based on the router optimization mode.

A router optimization mode may be initiated by a user via an application running on a network device (e.g., the mobile device 190 or other suitable network device, such as a personal computer). Also, or alternatively, the router optimization mode may be triggered periodically (e.g., by a system controller, such as the system controller 110) and/or by a control device on the network (e.g., a control device assigned the role of leader device). For example, a control device may trigger the router optimization mode after detecting a change in the quality of network communications (e.g., such as by a control device detecting an increased packet loss within the network).

During a router optimization mode, the control devices that are communicating over the network may transmit (e.g. via unicast messages, multicast messages, and/or broadcast messages) one or more optimization messages. The control devices that receive these optimization messages may measure and store a communication quality metric (e.g., RSSI) of the optimization message along with an indication (e.g., a unique identifier) of the control device that transmitted the optimization message (e.g., optimization data). This optimization data may identify the number and quality of network communication links that a control device has established on the network. As described further herein, the optimization data may be used to identify optimized roles for the control devices in the network. Each of the control devices may then transmit their respective optimization data to another control device (e.g., the system controller) that processes the optimization data.

The system controller, or another control device on the network (e.g., a network configuration device and/or the control device assigned to the role of leader device on the network), may process and analyze the optimization data received from the various control devices to generate optimized network data. For example, the optimization data may be used to identify the number and quality of potential attachment links that a respective control device may establish with other control devices on the network. The system controller may use the optimization data to determine potential attachments (e.g., attachment links) that each control device could form with other control devices in the network and/or optimized roles of the control devices in the network. The system controller may generate optimized network data that includes the optimized roles of the control device on the actual network based on the optimization data.

In generating the optimized network data, the system controller may form an abstract or virtual network. The abstract or virtual network may define the optimal roles of the control devices on the network based on the optimization data, for example, to determine the best control devices to be assigned as the leader device and/or the router devices. The abstract or virtual network may further define connections between each of the control devices that represent the potential attachment links between each of the control devices. For example, as the optimization data received from each control device identifies the number and quality of network communication links that a respective control device has established with other control devices on the network, the system controller may assign connections in the abstract network such that control devices having a large number of network communication links that are above the defined quality threshold may be assigned to the role of leader device or router device before control devices that do not have a large number of network communication links that are above the defined quality threshold. In addition, the system controller may assign connections and/or roles in the abstract network such that router devices may be grouped or bunched around noise source (e.g., assign control devices surrounding noise sources to the role of router device). As described herein, noise sources may cause the quality of communication on a network communication link or network to degrade, and grouping or bunching control devices assigned to the role of router device around noise may counteract the degradation of the quality of communication on a network communication link or network.

When first beginning to process the optimization data to generate the optimized network data, the system controller may consider each of the control devices in the abstract network to be an unconnected device (e.g., control device having no defined connection to any other control devices in the abstract network). The system controller may then process the optimization data to identify potential attachment links between each of the control devices and the potential attachment links that a respective control device could have with other control devices that are above a defined quality threshold (e.g., using the optimization procedures described herein with respect to FIGS. 5A-5C). Based on this information the system controller may, for each control device, identify a list of other control device with which a respective control device has potential attachment links that are above the defined quality threshold (e.g., a preferred connections list, as described herein). The system controller may further assign the control device that has a potential preferred connection with the system controller and has the greatest number of preferred connections with other control devices that are above the defined quality threshold to the role of leader device in the abstract network. After assigning the control device to the role of leader device in the abstract network, the system controller may consider that control device (e.g., the leader device in the abstract network) as a connected device. In addition, the system controller may define connections between the leader device and the other control devices that have potential attachment links that are above the defined quality threshold with the leader device in the abstract network and may consider those other control devices as connected devices. As described herein, the control devices with at least one defined connection to another control device in the abstract or virtual network may be considered a connected device. A connected list of control devices may be maintained, as described herein, that includes a list of the connected devices in the abstract or virtual network. A connected device in the abstract network may be guaranteed to have a least one strong potential attachment link in the network that may form after the optimization procedures are complete.

The system controller may continue to add control devices to the connected list by defining connections between control devices in the abstract network until there are no more unconnected devices. For example, the system controller may identify an unconnected control device to be assigned to the role of router device in the abstract network, and the control devices that have potential attachment links (e.g., that are above the defined quality threshold) with the control device identified to be assigned to the role of router device in the abstract network may be assigned connections to that router device and added to the connected list (e.g., considered connected devices). As further described herein with respect to FIGS. 5A-5C, the system controller may continue to assign control devices the role of router device and connect control devices to router devices in the abstract network until no more unconnected devices remain. For example, the system controller may identify the control devices (e.g., control devices on the connected list of control device) that have potential attachment links that are above the defined quality threshold with the highest number of unconnected devices and assign those control devices to the role of router device. This will enable the control devices with the higher quality network communication links to the largest number of other devices to be router devices in the network. The system controller may then consider each of the control devices having potential attachment links to the router devices to be connected devices in the abstract network and define a connection between those control devices and at least one of the router devices.

The system controller may continue to identify router devices and connected devices in the abstract network in order to define connections to any unconnected devices that may remain. For example, the system controller may identify the unconnected devices that have potential adequate connections (e.g., secondary connections, as further described herein) to a control device already assigned to the role of router device. These potential adequate connections may be below a first quality threshold, but may still be considered an adequate connection, as the connection may still be above a lower second quality threshold. The system controller may assign one or more of these unconnected devices having potential adequate connections to also be assigned to role of router device and be considered connected devices in the abstract network. The system controller may then consider each of the unconnected devices that have potential adequate attachment links to those router devices (e.g. control devices that have adequate potential connections to a control device already assigned to the role of router device) as connected devices in the abstract network. The system controller may define connections between the router devices having potential adequate connections to other router devices and the control devices that have potential attachment links that are above the defined quality threshold with that router device in the abstract network, and may consider those other control devices as connected devices.

If there are unconnected control devices that do not have a potential primary or secondary connection to the any of the connected devices in the abstract network, the system controller may assign connected control devices that have a tertiary connection to one or more of the unconnected devices to be assigned the role of router devices. For example, a tertiary connection may be represented by a communication quality metric that is less than the communication quality metric for secondary connections. The tertiary connections for each control device may include the control devices that have sub-par connections with the particular control device. The control devices that have tertiary connections with one or more unconnected devices may be control devices that may be promoted to router devices that are in a troubled area for performing network communications. The system controller may define connections between the new router device and the unconnected devices that have the tertiary connections to the new router device, and may consider those other control devices as connected devices. These router devices (e.g., the new router devices that have tertiary connections to other control devices) may be located in portions of the network where the noise source is stronger, and may be used to intentionally backfill router devices in these potentially more troublesome areas of the network around a noise source.

The system controller may continue to identify control devices to be assigned to the role of router device in the abstract network and add the other control devices that have network communication links with these control devices that are above the quality defined threshold to the connected list until there are no more unconnected devices. When there are no more unconnected devices, the system controller may assign one more additional control devices to the role of router devices, for example, until there are at least a minimum number of router devices in the network. For example, the system controller may be configured to assign the additional router devices in portions of the network where the noise source is stronger. While identifying connected control devices that have a tertiary connection to unconnected devices, the system controller may also flag other nearby control devices as potential candidates to be upgraded to the role of router devices. The system controller may choose from the flagged control devices when determining additional control devices to assign to the role of router devices. Identifying control devices to be assigned to the role of router device in this manner may cause certain control devices assigned to the role of router device to be grouped or bunched around noise source, which, as described herein, may counteract the degradation of the quality of communication on a network communication link or network caused by noise sources.

After completing the connected device list (e.g., no more unconnected devices remain), the system controller may transmit the optimized network data (e.g., that defines the control devices to be assigned to the role of leader device or router device) to the control devices on the network. The optimized network data may be used to weight the control devices assigned the role of leader device or router device in favor of becoming a leader device or router device, respectively.

The roles of certain control devices on a network may be updated or changed to conform with the optimized network data. For example, in certain scenarios the control device previously assigned to the role of leader device may be downgraded to the role of router device or end device. The leader device may send a message (e.g., leader abdicate message) indicating to other devices that the leader device may be downgraded and/or a time at which the leader device is to be downgraded. In addition, the message may indicate the control device that is taking over the role of leader device. A control device assigned the role of router device may similarly be upgraded to the role of leader device or downgraded to the role of end device. For example, a message indicating to other device of the updated role of the device may be multicast throughout the network (e.g., multicast to all of the devices on the network). The message may also include a time at which the updated role of the device is to be effectuated.

Further, a control device assigned to the role of end device may be upgraded to the role of leader device and/or router device based on the optimization data. When a control device is being upgraded to the role of leader device, for example, the leader device may transmit (e.g., via unicast) a message (e.g., a leader abdicate message) to the control device indicating that the control device is to take over the role of leader device. When the control device is being upgraded to the role of router device, the leader device may transmit (e.g., via unicast) a message indicating that the control device is to be upgraded to the role of router device to the control device. In addition, the message may include the router identifier assigned to the control device.

Figure 3:
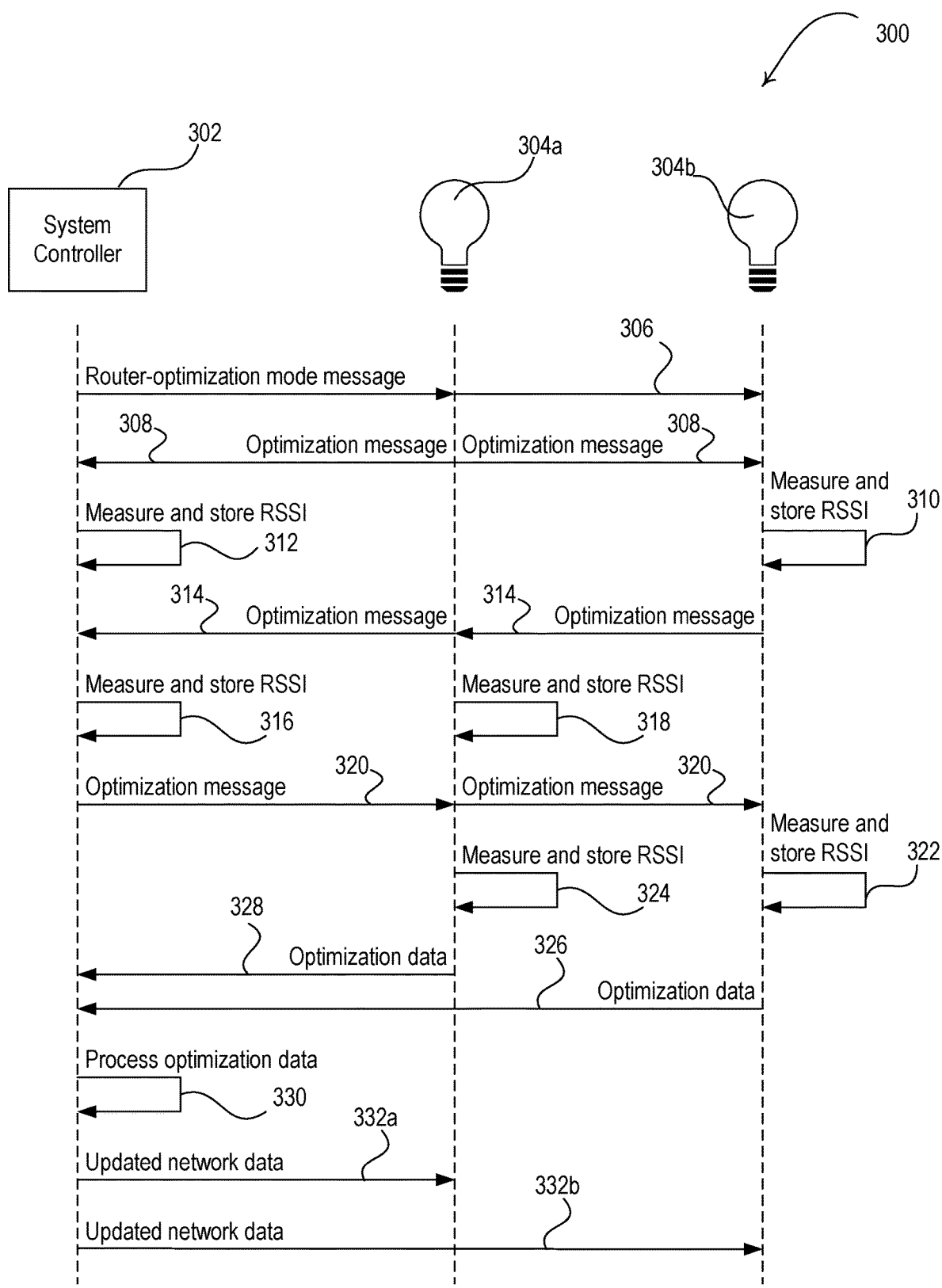
FIG. 3 is a sequence flow diagram illustrating example messages communicated between devices in a network.

FIG. 3 illustrates a sequence flow diagram 300 illustrating example messages transmitted between a system controller 302 and lighting devices 304a, 304b. The system controller 302 and the lighting devices 304a, 304b may be connected to a network that allows the system controller 302 and the lighting devices 304a, 304b to communicate with one another (e.g., a network that is similar to networks 200, 200a, 200b, 200c and/or network partitions 201, 202, 203). The system controller 302 and the lighting devices 304a, 304b may each be assigned roles on the network, as described herein.

The system controller 302 may trigger a router optimization mode, which, as described herein, may be used to assign the roles of control devices on a network. The assignment of the roles may be a reassignment of the roles after the roles have already been established. For example, the system controller 302 may transmit a message (e.g., a router optimization mode message) 306 to trigger the lighting devices 304a, 304b to enter the router optimization mode. The system controller 302 may transmit the router optimization mode message 306 to the lighting devices 304a, 304b as a unicast message, a multicast message, and/or a broadcast message. Although not shown in FIG. 3, the system controller 302 may transmit router optimization mode message to additional devices. Also, or alternatively, another device initiate a router optimization mode and/or transmit router optimization messages.

After receiving a router optimization mode message, a control device may transmit one or more optimization messages. For example, after receiving the router optimization mode message 306 from the system controller 320, the lighting device 304a may transmit an optimization message 308. The optimization message 308 may include an indication of the source of the optimization message (e.g., a unique identifier of the source, such as the network address) As shown in FIG. 3, the lighting device 304a may transmit the optimization message 308 (e.g., as a unicast message, a multicast message, or a broadcast message) to the other devices in the network, e.g., the system controller 302 and the lighting device 304b as shown in FIG. 3. Though not shown in FIG. 3, the lighting device 304a may transmit optimization messages to additional devices.

A control device that receives an optimization message from another control device may measure and store a communication quality metric of the optimization message along with an indication of the device that transmitted the optimization message (e.g., the network address). A communication quality metric may comprise, for example, a received signal strength identifier (RSSI) of the received optimization message. The communication quality metric may include the received signal strength identifier of the optimization message minus a noise floor value of the noise floor at the control device (e.g., the difference between the received signal strength identifier and the noise floor). In addition, or alternatively, the communication quality metric may include a link quality value (e.g., a link quality in or link quality out). The communication quality metric may be a calculated for each optimization message that is received, or may be averaged for multiple optimization messages received over time.

At 310, the lighting device 304b may measure and store the communication quality metric of the optimization message 308 transmitted by lighting device 304a. At 312, the system controller 302 may measure and store the communication quality metric of the optimization message 308 transmitted by lighting device 304a. The communication quality metric of the optimization message 308 may be measured and stored at the system controller and the lighting device 304b for each device to identify the quality of communications being received from the lighting device 304a. In addition to the communication quality metric, lighting device 304b and system controller 302 may store an indication of the optimization message's source, such as a network identifier for lighting device 304a.

In response to the router optimization mode message 306, the lighting device 304b may transmit an optimization message 314 that includes its network identifier to the lighting device 304a and system controller 302. The lighting device 304b may transmit the optimization message 314 (e.g., as a unicast message, a multicast message, or a broadcast message) to the other devices in the network, e.g., the system controller 302 and the lighting device 304a. Again, although not shown in FIG. 3, the lighting device 304b may also transmit optimization messages to additional devices. At 318, the lighting device 304a may measure and store the communication quality metric of the optimization message 314 transmitted by the lighting device 304b. At 316, the system controller 302 may measure and store the communication quality metric of the optimization message 314 transmitted by the lighting device 304b. The communication quality metric of the optimization message 314 may be measured and stored at the system controller and the lighting device 304a for each device to identify the quality of communications being received from the lighting device 304b. In addition to the communication quality metric, the lighting device 304a and the system controller 302 may store an indication of the optimization message's source, such as a network identifier for the lighting device 304a.

The device that initially transmitted the router optimization mode message may also transmit an optimization message to other control devices. For example, the system controller 302 may transmit an optimization message 320 to the lighting devices 304a, 304b. At 324, the lighting device 304a may measure and store the communication quality metric of the optimization message 320 transmitted by the system controller 302. At 322, the lighting device 304b may measure and store the communication quality metric of the optimization message 320 transmitted by the system controller. The communication quality metric of the optimization message 320 may be measured and stored at the lighting devices 304a, 304b for each device to identify the quality of communications being received from the system controller 302. In addition to the communication quality metric, the lighting devices 304a, 304b may store an indication of the optimization message's source, such as a network identifier for the system controller 302. Though the flow diagram shows the system controller 302 transmitting a separate optimization message 320 that may be transmitted and measured at the lighting devices 304a, 304b to identify the quality of communications transmitted by the system controller 302, the lighting devices 304a, 304b may measure and store a communication quality metric of the router optimization mode message 306 that is transmitted from the system controller 302 to initiate the router optimization procedure.

As described herein, the control devices that receive optimization messages may aggregate the communication quality metrics of the received optimization messages and generate optimization data. The optimization data from a given control device may indicate the number of control devices from which the optimization messages are received and the quality of the network links on which the optimization messages are received. For example, the optimization data may include the network addresses for each control device from which an optimization message has been received and the corresponding communication quality metrics for the optimization message received from that control device.

After generating the optimization data, a control device may transmit the optimization data to another control device to process and analyze the optimization data. The control device to which the optimization data is transmitted may be the same control device that transmitted the router optimization mode message, or another control device. As shown in FIG. 3, the lighting device 304a may transmit optimization data 328 to the system controller 302. The optimization data 328 may include the network identifier of the lighting device 304b and the network identifier of the system controller 302, each with a respective communication quality metric of the optimization messages 314, 320 received from the lighting device 304b and the system controller 302. The lighting device 304b may transmit optimization data 326 to the system controller 302. The optimization data 326 may include the network identifier of the lighting device 304a and the network identifier of the system controller 302, each with a respective communication quality metric of the optimization messages 308, 320 received from the lighting device 304a and the system controller 302. The system controller 302 may have its own optimization data stored in memory that includes the network identifier of the lighting devices 304a, 304b, each with a respective communication quality metric of the optimization messages 308, 314 received from the lighting devices 304a, 304b.

At 330, the system controller 302 may process the optimization data, for example, to determine the number of higher-quality communications experienced at a device. For example, the system controller 302 may process the communication quality metrics in the optimization data to determine the control devices to be assigned as router devices in the network. The system controller 302 may transmit updated network data 332a, 332b to the lighting devices 304a, 304b. The updated network data 332a, 332b may include a router list that includes a list of control devices to be assigned as router devices in the network. The updated network data 332a, 332b may be sent as a multicast or broadcast message to the lighting devices 304a, 304b. The updated network data 332a, 332b may be sent as unicast messages to the lighting devices 304a, 304b that indicates the role of each of the devices. After receiving the updated network data 332a, 332b, the lighting devices 304a, 304b may update their respective roles as indicated in the updated network data 332a, 332b.

Although FIG. 3 illustrates an example with three devices (e.g., the system controller 302, and lighting devices 304a, 304b) transmitting messages during a router optimization procedure, an optimization procedure may be performed by any number of devices. In addition, although FIG. 3 illustrates an example where each device transmits a single optimization message, the devices may each transmit, and respectively measure, multiple optimization messages, which may increase the accuracy of the network data generated by the system controller 320. The router optimization messages may also or alternatively be transmitted at periodic intervals (e.g., with slight randomization). For example, a router optimization procedure may be triggered periodically (e.g., triggered at regular intervals). The procedure illustrated in FIG. 3 may be an optimization data collection period, which may include the period of time during which the devices on a network transmit, receive, and measure multiple optimization messages.

As described herein, a control device may enter a router optimization mode, for example, based on the receipt of a router optimization mode message. Though the system controller 302 may be described as the control device that may trigger the router optimization mode at the other control devices and/or process the optimization data, other control devices may be similarly implemented. For example, a lighting device or another control device in the system may be implemented to trigger the optimization mode and/or process the optimization data. In another example, a network configuration device may be implemented to trigger the optimization mode and/or process the optimization data, as described herein.

The router optimization mode may be triggered multiple times. For example, the router optimization mode may be first triggered or entered by a first device in a load control system (e.g., a system controller, such as the system controller 100 of the load control system 100, and/or network configuration device). And after completion of first router optimization mode, subsequent entries of the router optimization mode may be triggered by a second control device in the load control system. For example, the second control device may be a control device that is assigned to certain role in the network (e.g., a control device assigned to the role of leader device).

Figure 4:
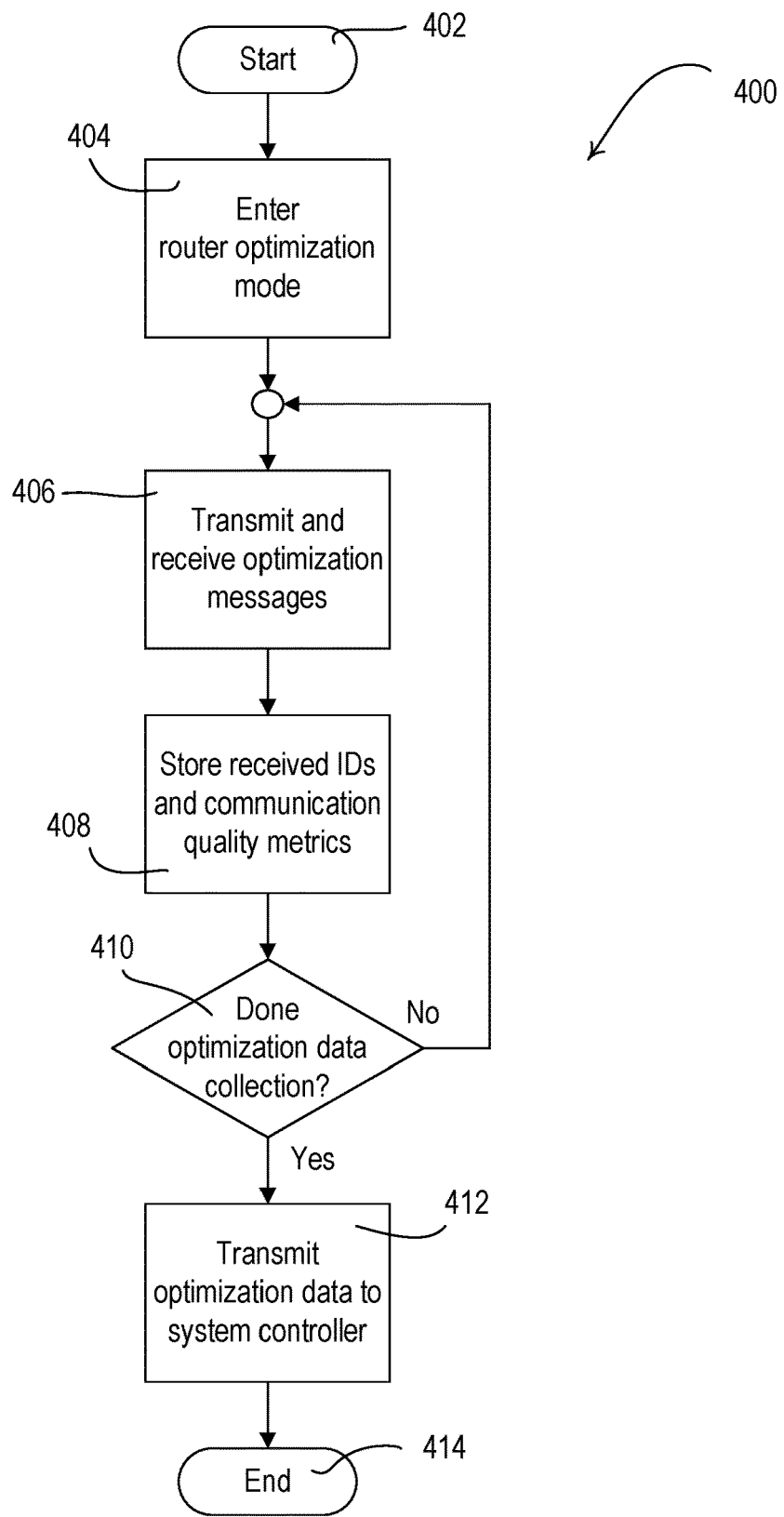
FIG. 4 is a flowchart of an example procedure for collecting optimization data for optimizing the selection of router devices in a network.

FIG. 4 is a flowchart of an example procedure 400 for collecting optimization data for optimizing the selection of router devices in a network (e.g., the networks 200, 200a, 200b, 200c and/or network partitions 201, 202, 203). The procedure 400 may be executed by one or more control devices in a load control system that is joined or connected to the network (e.g., each of the leader device, router devices, and/or end devices) as part of a router optimization procedure. For example, each of the control devices in the network may execute the procedure 400, or portions thereof, at the same time to collect the optimization data. The control devices may be part of a load control system (e.g., the load control system 100).

The control device may start the procedure 400 at 402 and the control circuit of the control device may enter a router optimization mode at 404. The control circuit of the control device may start the procedure 400 at 402 in response to receiving a router optimization mode message at 402. The router optimization mode message may be transmitted by a network device to the control devices directly or to a system controller of the load control system (e.g., the system controller 110, 302) to cause the system controller to transmit the router optimization mode message to the control devices on the network. Also or alternatively, the router optimization mode message may be transmitted by a network configuration device. A user of the load control system may initiate the router optimization procedure using an application running on a network device (e.g., the mobile device 190 or other suitable network device, such as a personal computer). The user may initiate the router optimization procedure after introduction of a noise source (e.g., a wireless access point (WAP)) within the network that may cause network communication problems at the control devices. Also, or alternatively, the router optimization procedure may be periodically initiated (e.g. by the device assigned to the role of leader device). In one example, the introduction of the noise source within the network (e.g., a wireless access point (WAP)) may cause network communication problems at the control devices and the roles of the devices may be updated to optimize the locations of the devices with respect to the noise source for improved network communications.

The user may also, or alternatively, initiate the router optimization procedure in response to receiving network information at the mobile device. For example, prior to entering the router optimization procedure at 402, the mobile device running the application or the system controller (e.g., via initiation by the mobile device) may send a message to control devices to query control devices on the network to receive network information that may indicate the quality of communications on the network and/or whether control devices are having communication problems on the network. For example, the query may request network information from the control devices, such as recent messages received at the control devices over a period of time, a link quality of communications, a link cost of communications, a noise floor at the control devices, and/or other network information that may indicate the quality of communications at the control devices. In response to receiving the network information, the user or the mobile device may determine to initiate the procedure 400 in an attempt to improve network communications. For example, the user may initiate the procedure 400 at the mobile device to cause the mobile device to send the router optimization mode message at 402. A user may initiate the router optimization procedure when control devices are failing to receive messages that have been transmitted on the network, a link quality of communications is below a threshold, a link cost of communications is above a threshold, or a noise floor at the control devices is above a threshold.

The control circuit of the control device may initiate the router optimization procedure itself (e.g., when the control device is a system controller). The control circuit of the control device may be configured to initiate the router optimization procedure periodically (e.g., every 20 minutes), such that the control circuit of the control device may periodically assess the quality of the communications on the network and correct router placement if there are any communication issues. For example, the control circuit of the control device may initiate the router optimization procedure by periodically transmitting a router optimization mode message at 402 in an attempt to update the roles of the control devices to improve communications on the network.

The control circuit of the control device may periodically query the other control devices and transmit the router optimization message at 402 in response to receiving network information from the other control devices. For example, prior to entering the router optimization procedure at 402, the control circuit of the control device may send a message via its communication circuit to the other control devices to query the other control devices on the network to receive the network information that may indicate the quality of communications on the network and/or whether the control devices are having communication problems on the network. The control circuit of the system controller may initiate the router optimization procedure by sending the router optimization mode message at 402 when the control devices are failing to receive messages that have been transmitted on the network, a link quality of communications is below a threshold, a link cost of communications is above a threshold, or a noise floor at the control devices is above a threshold.

Also, or alternatively, the control circuit of the control device may determine that it is experiencing communication issues and automatically determine to transmit the router optimization mode message to the other control devices on the network (e.g., and execute the procedure 400 at 402). For example, the control device may monitor its own network information and determine that the control device is having communication problems on the network. The control device may initiate the router optimization procedure by sending the router optimization mode message at 402 when the control device fails to receive messages that have been transmitted on the network, a link quality of communications at the control device is below a threshold, a link cost of communications at the control device is above a threshold, or a noise floor at the control device is above a threshold.

At 406, the control circuit of the control device may transmit and receive optimization messages via a communication circuit. The optimization messages may be used by the control devices on the network to determine the quality and number of the potential connections (e.g., parent-child links, attachments, or other network links) with other nearby control devices. Each optimization message may include a unique identifier (e.g., the network address) of the control device that transmitted the optimization message. For example, the control device may periodically transmit its optimization messages (e.g., as a multicast or broadcast message) to the other control devices at 406. In addition, the control device may receive the optimization messages from other control devices that are within the communication range of the control device at 406.

At 408, the control circuit of the control device may store the unique identifier and a communication quality metric for each optimization messages that is received in memory at 406. For example, the communication quality metric may indicate a signal strength at which an optimization message was received. The communication quality metric may comprise, for example, a received signal strength identifier (RSSI) of a received optimization message as compared to a noise floor at the control device (e.g., the difference between RSSI and the noise floor). The communication quality metric may be averaged over time (e.g., the difference between an average value over time of the received signal strength indicators of the optimization messages received from a particular control device and the noise floor). In addition, or alternatively, the communication quality metric may comprise a link quality value (e.g., a link quality in or link quality out). The control circuit of the control device may continue to store the unique identifiers and communication quality metrics of the received optimization messages in memory at 408 until the optimization data collection is complete at 410. For example, the control device may collect the optimization data for a predetermined amount of time and/or another control device (e.g., the system controller, the mobile device, and/or another control device in the network) may transmit a message to the control device to cause the control device to stop collecting the optimization data. When the optimization data collection is complete at 410, the control device may transmit the optimization data to the system controller at 412, and the procedure 400 may end at 414.

The system controller may use the optimization data (e.g., generated using the procedure 400 in FIG. 4) to form an abstract or virtual network. The abstract or virtual network may define the connections and/or optimal roles of the control devices on the network based on the optimization data. For example, the abstract network may define connections (e.g., representing potential attachments on a network communication link) between the control devices, which may be used to assign as the leader device and/or the router devices. As described herein, the system controller may be configured to use the abstract network (e.g., the control devices identified to be assigned to the role of leader device or router device and/or the connections established between each of these control devices based on their respectively assigned roles) and/or the optimization data on which the abstract network is based, to generate optimized network data. The optimized network data may define the optimized control devices to be assigned to the role of leader device or router device. The optimized network data may be used to optimize the selection of a leader device and router devices in a network.

Figure 5A:
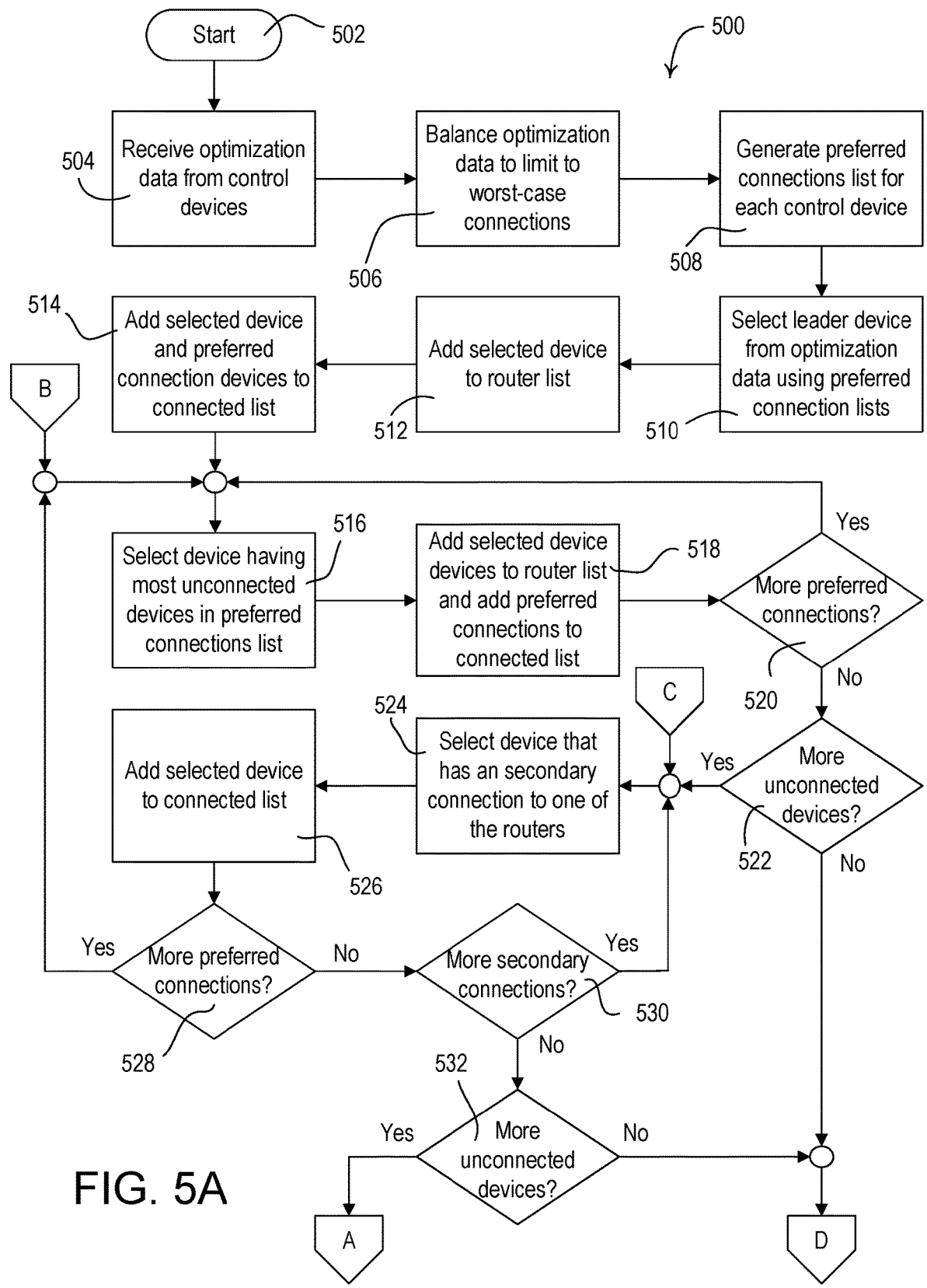
FIGS. 5A and 5B are flowcharts of an example procedure for processing optimization data to optimize the selection of router devices in a network.
Figure 5B:
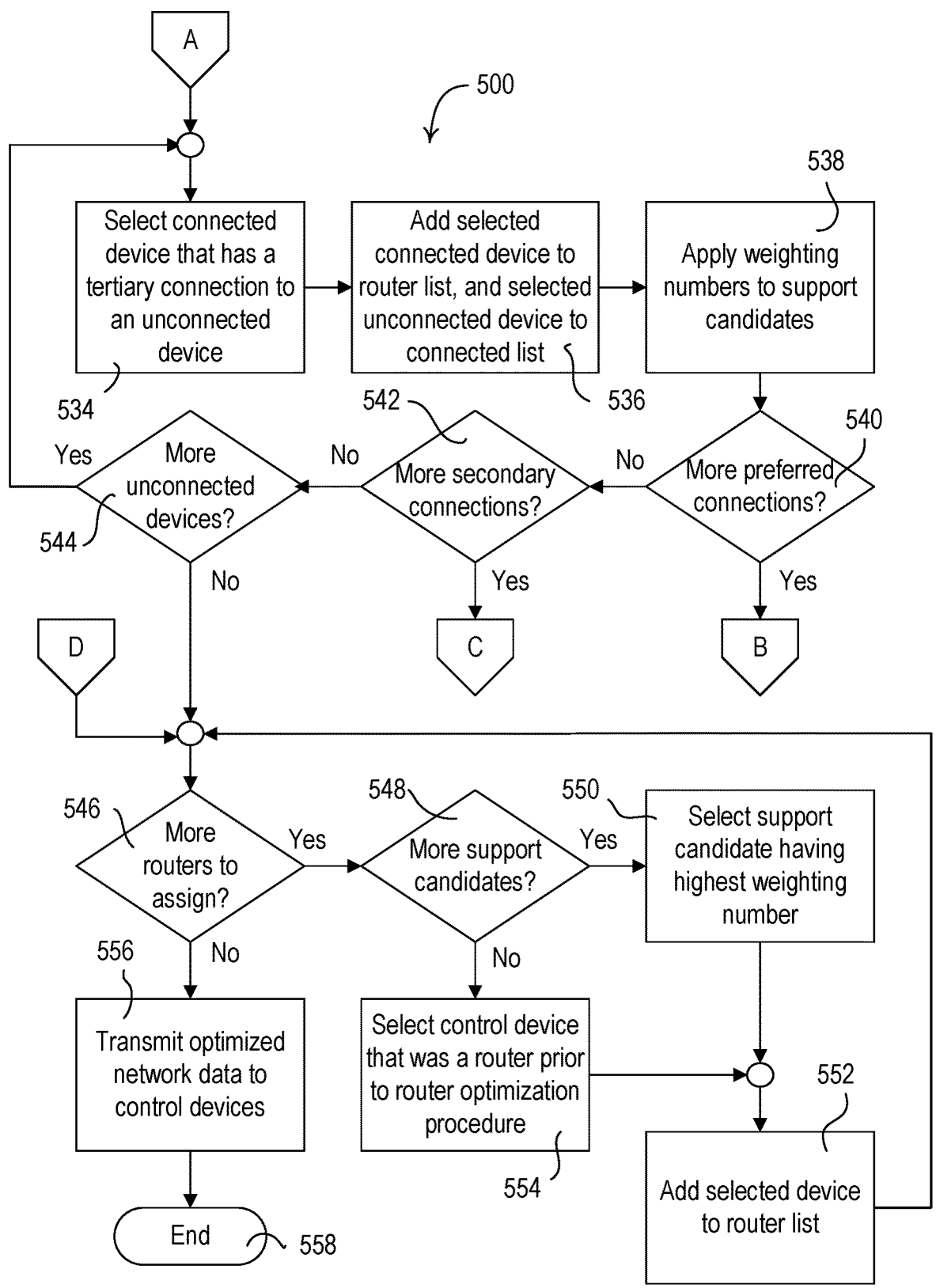

FIGS. 5A and 5B are flowcharts of an example procedure 500 for processing optimization data to optimize the selection of a leader device and router devices in a network (e.g., the networks 200, 200a, 200b, 200c and/or network partitions 201, 202, 203). The procedure 500 may be executed by a control device in a load control system that is joined or connected to the network (e.g., one of the leader device, router devices, and/or end devices) as part of a router optimization procedure. For example, the procedure 500 may be performed by a control device assigned to the role of leader device. The procedure 500 may also, or alternatively, be performed by another device in a load control system. For example, the procedure 500 may also, or alternatively, be performed by a system controller, such as the system controller 100 of the load control system 100, and/or network configuration device. The procedure 500 may be performed multiple times, and the control device that performs the procedure 500 may be changed over subsequent invocations of the procedure 500. For example, a first device (e.g., the system controller and/or network configuration device) may perform a first invocation of the procedure 500, and another device (e.g., the control device assigned to the role of leader device, which, as described herein, may change over time) may perform subsequent invocations of the procedure 500.

As further illustrated in FIGS. 5A and 5B, the procedure 500 may be used to construct the abstract or virtual network that defines the connections and/or optimal roles of the control devices based on the optimization data. As described herein, when the procedure 500 first begins, each of the control devices may be considered unconnected devices. For example, the control circuit of the system controller or another device performing the optimization procedure may initialize each of the control devices as unconnected devices in the abstract or virtual network. During the procedure 500, the system controller may build a router list of control devices that the system controller has determined to be assigned and operate as router devices, and a connected list of control device that have been determined to have a connection to at least one other control device in an abstract or virtual network. The router list of control devices and the connected list of control device may be used to represent the abstract or virtual network that defines the optimal roles of the control devices and/or the connections (e.g., potential attachments) between each of the control devices on the network. Using the procedure 500, control devices may be added to the router list of control devices or the connected list of control devices. As described herein, control devices that have been added to the connected list of control devices may be considered connected devices (e.g., no longer considered unconnected devices). The system controller may continue to add control devices to the connected list of control devices until there are no more unconnected devices.

Though the procedure 500, or other procedures described herein, may be described as being implemented by the system controller, other control devices and/or the network configuration device may implement the procedures, or portions of the procedures, described herein. The control device performing the procedure may be predefined (e.g., predefined as system controller or another control device) or selected prior to running the procedure 500). For example, the control device that performs the procedure 500 may be selected during network formation (e.g., the control device that is determined to be assigned to the role of the leader device based on the network optimization data, as described herein). In certain scenarios, the procedure 500 may be performed multiple times (e.g., periodically performed and/or performed in response to a certain trigger), and a different control device may perform the procedure 500 during subsequent performances of the procedure 500. Further, the different control device may be a control device that is assigned a specific role on the network. For example, the control device that is assigned to the role of leader device on the network may perform the procedure 500, or other procedures described herein. And, since in certain scenarios the control device assigned to the role of leader device may change over time, the control device that performs the procedure 500, or other procedures described herein, may be changed over time (e.g., as the control device assigned to the role of leader device on the network changes).

The control circuit of the system controller may start the procedure 500 at 502 and receive optimization data from the control devices (e.g., each of the control devices) on the network via a communication circuit. Referring to FIG. 4, the optimization data received from the control devices may be similar optimization data as transmitted at 410 of the procedure 400. The control circuit of the system controller may also combine optimization data that the system controller stored during the procedure 400 with the optimization data received from the other control devices at 504. The optimization data may include communication quality metrics, such average received signal strength indicators (RSSIs) and/or other communication quality metrics, that define the quality of network communication links (e.g., parent-child links, attachments, and/or other network links) between the various control devices in the optimization data.

At 506, the control circuit of the system controller may balance the optimization data to limit the optimization data to worst-case connections between devices. For example, the optimization data may include a first communication quality metric for optimization messages transmitted by a first control device and received by a second control device on a network communication link, and a second communication quality metric for optimization messages transmitted by the second control device and received by the first control device on the network communication link. The system controller may compare the communication quality metrics for both of the first and second control devices and identify the worst-case communication quality metric (e.g., smaller received signal strength indicator, smaller received signal strength indicator above the noise floor, lower link quality, higher link cost, or other worst-case communication quality metric). The system controller may limit the communication quality metric for both of the first and the second control devices to the worst-case communication quality metric of the first and second communication quality metrics at 506.

At 508, the control circuit of the system controller may generate a preferred connections list for each of the control devices in the optimization data. The preferred connections list for each control device may include the list of devices that have the best (e.g., greater than a defined threshold for the preferred connections list) network communication links with that particular control device. For example, when generating the preferred connections list for each control device, the system controller may include the unique identifiers of the other control devices in the preferred connections list that have a potential connection to the control device that is characterized by a communication quality metric that exceeds a preferred target quality threshold. The preferred connections list for each of the control devices may also, or alternatively be ranked or weighted, as further described herein. For example, the preferred connections list for each of the control devices may rank or weight each of the devices from devices that have the best network communication links with a particular control device to devices that have the worst network communication link with that particular control device (e.g., to indicate the relative strength of communications each control device has with the control device). That is, the preferred connection list may identify which devices experience better connections with a respective control device than other devices. For example, a higher weight may indicate that the communication quality metric of a potential connection with a device is higher, and a lower weight may indicate that that communication quality metric of a potential connection with the device is lower. The preferred target quality threshold may be a predetermined received signal strength threshold. The preferred target quality threshold may be a predefined received signal strength as compared to the noise floor at the control device (e.g., at least zero decibels or greater after subtracting the noise floor). The preferred target quality threshold may be a predefined link quality. The preferred target quality threshold may be a predefined target quality threshold.

Figure 5C:
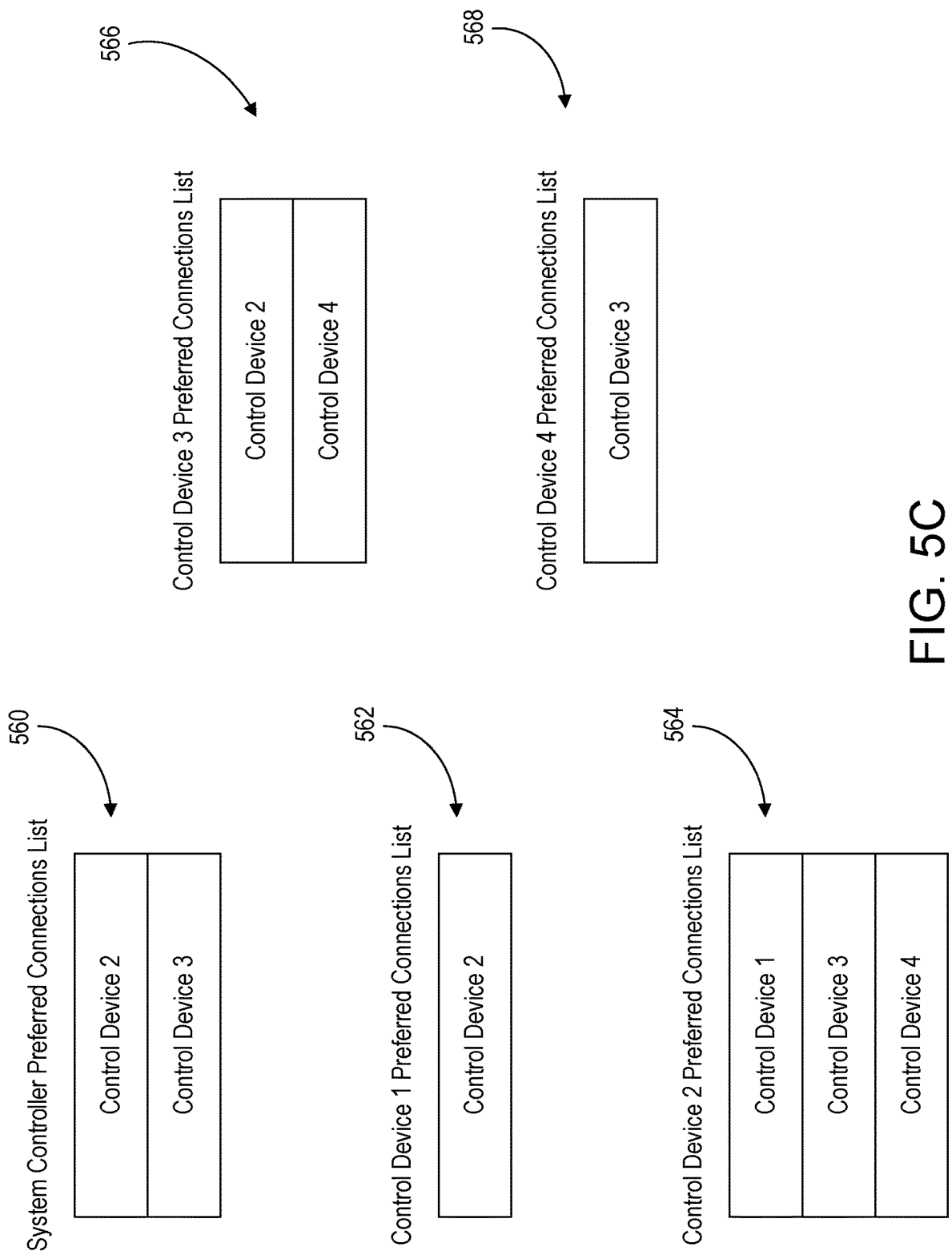
FIG. 5C are example preferred connections lists that may be generated using optimization data.

After generating the preferred connections lists for each control device, the system controller may have a list of preferred connections for each control device, including the system controller itself, which may give the system controller an understanding of the control devices with the largest number of preferred connections to the system controller and to other control devices in the system. FIG. 5C provide examples of 5 preferred connections lists 560, 562, 564, 566, 568 that may be generated at the control circuit of the system controller and stored in memory using the optimization data received from the control devices, though the number of preferred connections lists that are generated at a system controller may vary.

At 510, the control circuit of the system controller may select a leader device from the optimization data using the preferred connections lists generated for each control device at 508. In selecting the leader device at 510, the control device may select the control device that has the greatest number of other control devices in its preferred connections list. For example, as shown in the example preferred connections lists in preferred connections lists 560, 562, 564, 566, 568, the system controller may select "Control Device 2" as the leader device, as the preferred connections list for the "Control Device 2" that has the greatest number of other control devices in its preferred connection list of any of the other control devices, including the system controller. If the system controller itself has the greatest number of control devices in its preferred connections list, the system controller may select itself as the leader device.

Since the system controller may be centrally located within the network, the system controller may choose one of the control devices from its own preferred connections list to be the leader device. For example, the system controller may select the control device in its own preferred connections list (e.g., the preferred connections list of the system controller illustrated in preferred connections list 560) that has the most other control devices in the control device's own preferred connections list (e.g., the preferred connections list of the selected control device) to be the leader device of the network at 510. As illustrated in FIG. 5C, the "Control Device 2" may be selected as the leader device, since the "Control Device 2" is in the system controllers own preferred connections list and has the most other control devices in its preferred connections list between the "Control Device 2" and the "Control Device 3". The system controller may add the selected control device to the router list at 512. The selected control device (e.g., "Control Device 2") may be selected as a device that is assigned the role of a router device in the network. The system controller may add the selected control device (e.g., "Control Device 2") and the control devices in its preferred connections list (e.g., "System Controller," "Control Device 1," and "Control Device 3") to the connected list at 514 (e.g., such that the selected control device and the control devices in its preferred connections list are no longer unconnected devices).

The system controller may first identify a minimized number of control devices that have connections that are above the defined quality threshold with the highest number of other control devices to be assigned to the role of router device. At 516, for example, the control circuit of the system controller may select a control device in the connected list that has the most unconnected control devices in its preferred connections list to be a router device. As shown in the example preferred connections lists 560, 562, 564, 566, 568, the system controller may select "Control Device 3" as the device in the connected list that has the most unconnected control devices (e.g., "Control Device 4") in its preferred connections list. At 518, the system controller may add the selected control device to the router list, and add the selected control device and the control devices in the preferred connections list for the selected control device to the connected list. For example, the "Control Device 3" may be added to the router list. The control devices in the preferred connections list for the "Control Device 3" that have yet to be added to the connected list (e.g., "Control Device 4") may be added to the connected list.

If there are more control devices in the connected list that have unconnected control devices in their preferred connections list at 520, the control circuit of the system controller may once again select a control device in the connected list that has the most unconnected control devices in its preferred connection list to be a router device at 516. For example, as "Control Device 3" is in the connected list and has the most unconnected control devices in its preferred connection list (e.g., "Control Device 4"), the "Control Device 3" may be added to the router list for being assigned the role of a router device in the network.

When there are not any more control devices in the connected list that have unconnected control devices in their preferred connection list at 520, but there are still unconnected devices at 522, the system controller may look to control devices that have a secondary connection to one of the control devices in the router list. For example, a secondary connection may be represented by a communication quality metric that is less than the communication quality metric for the preferred connections. The control devices that have secondary connections with each control device may include the control devices that have adequate connections with the particular control device. For example, when secondary connections are being identified for each control device, the system controller may identify the unique identifiers of the other control devices that have a potential connection to the control device that is characterized by a communication quality metric that exceeds a secondary target quality threshold. The secondary target quality threshold may be a predetermined received signal strength threshold that is worse than the preferred target quality threshold (e.g., associated with a lower communication metric or lower link quality than the preferred target quality threshold). The secondary target quality threshold may be a predefined received signal strength as compared to the noise floor at the control device (e.g., less than zero decibels but greater than −10 decibels after subtracting the noise floor). The secondary target quality threshold may be a predefined link quality that is worse than the preferred target quality threshold. The secondary target quality threshold may be a predefined target quality threshold that is worse than the preferred target quality threshold.

The control circuit of the system controller may select an unconnected control device to be a router device at 524, where the selected control device has a secondary connection to one of the control devices in the router list. At 526, the control circuit of the system controller may add the selected control device to the connected list. At 528, the system controller may check to see if there are any control devices in the connected list that have unconnected control devices in their preferred connection list (e.g., if the control device that was just added to the connected list at 526 has control devices in the preferred connection list). If so, the control circuit of system controller may select a control device in the connected list that has the most unconnected control devices in its preferred connections list (e.g., the control device that was just added to the connected list at 516) to be a router device at 516. The system controller may then add the selected control device to the router list, and add the selected control device and the control devices in the preferred connections list for the selected control device to the connected list at 518. If there are not any control devices in the connected list that have unconnected control devices in their preferred connections list at 528 (e.g., if the control device that was just added to the connected list at 526 does not have any control devices in the preferred connection list), but there are unconnected control devices that have a secondary connection to one of the control devices in the router list at 530, the system controller may select one of the unconnected control devices to be a router device at 524.

If there are not any unconnected control devices that have a secondary connection to one of the control devices in the router list at 530, but there are still unconnected control devices at 532, the control circuit of the system controller may select a control device from the connected list (e.g., a selected connected device) to be a router device, where the selected control device has a tertiary connection with an unconnected control device (e.g., a selected unconnected device). For example, a tertiary connection may be represented by a communication quality metric that is less than the communication quality metric for the secondary connections. The tertiary connections for each control device may include the control devices that have sub-par connections with the particular control device. The control devices that have tertiary connections with one or more unconnected devices may be control devices that may be promoted to router devices that are in a troubled area for performing network communications. When identifying tertiary connections for each control device, the system controller may identify the unique identifiers of the other control devices that have a potential connection to the control device that is characterized by a communication quality metric that exceeds a tertiary target quality threshold. The tertiary target quality threshold may be a predetermined received signal strength threshold that is worse than the secondary target quality threshold. The tertiary target quality threshold may be a predefined received signal strength as compared to the noise floor at the control device (e.g., less than −10 decibels but greater than −100 decibels or lower after subtracting the noise floor). The tertiary target quality threshold may be a predefined link quality that is worse than the secondary target quality threshold. The tertiary target quality threshold may be a predefined target quality threshold that is worse than the secondary target quality threshold. A tertiary target quality threshold may be omitted as the tertiary connections may be the connections worse than the secondary connections. At 536, the system controller may add the selected connected device to the router list, and add the unconnected device that has a tertiary connection with that device to the connected list.

At 538, the control circuit of the system controller may begin choosing control devices as support candidates for being upgraded to router devices. As described herein, the control devices that are chosen to be support candidates may include connected device that have secondary or tertiary connections to the unconnected device selected at 534 (e.g., the unconnected device that has a tertiary connection to one of the connected devices). For example, after selecting router devices as described herein, the system controller may begin choosing non-router control devices in the connected list as support candidates. For example, the control devices that are selected as support candidates may be potential control devices to become router devices to support some of the weaker connections in the network to the selected router devices (e.g., the tertiary connections to the newly added router devices). The support candidates may be chosen such that the support candidates are clustered around the control devices with tertiary connections to the connected devices. By clustering support devices (e.g., devices that determined to be upgraded to the role of router device) around these weaker connections, the likelihood may be increased that messages (e.g., multicast messages or broadcast messages) are received by a device.

Each of the support candidates may be assigned a respective weight. For example, the support candidates may be weighted such that the support candidates that have secondary connections to the unconnected device selected at 534 have a higher weight than the support candidates that have tertiary connections to the unconnected device selected at 534. For example, support candidates that have secondary connection to the unconnected device selected at 534 may be assigned a weight of 0.5, and support candidates that have a tertiary connection to the unconnected device selected at 534 may be assigned a weight of 0.25. As a result, the weighting may help choose the router devices that may support the control devices with the weaker connections the most and/or the greatest number of control devices with weaker connections. And the support candidates may be clustered around the control devices with the weaker connections.

The support candidates may have potential connections to the selected control device that are characterized by communication quality metrics that meet the primary target quality threshold, the secondary target quality threshold, or the tertiary target quality threshold (e.g., if implemented). The system controller may assign weighting numbers to the support candidates at 538. The weighting numbers may be based on a value that represents an amount of shortfall of target connectedness for the selected device. The value may also be apportioned to the support candidates based on their potential ability to correct that shortfall. The value may be added to the weighting number each time that the system controller executes 538, such that the weighting numbers represent a cumulative amount that each support candidate may be able to help other control devices communicate on the network.

At 540, the system controller may check to see if there are any control devices in the connected list that have unconnected control devices in their preferred connections list. If so, the control circuit of the system controller may select a control device in the connected list that has the most unconnected control devices in its preferred connections list to be a router device at 516. If there are not any control devices in the connected list that have unconnected control devices in their preferred connections list at 540, but there are unconnected control devices that have a secondary connection to one of the control devices in the router list at 542, the system controller may select one of the unconnected control devices to be a router device at 524. If there are not any unconnected control devices that have a secondary connection to one of the control devices in the router list at 542, but there are still unconnected control devices at 544, the system controller may select a control device from the connected list to be a router device, where the selected control device has a tertiary connection to one of the unconnected control devices at 534.

Where there are not any more unconnected control devices at 522, 532, and 544, the system controller may determine if there are more router devices to assign at 546. For example, the control circuit of the system controller may determine there are additional router devices that may be assigned in the network. If there are more router devices to assign at 546 and there are control devices that have been designated as support candidates at 548, the control circuit of the system controller may select the support candidate having the highest weighting number to be a router device at 550, and may add the selected control device to the router list at 552. If there are more router devices to assign at 546, but there are not any more support candidates at 548, the control circuit of the system controller may select one of the control devices that was a router device in the network prior to the router optimization procedure being executed (e.g., and is not presently in the router list) to be a router device at 554, and may add the selected control device to the router list at 552. The router devices in the network may be stored with their role at the system controller prior to the implementation of the optimization procedure. When there are not more router devices to assign at 546, the system controller may transmit optimized network data to the control devices at 556 (e.g., via unicast, multicast, and/or broadcast messages), and the procedure 500 may exit at 558. The optimized network data may indicate the control devices that have been assigned as router devices in the router list to optimize network communications. The optimized network data may indicate the control device that has been assigned as the leader device in the router list. For example, the optimized network data may include the unique identifier of the control device that has been assigned as the leader device in the router list. The optimized network data may include the unique identifier of the control devices that are assigned as the router devices. Control devices may determine whether to upgrade, downgrade, or maintain their role in the network based on the identifiers in the router list. For example, control devices that identify their unique identifier in the router list may operate as router devices and control devices that fail to identify their unique identifier in the router list may operate as end devices. The optimized network data may be used to weight the control devices assigned the role of leader device or router device in favor of becoming a leader device or router device, respectively. Also, or alternatively, the devices that are determined to be assigned to the role of router device may report such assignment during a subsequent invocation of the optimization procedures described herein (e.g., in the optimization data transmitted by that device). In response to receiving that optimization data, the system controller (e.g., or another device performing the optimization procedures described herein, such as the leader device) may determine to upgrade that device accordingly.

The system controller may, in response to receiving the optimization data, may determine whether to upgrade a given device that is determined to be assigned to the role of router device. In making this determination, the system control may, for example, consider one or more of the following. The system control may, in making a determination whether to upgrade a device based on the optimization data, consider whether the device is already assigned to the role of router device. The system control may, in making a determination whether to upgrade a device based on the optimization data, consider whether the device is already configured as a parent device of one or more end devices. The system control may, in making a determination whether to upgrade a device based on the optimization data, consider the number of end device attached to the device.

In addition, one or more messages may be transmitted to the control devices on the network to indicate the control devices that have been assigned as router devices, the control device that has been assigned as the leader device, and/or the control devices that have downgraded from the role of router device or leader device based on the optimized network data. As described herein, these messages may also indicate a time at which these role updates are to be implemented. In response, the control devices on the network may update their respective roles accordingly. In addition, the control devices that are attached to the control devices that are to be downgraded from router devices to end devices, may determine to initiate attachment procedures. As described herein, by the time these control devices downgrade from being a router device and initiate their attachment procedures, the control devices that have been assigned as router devices may have already updated their roles, which may allow the control device to attach to the optimal router devices based on the optimized network data.

Figure 6:
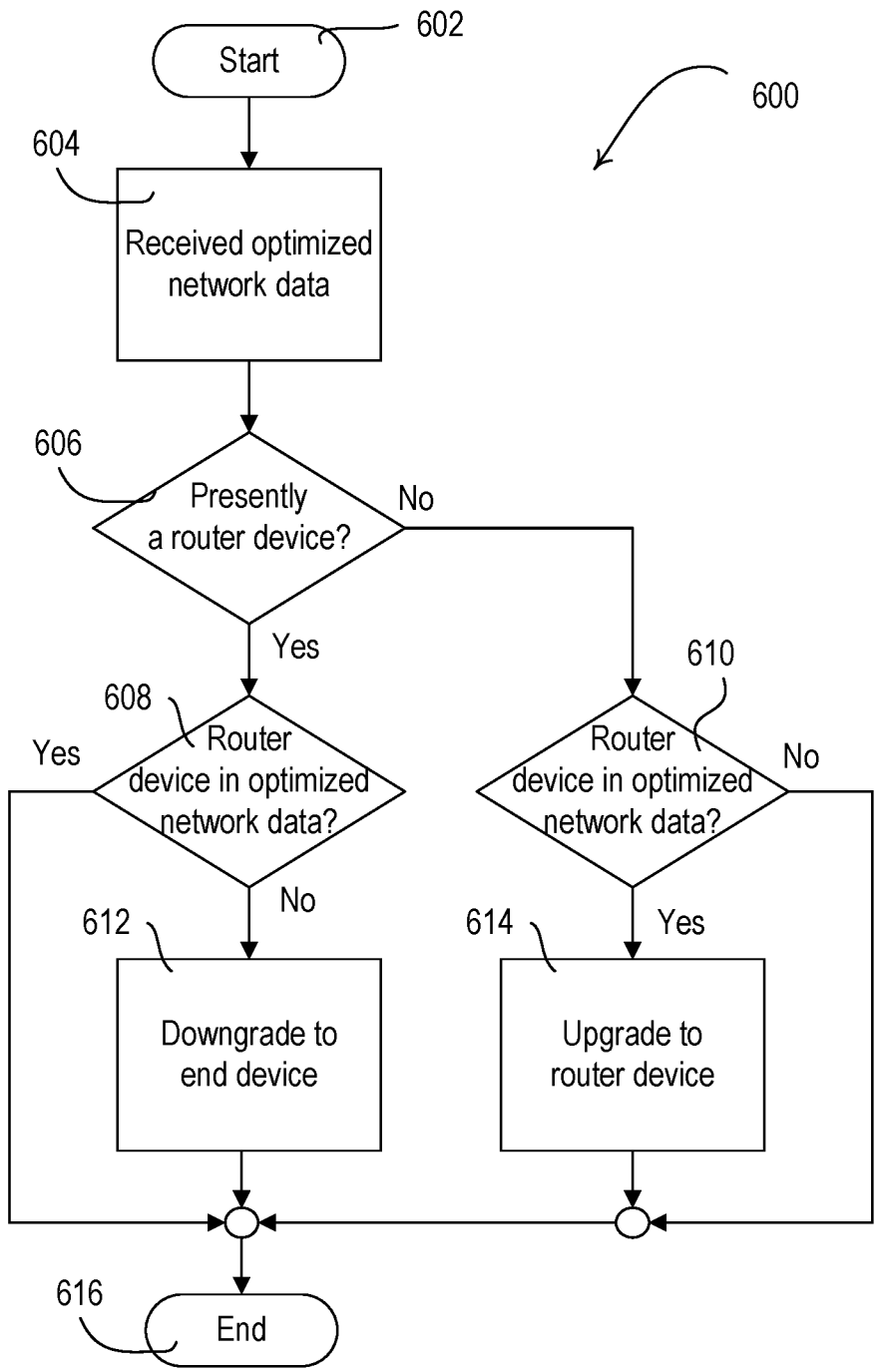
FIG. 6 is a flowchart of an example procedure for that may be performed at a control device for determining its role in a network.

FIG. 6 is a flowchart of an example procedure 600 for that may be performed at a control device for determining its role in a network (e.g., the networks 200, 200a, 200b, 200c and/or network partitions 201, 202, 203). The procedure 600 may be executed by a control device in the network (e.g., one of the leader device, router devices, and/or end devices) as part of a router optimization procedure. For example, the procedure 600 may be executed by a control device of a load control system (e.g., the system controller 110 of the load control system 100) after the system controller assigns the control devices to the router list (e.g., as shown in the procedure 500 in FIG. 5). During the procedure 600, the control device may determine its role and operate according to that role as described herein.

The control circuit of the control device may start the procedure 600 at 602 and identify the received optimized network data from the system controller or another control device on the network at 604. The procedure 600 may be triggered at 602 by the control circuit of the receiving a message via the communication circuit that includes the optimized network data. The optimized network data may indicate the leader device and/or the router devices that have been assigned by the system controller or another control device on the network. For example, the optimized network data may include the router list or an indication of the unique identifiers (e.g., network identifiers) of the control devices that have been assigned as router devices in the router list.

At 606, the control circuit of the control device may determine from memory whether it is presently assigned as a router device in the network. If the control device is presently assigned with another role on the network than a router device (e.g., an end device), the control device may determine at 610 whether the control device is assigned as a router device in the optimized data. If the control device is not assigned as the router device in the optimized network data, then the procedure 600 may end, e.g., such that the control device may maintain its role (e.g., as an end device) in the network. If the control device is assigned as a router device in the optimized network data at 610, then the control device may upgrade its role at 614 to become a router device and begin operating as a router device as described herein. For example, the control device may send a router request message to the leader device to become a router device on the network. The control device may be added to the router table by the leader device and may begin advertising and operating as a router device as described herein.

One of the control devices may be assigned as a leader device in the optimized network data. At 610, the control circuit of the control device may determine from memory that it is assigned the role of the leader device in the optimized network data. If control device is assigned the role of the leader device in the optimized network data, the control device may upgrade its role to the leader device at 614 (e.g., from a router device or an end device).

The control device may await for the current leader device to identify that it is not assigned the role of leader device in the optimized network data and transmit an indication that it is downgrading its role from the leader device. For example, the current leader device may send a leader abdicate message via its communication circuit that may be received by the control device before upgrading to the role of the leader device at 614. The leader abdicate message may indicate to the control device that the leader device is renouncing its position as the leader device and the control device may take over the role as leader device. After the control device upgrades its role to the leader device on the network, it may take over the responsibilities of the leader device on the network. For example, the control device will begin transmitting advertisement messages as the leader device and perform the other leader responsibilities described herein.

If, at 606, the control circuit of the control device determines that it is presently assigned the role of a router device in the network, the control circuit of the control device may determine at 608 whether it is assigned as a router device in the optimized network data. If the control device is presently assigned as a router device and is assigned as a router device in the optimized network data, the control device may remain a router device in the network and the procedure 600 may end. If the control device is presently assigned the role of a router device in the network and is not assigned the role of a router device in the optimized network data, the control device may downgrade its role to an end device at 612. The control device may also multicast a message indicating that it is to be downgraded to the role of end device, which, as described here, may allow the end devices attached to the control device to initiate attachment procedures with an optimal router device based on the optimized network data.

In downgrading its role from a router device to an end device, the control circuit of the control device may send a router release message via the communication circuit to the leader device to be released as a router device from the router table by the leader device. The router release message may be sent as a unicast message directly to the leader device or as a multicast message. The router release message may include the unique identifier of the router device (e.g., the router identifier or other unique identifier) to be released from the router table. The leader device may receive the router release message and release the control device from the router table. The leader device may remove the router identifier of the control device from the router table. The receipt of the router release message at the leader device may allow the leader device to release the control device from the router table proactively before the control device leaves the network or the leader device otherwise waits to determine that the control device has left due to non-responsiveness, which will allow the leader device to update the router table and/or the bitmap sooner than having to wait a period of time to determine that the control device has been lost as a router device.

The proactive removal of the control device from the router table and/or the bitmap will allow end devices to identify the loss of their router device from the network earlier, as they will receive the updated router table and/or bitmap and attempt to attach to another router device (e.g., as a parent device or auxiliary parent device) without having to wait a period of time to determine that their router device has been lost due to non-responsiveness. Upon receiving the router release message, the leader device may transmit an advertisement message including the updated router table having the bitmap indicating that the identified router device has been removed from the network. The router devices on the network may retransmit the advertisement message until the advertisement message is transmitted to each router device and end device on the network. An end device that is a child of the control device that has been removed from the router table may, in response to receiving the advertisement message (e.g., from a parent router device, an auxiliary parent device, or other router device), identify that its parent router device is no longer a router device and send a parent request message to another router device on the network.

The control device may be assigned the role of a leader device and may similarly maintain its role or downgrade its role based on the indication of the leader device in the optimized network data. At 608, the control device may be currently assigned the role of leader device in the network and determine that it is assigned the role of the leader device in the optimized network data. In this case, the control device may maintain its role as the leader device in the network. In another example, the control device may be currently assigned the role of the leader device and determine, at 608, that it assigned the role of a router device or an end device in the optimized network data and may downgrade its role. If the control device is currently assigned the role of a leader device and is assigned the role of an end device in the optimized network data, the control device may downgrade its role to a router device from the leader device and then downgrade its role to an end device from a router device.

If the control device is downgrading from the leader device to a router device, the leader device may identify the next leader device to take over as the leader device. For example, the control device may downgrade from the leader device to a router device if another control device is identified as a leader device based on the optimized network data. The other control device may be identified as the leader device based on the optimized network data if, for example, the other control device has a greater number of control devices in its preferred connection list than the control device downgrading from the leader device to a router device. The control device may change its role from the leader device after sending a leader abdicate message to the leader device indicated in the optimized network data and/or receiving the indication that the next leader device has taken over as the leader device. The leader abdicate message may indicate to the next leader device that the control device is renouncing its position as the leader device and the next leader device may take over the role as leader device, as described herein. The control device may downgrade its role to a router device from the leader device.

If the control device determines that it is an end device in the optimized network data, the control device may downgrade its role to an end device at 612. As described herein, the control device may send a router release message via the communication circuit to the recently upgraded leader device to be released as a router device before downgrading to an end device. The control device that sent the router release message may downgrade its role to an end device at 612. The procedure may end at 616.

Although features and elements are described herein in particular combinations, each feature or element can be used alone or in any combination with the other features and elements. The methods described herein may be implemented in a computer program, software, instructions, or firmware stored on one or more non-transitory computer-readable media or other machine-readable media for execution by a computer or machine, or portion thereof. For example, the computer-readable or machine-readable media may be executed by a control circuit, such as a processor. Examples of computer-readable media or machine-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs). The control circuit may access the computer program, software, instructions, or firmware stored on the computer-readable media or machine-readable media for being executed to cause the control circuit to operate as described herein, or to operate one or more devices as described herein.

What is claimed is:

1. A device comprising:
a memory;
a communications circuit for transmitting and receiving messages; and
a control circuit, configured to:
receive, via the communications circuit, at least one optimization message from each control device of a plurality of control devices in a load control system;
measure a communication quality metric for each control device of the plurality of control devices from which the at least one optimization message is received;
store the communication quality metric associated with each control device of the plurality of control devices from which the at least one optimization message was received in optimization data with a corresponding identifier of a respective control device of the plurality of control devices from which the at least one optimization message was received;
process the optimization data to generate optimized network data, wherein the optimized network data comprises a router list that includes control devices determined to be assigned to a role of router device in a network, wherein the control devices are determined to be included in the router list based on a number of connections between each control device in the router list and other control devices in the network having the measured communication quality metric greater than a threshold, and wherein the connections represent potential attachment links between each control device in the router list and the other control devices in the load control system;
wherein the control circuit is configured to process the optimization data by generating a preferred connections list for each control device of the plurality of control devices based on the measured communication quality metric for the respective control device, and selecting the one or more control devices to be included in the router list based on the preferred connections list for each control device of the plurality of control devices.

2. The device of claim 1, wherein the control circuit is further configured to:
transmit the generated optimized network data to each of the plurality of control devices in the load control system.

3. The device of claim 1, wherein the
preferred connections list comprises a list of connections for each control device that have a communication quality metric above a preferred target quality threshold, wherein the connections represent potential attachment links between a respective control device and other control devices in the network.

4. The device of claim 1, wherein the control circuit is further configured to:
identify that the preferred connection list for a first control device has a greatest number of devices of each of the preferred connections lists for the plurality of control devices; and
select the first control device as one of the control devices to be included in the router list for being assigned the role of router device based on the preferred connection list for the first control device having the greatest number of devices.

5. The device of claim 4, wherein the control circuit is further configured to select a leader device the from the control devices to be included in the router list, and wherein the control device is selected as the leader device based on having the greatest number of devices in the preferred connection list.

6. The device of claim 4, wherein the control circuit is further configured to:
initialize each of the plurality of control devices as being an unconnected device in a virtual network; and
after the first control device is selected as being included in the router list, add the first control device and each control device in the preferred connection list for the first control device to a connected list that indicates connected devices in the virtual network.

7. The device of claim 6, wherein the control circuit is further configured to:
identify a second control device from the connected list for being included in the router list, wherein the second control device is identified for being included in the router list based on having a greatest number of unconnected devices in a respective preferred connection list.

8. The device of claim 7, wherein the control circuit is further configured to:
after the second control device is selected as being included in the router list, add the second control device and each control device in the corresponding preferred connection list for the second control device to the connected list; and
maintain the connected list of control devices in the virtual network for selecting additional control devices for being included in the router list.

9. The device of claim 6, wherein the control circuit is further configured to:
generate a secondary connections list for one or more control devices of the plurality of control devices, wherein the secondary connections list comprises a list of connections for each of the one or more control devices that have a communication quality metric above a secondary target quality threshold, and wherein the secondary target quality threshold is a lower threshold than the preferred target quality threshold; and
select the control devices to be included in the router list based on a number of unconnected devices in the secondary connections list for the control devices.

10. The device of claim 9, wherein the control circuit is further configured to:
generate a tertiary connections list for one or more control devices of the plurality of control devices, wherein the tertiary connections list comprises a list of connections for each of the one or more control devices that have a communication quality metric above a tertiary target quality threshold, and wherein the tertiary target quality threshold is a lower threshold than the secondary target quality threshold; and
select the control devices to be included in the router list based on a number of unconnected devices in the tertiary connections list for the control devices.

11. The device of claim 10, wherein the control circuit is further configured to:
determine one or more control devices have been previously assigned the role or router device; and
select the one or more control devices to be included in the router list.

12. The device of claim 1, wherein the preferred connections list is weighted for each control device of the plurality of control devices to indicate a relative strength of communications each control device has with a respective control device of the plurality of control devices.

13. The device of claim 1, wherein the control circuit is further configured to update the role of the first control device in response to the generated optimized network data.

14. The device of claim 13, wherein the control circuit is further configured to:
upgrade the role of the control device to a router device or leader device in response to the generated optimized network data.

15. The device of claim 13, wherein the control circuit is further configured to:
downgrade the role of the control device to an end device in response to the generated optimized network data.

16. The device of claim 15, wherein the control circuit is configured to downgrade the role when a unique identifier of the control device fails to be listed in the router list.

17. A method comprising:
entering a router optimization mode at a control device of a plurality of control devices in a load control system;
transmitting at least one optimization message from the control device;
receiving optimization messages at the control device from other control devices of the plurality of control devices in the load control system;
measuring a communication quality metric for each optimization message received at the control device from the other control devices;
storing the communication quality metric for each optimization message received in optimization data with a corresponding identifier of the control device from which a respective optimization message was received;
processing the optimization data by a system controller to generate optimized network data, wherein the optimized network data comprises a router list that includes control devices determined to be assigned to a role of router device in a network, wherein the control devices are determined to be included in the router list based on a number of connections between each control device in the router list and other control devices in the network having the measured communication quality metric greater than a threshold, and wherein the connections represent potential attachment links between each control device in the router list and the other control devices in the load control system;
wherein processing the optimization data further comprises:
generating a preferred connections list at the system controller for each control device of the plurality of control devices based on the measured communication quality metric for the respective control device; and
selecting the control devices to be included in the router list based on the preferred connections list for the control devices.

18. The method of claim 17, further comprising:
transmitting the generated optimized network data to each of the plurality of control devices in the load control system.

19. The method of claim 17, wherein
the preferred connections list comprises a list of connections for each control device that has a communication quality metric above a preferred target quality threshold, wherein the connections represent potential attachment links between the control device and other control devices in the network.

20. The method of claim 17, wherein selecting the control devices to be included in the router list further comprises:

identifying that the preferred connection list for a first control device has a greatest number of devices of each of the preferred connections lists for the plurality of control devices; and selecting the first control device as one of the control devices to be included in the router list for being assigned the role of router device based on the preferred connection list for the control device having the greatest number of devices.

21. The method of claim 20, wherein processing the optimization data by the system controller to generate optimized network data further comprises selecting a leader device the from the control devices to be included in the router list, and wherein the control device is selected as the leader device based on having the greatest number of devices in the preferred connection list.

22. The method of claim 20, the method further comprising:

initializing each of the plurality of control devices as being an unconnected device in a virtual network; and after selecting the first control device as being included in the router list, adding the first control device and each control device in the preferred connection list for the first control device to a connected list that indicates connected devices in the virtual network.

23. The method of claim 22, wherein selecting the control devices to be included in the router list further comprises:

identifying, by the system controller, a second control device from the connected list for being included in the router list, wherein the second control device is identified for being included in the router list based on having a greatest number of unconnected devices in a respective preferred connection list.

24. The method of claim 23, wherein selecting the control devices to be included in the router list further comprises:

after selecting the second control device as being included in the router list, adding the second control device and each control device in the corresponding preferred connection list for the second control device to the connected list; and maintaining, at the system controller, the connected list of control devices in the virtual network for selecting additional control devices for being included in the router list.

25. The method of claim 22, wherein the system controller processing the optimization data to generate optimized network data further comprises:

generating a secondary connections list at the system controller for one or more control devices of the plurality of control devices, wherein the secondary connections list comprises a list of connections for each of the one or more control devices that have a communication quality metric above a secondary target quality threshold, and wherein the secondary target quality threshold is a lower threshold than the preferred target quality threshold; and selecting the control devices to be included in the router list based on a number of unconnected devices in the secondary connections list for the control devices.

26. The method of claim 25, wherein processing the optimization data by the system controller to generate optimized network data further comprises:

generating a tertiary connections list at the system controller for one or more control devices of the plurality of control devices, wherein the tertiary connections list comprises a list of connections for each of the one or more control devices that have a communication quality metric above a tertiary target quality threshold, and wherein the tertiary target quality threshold is a worse threshold than the secondary target quality threshold; and selecting the control devices to be included in the router list based on a number of unconnected devices in the tertiary connections list for the control devices.

27. The method of claim 26, wherein the system controller processing the optimization data to generate optimized network data further comprises:

determining one or more control devices have been previously assigned the role or router device; and selecting the one or more control devices to be included in the router list.

28. The method of claim 20, wherein the plurality of control devices comprise a second control device capable of communicating on a network communication link with the first control device, wherein the communication quality metric for the optimization message received at the first control device from the second control device comprises a first communication quality metric associated with the network communication link, the method further comprising:

receiving an optimization message at the second control device that is transmitted from the first control device;

measuring a second communication quality metric for the optimization message received at the second control device, wherein the second communication quality metric is also associated with the network communication link;

storing the second communication quality metric associated with the network communication link in optimization data at the second control device with a corresponding identifier of the first control device from which the optimization message was received; and transmitting the optimization data comprising the second communication quality metric associated with the network communication link from the second control device to the system controller.

29. The method of claim 17, further comprising:

receiving, at the system controller, the optimization data from the first control device and the second control device;

balancing the optimization data to limit the optimization data to a worst-case connection for the network communication link by using one of the first communication quality metric or the second communication quality metric associated with the network communication link; and using the one of the first communication quality metric or the second communication quality metric associated with the network communication link when processing the optimization data to generate the preferred connections list.

30. The method of claim 17, wherein the preferred connections list is weighted for each control device of the plurality of control devices to indicate a relative strength of communications each control device has with a respective control device of the plurality of control devices.

31. The method of claim 17, further comprising updating the role of the control device in response to the generated optimized network data.

32. The method of claim 31, further comprising:

upgrading the role of the control device to a router device or leader device in response to the generated optimized network data; and operating the control device on the network in accordance with the role of router device or leader device.

33. The method of claim 31, further comprising:
- downgrading the role of the control device to an end device in response to the generated optimized network data; and
- operating the control device on the network in accordance with the role of end device.

34. The method of claim 33, wherein the control device is configured to downgrade the role when a unique identifier of the control device fails to be listed in the router list.

35. A method comprising:
- entering a router optimization mode at a control device of a plurality of control devices in a load control system;
- transmitting at least one optimization message from the control device;
- receiving optimization messages at the control device from other control devices of the plurality of control devices in the load control system;
- measuring a communication quality metric for each optimization message received at the control device from the other control devices;
- storing the communication quality metric for each optimization message received in optimization data with a corresponding identifier of the control device from which a respective optimization message was received;
- transmitting the optimization data to a system controller to generate optimized network data and a preferred connections list, wherein the optimized network data comprises a router list that includes control devices determined to be assigned to a role of router device in a network, wherein the control devices are determined to be included in the router list based on a number of connections between each control device in the router list and other control devices in the network having the measured communication quality metric greater than a threshold, wherein the connections represent potential attachment links between each control device in the router list and the other control devices in the load control system, and wherein the preferred connections list comprises a list of connections for the control device that has a communication quality metric above a preferred target quality threshold; and
- receiving, from the system controller, an indication that the control device has been selected to be included in the router list.

* * * * *